US008775328B1

(12) United States Patent
Abhyanker

(10) Patent No.: US 8,775,328 B1
(45) Date of Patent: Jul. 8, 2014

(54) GEO-SPATIALLY CONSTRAINED PRIVATE NEIGHBORHOOD SOCIAL NETWORK

(71) Applicant: Raj Abhyanker, Cupertino, CA (US)

(72) Inventor: Raj Abhyanker, Cupertino, CA (US)

( * ) Notice: Subject to any disclaimer, the term of this patent is extended or adjusted under 35 U.S.C. 154(b) by 0 days.

(21) Appl. No.: 14/203,531

(22) Filed: Mar. 10, 2014

Related U.S. Application Data

(63) Continuation of application No. 11/653,194, filed on Jan. 12, 2007.

(51) Int. Cl.
H04W 4/02 (2009.01)
H04W 76/00 (2009.01)
H04L 12/58 (2006.01)
H04W 4/22 (2009.01)
G06F 21/31 (2013.01)
G06Q 99/00 (2006.01)

(52) U.S. Cl.
CPC .............. H04L 51/04 (2013.01); H04W 4/021 (2013.01); H04W 76/007 (2013.01); G06F 21/31 (2013.01); H04W 4/22 (2013.01); G06Q 99/00 (2013.01)
USPC .......................................... 705/325; 705/7.11

(58) Field of Classification Search
CPC ............................... H04W 4/021; H04L 51/04
See application file for complete search history.

(56) References Cited

U.S. PATENT DOCUMENTS

| 2,035,218 | A |   | 3/1936  | Bloom     |         |
|-----------|---|---|---------|-----------|---------|
| 5,032,989 | A | * | 7/1991  | Tornetta  | 705/313 |
| 5,325,294 | A |   | 6/1994  | Keene     |         |
| 5,581,630 | A | * | 12/1996 | Bonneau, Jr. | 382/116 |
| 5,584,025 | A | * | 12/1996 | Keithley et al. | 707/752 |
| 5,590,062 | A |   | 12/1996 | Nagamitsu et al. |    |
| 5,671,342 | A | * | 9/1997  | Millier et al. | 345/418 |
| 5,805,810 | A |   | 9/1998  | Maxwell   |         |
| 5,831,664 | A | * | 11/1998 | Wharton et al. | 725/81 |
| 5,905,499 | A |   | 5/1999  | McDowall et al. |    |
| 5,926,765 | A | * | 7/1999  | Sasaki    | 455/456.1 |
| 5,930,474 | A | * | 7/1999  | Dunworth et al. | 709/217 |

(Continued)

FOREIGN PATENT DOCUMENTS

| EP | 1426876 A1     | 6/2004  |
|----|----------------|---------|
| WO | 2006020471 A1  | 2/2006  |
| WO | 2007113844 A1  | 10/2007 |

OTHER PUBLICATIONS

Kristen Nicole May 28, 2007 20:57:31 UTC Fatdoor. Mashable. http://mashable.com/2007/05/28/fatdoor/.*

(Continued)

Primary Examiner — Brett Feeney
(74) Attorney, Agent, or Firm — Raj Abhyanker, P.C.

(57) ABSTRACT

A method and system an online neighborhood social network designed to create private websites to facilitate communication among neighbors and build stronger neighborhoods. The private websites are embodied in a website having a domain name of nextdoor.com. In one embodiment, a method verifies that a user lives at a residence associated with a residential address claimed by the user of an online neighborhood social network. The method restricts access to a particular neighborhood to the user and to neighboring users living within the neighborhood boundary of the residence. A social network page of the user is created once verified and access privileges are determined. A message is distributed to neighboring users that are verified to live within a neighborhood boundary of the residence. The method may designate the user as a lead user with an additional privilege based on a participation level of the user in the online community.

38 Claims, 43 Drawing Sheets

(56) References Cited

U.S. PATENT DOCUMENTS

| | | | |
|---|---|---|---|
| 5,940,806 A | 8/1999 | Danial | |
| 6,024,288 A | 2/2000 | Gottlich et al. | |
| 6,034,618 A | 3/2000 | Tatebayashi et al. | |
| 6,036,601 A | 3/2000 | Heckel | |
| 6,047,194 A | 4/2000 | Andersson | |
| 6,088,702 A * | 7/2000 | Plantz et al. | 1/1 |
| 6,229,533 B1 | 5/2001 | Farmer et al. | |
| 6,308,177 B1 | 10/2001 | Israni et al. | |
| 6,317,718 B1 * | 11/2001 | Fano | 705/14.39 |
| 6,336,111 B1 | 1/2002 | Ashby et al. | |
| 6,401,085 B1 | 6/2002 | Gershman et al. | |
| 6,408,307 B1 * | 6/2002 | Semple et al. | 707/724 |
| 6,498,982 B2 | 12/2002 | Bellesfield et al. | |
| 6,532,007 B1 | 3/2003 | Matsuda | |
| 6,542,813 B1 * | 4/2003 | Kovacs | 701/484 |
| 6,557,013 B1 | 4/2003 | Ziff et al. | |
| 6,615,039 B1 | 9/2003 | Eldering | |
| 6,629,136 B1 * | 9/2003 | Naidoo | 709/219 |
| 6,636,803 B1 * | 10/2003 | Hartz et al. | 701/459 |
| 6,643,663 B1 | 11/2003 | Dabney et al. | |
| 6,647,383 B1 | 11/2003 | August et al. | |
| 6,654,800 B1 * | 11/2003 | Rieger, III | 709/223 |
| 6,658,410 B1 * | 12/2003 | Sakamaki et al. | 1/1 |
| 6,662,016 B1 | 12/2003 | Buckham et al. | |
| 6,684,196 B1 * | 1/2004 | Mini et al. | 705/14.34 |
| 6,691,114 B1 * | 2/2004 | Nakamura | 1/1 |
| 6,716,101 B1 | 4/2004 | Meadows et al. | |
| 6,719,570 B2 | 4/2004 | Tsuchioka | |
| 6,721,748 B1 | 4/2004 | Knight et al. | |
| 6,745,196 B1 * | 6/2004 | Colyer et al. | 707/608 |
| 6,798,407 B1 | 9/2004 | Benman | |
| 6,834,229 B2 | 12/2004 | Rafiah et al. | |
| 6,882,307 B1 | 4/2005 | Gifford | |
| 6,950,791 B1 | 9/2005 | Bray et al. | |
| 6,968,179 B1 * | 11/2005 | De Vries | 455/414.1 |
| 6,968,513 B1 * | 11/2005 | Rinebold et al. | 715/854 |
| 6,987,976 B2 | 1/2006 | Kohar et al. | |
| 7,006,881 B1 | 2/2006 | Hoffberg et al. | |
| 7,024,455 B2 | 4/2006 | Yokobori et al. | |
| 7,069,308 B2 * | 6/2006 | Abrams | 709/218 |
| 7,080,019 B1 * | 7/2006 | Hurzeler | 705/6 |
| 7,080,096 B1 | 7/2006 | Imamura | |
| 7,085,650 B2 * | 8/2006 | Anderson | 702/2 |
| 7,136,915 B2 * | 11/2006 | Rieger, III | 709/223 |
| 7,158,878 B2 * | 1/2007 | Rasmussen et al. | 701/431 |
| 7,174,301 B2 * | 2/2007 | Florance et al. | 705/313 |
| 7,177,872 B2 | 2/2007 | Schwesig et al. | |
| 7,188,153 B2 | 3/2007 | Lunt et al. | |
| 7,251,647 B2 | 7/2007 | Hoblit | |
| 7,293,019 B2 | 11/2007 | Dumais et al. | |
| 7,296,026 B2 | 11/2007 | Patrick et al. | |
| 7,353,034 B2 * | 4/2008 | Haney | 455/457 |
| 7,359,871 B1 | 4/2008 | Paasche et al. | |
| 7,359,894 B1 * | 4/2008 | Liebman et al. | 1/1 |
| 7,383,251 B2 | 6/2008 | Might | |
| 7,386,542 B2 | 6/2008 | Maybury et al. | |
| 7,424,438 B2 | 9/2008 | Vianello | |
| 7,433,832 B1 | 10/2008 | Bezos et al. | |
| 7,433,868 B1 | 10/2008 | Satomi et al. | |
| 7,437,368 B1 | 10/2008 | Kolluri et al. | |
| 7,441,031 B2 * | 10/2008 | Shrinivasan et al. | 709/225 |
| 7,447,685 B2 * | 11/2008 | Nye | 1/1 |
| 7,447,771 B1 | 11/2008 | Taylor | |
| 7,477,285 B1 | 1/2009 | Johnson | |
| 7,478,324 B1 | 1/2009 | Ohtsu | |
| 7,487,114 B2 * | 2/2009 | Florance et al. | 705/27.2 |
| 7,505,919 B2 | 3/2009 | Richardson | |
| 7,562,023 B2 | 7/2009 | Yamamoto | |
| 7,587,276 B2 | 9/2009 | Gold et al. | |
| 7,680,673 B2 * | 3/2010 | Wheeler | 705/313 |
| 7,739,602 B2 * | 6/2010 | Feng et al. | 715/733 |
| 7,801,542 B1 | 9/2010 | Stewart | 455/518 |
| 7,812,717 B1 * | 10/2010 | Cona et al. | 340/506 |
| 7,827,120 B1 * | 11/2010 | Evans et al. | 705/344 |
| 7,958,011 B1 * | 6/2011 | Cretney et al. | 705/26.1 |
| 7,966,567 B2 * | 6/2011 | Abhyanker | 715/757 |
| 8,064,590 B2 * | 11/2011 | Abhyanker | 379/266.07 |
| 8,073,907 B2 * | 12/2011 | Roumeliotis et al. | 709/204 |
| 8,095,430 B2 * | 1/2012 | Abhyanker | 705/26.41 |
| 8,103,445 B2 * | 1/2012 | Smith et al. | 701/425 |
| 8,149,113 B2 * | 4/2012 | Diem | 340/539.13 |
| 8,190,357 B2 * | 5/2012 | Abhyanker et al. | 701/408 |
| 8,204,776 B2 * | 6/2012 | Abhyanker | 705/7.32 |
| 8,433,609 B2 * | 4/2013 | Abhyanker | 705/14.1 |
| 8,433,650 B1 * | 4/2013 | Thomas | 705/38 |
| 8,447,810 B2 * | 5/2013 | Roumeliotis et al. | 709/204 |
| 8,660,897 B2 * | 2/2014 | Abhyanker | 705/14.64 |
| 2001/0005829 A1 * | 6/2001 | Raveis, Jr. | 705/1 |
| 2001/0020955 A1 | 9/2001 | Nakagawa et al. | |
| 2001/0029501 A1 * | 10/2001 | Yokobori et al. | 707/10 |
| 2001/0036833 A1 | 11/2001 | Koshima et al. | |
| 2001/0042087 A1 | 11/2001 | Kephart et al. | |
| 2001/0049616 A1 | 12/2001 | Khuzadi et al. | |
| 2001/0049636 A1 | 12/2001 | Hudda et al. | |
| 2002/0026388 A1 | 2/2002 | Roebuck | |
| 2002/0030689 A1 | 3/2002 | Eichel et al. | |
| 2002/0038225 A1 | 3/2002 | Klasky et al. | |
| 2002/0049617 A1 | 4/2002 | Lencki et al. | |
| 2002/0065691 A1 * | 5/2002 | Twig et al. | 705/7 |
| 2002/0065739 A1 * | 5/2002 | Florance et al. | 705/26 |
| 2002/0070967 A1 * | 6/2002 | Tanner et al. | 345/764 |
| 2002/0077901 A1 | 6/2002 | Katz | |
| 2002/0078171 A1 | 6/2002 | Schneider | |
| 2002/0087506 A1 | 7/2002 | Reddy | |
| 2002/0090996 A1 | 7/2002 | Maehiro | |
| 2002/0091556 A1 | 7/2002 | Fiala et al. | |
| 2002/0097267 A1 | 7/2002 | Dinan et al. | |
| 2002/0103892 A1 * | 8/2002 | Rieger, III | 709/223 |
| 2002/0130906 A1 * | 9/2002 | Miyaki | 345/837 |
| 2002/0147638 A1 | 10/2002 | Banerjee et al. | |
| 2002/0156917 A1 * | 10/2002 | Nye | 709/238 |
| 2002/0169662 A1 | 11/2002 | Claiborne | |
| 2002/0184496 A1 | 12/2002 | Mitchell et al. | |
| 2003/0004802 A1 | 1/2003 | Callegari | |
| 2003/0005035 A1 | 1/2003 | Rodgers | |
| 2003/0018521 A1 * | 1/2003 | Kraft et al. | 705/14 |
| 2003/0023489 A1 | 1/2003 | McGuire et al. | |
| 2003/0023586 A1 * | 1/2003 | Knorr | 707/3 |
| 2003/0033176 A1 * | 2/2003 | Hancock | 705/6 |
| 2003/0064705 A1 | 4/2003 | Desiderio | 455/412 |
| 2003/0078897 A1 * | 4/2003 | Florance et al. | 705/80 |
| 2003/0154213 A1 * | 8/2003 | Ahn | 707/103 X |
| 2003/0177019 A1 * | 9/2003 | Santos et al. | 705/1 |
| 2003/0177192 A1 | 9/2003 | Umeki et al. | |
| 2003/0200192 A1 * | 10/2003 | Bell et al. | 707/1 |
| 2003/0218253 A1 | 11/2003 | Avanzino et al. | |
| 2003/0220807 A1 * | 11/2003 | Hoffman et al. | 705/1 |
| 2004/0002871 A1 * | 1/2004 | Geranio | 705/1 |
| 2004/0021584 A1 * | 2/2004 | Hartz et al. | 340/995.24 |
| 2004/0030525 A1 | 2/2004 | Robinson et al. | |
| 2004/0030741 A1 | 2/2004 | Wolton et al. | |
| 2004/0039581 A1 * | 2/2004 | Wheeler | 705/1 |
| 2004/0054428 A1 * | 3/2004 | Sheha et al. | 700/56 |
| 2004/0109012 A1 | 6/2004 | Kraus et al. | |
| 2004/0111302 A1 | 6/2004 | Falk et al. | |
| 2004/0128215 A1 * | 7/2004 | Florance et al. | 705/28 |
| 2004/0135805 A1 | 7/2004 | Gottsacker et al. | |
| 2004/0139049 A1 * | 7/2004 | Hancock et al. | 707/1 |
| 2004/0153466 A1 * | 8/2004 | Ziff et al. | 707/100 |
| 2004/0158488 A1 * | 8/2004 | Johnson | 705/14 |
| 2004/0162064 A1 * | 8/2004 | Himmelstein | 455/422.1 |
| 2004/0166878 A1 | 8/2004 | Erskine et al. | |
| 2004/0167787 A1 | 8/2004 | Lynch et al. | |
| 2004/0186766 A1 | 9/2004 | Fellenstein et al. | |
| 2004/0215559 A1 | 10/2004 | Rebenack et al. | |
| 2004/0215793 A1 * | 10/2004 | Ryan et al. | 709/229 |
| 2004/0217884 A1 | 11/2004 | Samadani et al. | |
| 2004/0217980 A1 | 11/2004 | Radburn et al. | |
| 2004/0220906 A1 * | 11/2004 | Gargi et al. | 707/3 |
| 2004/0249700 A1 * | 12/2004 | Gross | 705/10 |
| 2004/0257340 A1 | 12/2004 | Jawerth | |
| 2004/0260604 A1 * | 12/2004 | Bedingfield, Sr. | 705/14 |
| 2004/0267625 A1 * | 12/2004 | Feng et al. | 705/26 |
| 2005/0018177 A1 | 1/2005 | Rosenberg et al. | |

(56) References Cited

U.S. PATENT DOCUMENTS

| | | |
|---|---|---|
| 2005/0021750 A1* | 1/2005 | Abrams ................... 709/225 |
| 2005/0027723 A1 | 2/2005 | Jones et al. |
| 2005/0034075 A1* | 2/2005 | Riegelman et al. ........ 715/714 |
| 2005/0044061 A1 | 2/2005 | Klemow |
| 2005/0049971 A1* | 3/2005 | Bettinger ................. 705/51 |
| 2005/0055353 A1* | 3/2005 | Marx et al. ............... 707/10 |
| 2005/0075983 A1* | 4/2005 | St.-Denis ................. 705/64 |
| 2005/0091027 A1 | 4/2005 | Zaher et al. |
| 2005/0096977 A1 | 5/2005 | Rossides |
| 2005/0114783 A1* | 5/2005 | Szeto ..................... 715/747 |
| 2005/0131761 A1 | 6/2005 | Trika et al. |
| 2005/0137015 A1 | 6/2005 | Rogers et al. |
| 2005/0143174 A1 | 6/2005 | Goldman et al. |
| 2005/0149432 A1* | 7/2005 | Galey ..................... 705/38 |
| 2005/0171832 A1 | 8/2005 | Hull et al. |
| 2005/0171954 A1 | 8/2005 | Hull et al. |
| 2005/0187823 A1 | 8/2005 | Howes |
| 2005/0192859 A1 | 9/2005 | Mertins et al. |
| 2005/0192912 A1 | 9/2005 | Bator et al. |
| 2005/0192999 A1 | 9/2005 | Cook et al. |
| 2005/0197775 A1* | 9/2005 | Smith ..................... 702/3 |
| 2005/0197846 A1* | 9/2005 | Pezaris et al. ............ 705/1 |
| 2005/0203768 A1* | 9/2005 | Florance et al. .......... 705/1 |
| 2005/0216186 A1 | 9/2005 | Dorfman et al. |
| 2005/0235062 A1* | 10/2005 | Lunt et al. ................ 709/225 |
| 2005/0240580 A1 | 10/2005 | Zamir et al. |
| 2005/0251331 A1* | 11/2005 | Kreft ...................... 701/207 |
| 2005/0273346 A1* | 12/2005 | Frost ...................... 705/1 |
| 2005/0283497 A1 | 12/2005 | Nurminen et al. |
| 2005/0288957 A1* | 12/2005 | Eraker et al. ............ 705/1 |
| 2005/0288958 A1* | 12/2005 | Eraker et al. ............ 705/1 |
| 2006/0004703 A1 | 1/2006 | Spivack et al. |
| 2006/0004734 A1 | 1/2006 | Malkin et al. |
| 2006/0022048 A1* | 2/2006 | Johnson ................... 235/462.1 |
| 2006/0023881 A1 | 2/2006 | Akiyama et al. |
| 2006/0036748 A1* | 2/2006 | Nusbaum et al. ......... 709/228 |
| 2006/0089882 A1 | 4/2006 | Shimansky |
| 2006/0123053 A1 | 6/2006 | Scannell |
| 2006/0136127 A1* | 6/2006 | Coch et al. ............... 701/208 |
| 2006/0136419 A1* | 6/2006 | Brydon et al. ............ 707/9 |
| 2006/0149624 A1 | 7/2006 | Baluja et al. |
| 2006/0178972 A1 | 8/2006 | Jung et al. |
| 2006/0190279 A1* | 8/2006 | Heflin .................... 705/1 |
| 2006/0200311 A1* | 9/2006 | Arutunian et al. ......... 701/210 |
| 2006/0200384 A1* | 9/2006 | Arutunian et al. ......... 705/14 |
| 2006/0238383 A1* | 10/2006 | Kimchi et al. ........... 340/995.1 |
| 2006/0248573 A1* | 11/2006 | Pannu et al. ............. 726/1 |
| 2006/0270421 A1* | 11/2006 | Phillips et al. ........... 455/457 |
| 2007/0002057 A1 | 1/2007 | Danzig et al. |
| 2007/0003182 A1 | 1/2007 | Hunn |
| 2007/0011148 A1 | 1/2007 | Burkey et al. |
| 2007/0011617 A1 | 1/2007 | Akagawa et al. |
| 2007/0033064 A1 | 2/2007 | Abrahamsohn |
| 2007/0078747 A1* | 4/2007 | Baack ..................... 705/37 |
| 2007/0105536 A1* | 5/2007 | Tingo ..................... 455/414.1 |
| 2007/0106627 A1 | 5/2007 | Srivastava et al. |
| 2007/0112729 A1* | 5/2007 | Wiseman et al. ......... 707/3 |
| 2007/0150375 A1 | 6/2007 | Yang |
| 2007/0150603 A1 | 6/2007 | Crull et al. |
| 2007/0156429 A1* | 7/2007 | Godar .................... 705/1 |
| 2007/0162547 A1* | 7/2007 | Ross ...................... 709/204 |
| 2007/0162942 A1* | 7/2007 | Hamynen et al. ......... 725/105 |
| 2007/0167204 A1 | 7/2007 | Lyle et al. |
| 2007/0208802 A1* | 9/2007 | Barman et al. ........... 709/203 |
| 2007/0218900 A1* | 9/2007 | Abhyanker ............... 455/435.1 |
| 2007/0219659 A1* | 9/2007 | Abhyanker et al. ....... 700/98 |
| 2007/0219712 A1* | 9/2007 | Abhyanker ............... 701/208 |
| 2007/0220174 A1* | 9/2007 | Abhyanker ............... 709/250 |
| 2007/0233291 A1 | 10/2007 | Herde et al. |
| 2007/0233367 A1* | 10/2007 | Chen et al. .............. 701/207 |
| 2007/0233375 A1 | 10/2007 | Garg et al. |
| 2007/0233582 A1* | 10/2007 | Abhyanker ............... 705/28 |
| 2007/0239552 A1* | 10/2007 | Sundaresan ............. 705/26 |
| 2007/0245002 A1* | 10/2007 | Nguyen et al. ........... 709/223 |
| 2007/0250321 A1 | 10/2007 | Balusu |
| 2007/0260599 A1* | 11/2007 | McGuire et al. ......... 707/5 |
| 2007/0266097 A1* | 11/2007 | Harik et al. ............. 709/204 |
| 2007/0273558 A1* | 11/2007 | Smith et al. ............. 340/995.1 |
| 2007/0281689 A1* | 12/2007 | Altman et al. ........... 455/435.1 |
| 2007/0288621 A1 | 12/2007 | Gundu et al. |
| 2007/0294357 A1* | 12/2007 | Antoine .................. 709/206 |
| 2008/0005231 A1 | 1/2008 | Kelley et al. |
| 2008/0020814 A1 | 1/2008 | Kernene |
| 2008/0032666 A1* | 2/2008 | Hughes et al. ........... 455/404.1 |
| 2008/0032703 A1 | 2/2008 | Krumm et al. |
| 2008/0051932 A1 | 2/2008 | Jermyn et al. |
| 2008/0070593 A1* | 3/2008 | Altman et al. ........... 455/457 |
| 2008/0071929 A1 | 3/2008 | Motte et al. |
| 2008/0077642 A1* | 3/2008 | Carbone et al. ......... 707/E17.14 |
| 2008/0086368 A1 | 4/2008 | Bauman et al. |
| 2008/0086458 A1* | 4/2008 | Robinson et al. ........ 707/3 |
| 2008/0091723 A1 | 4/2008 | Zuckerberg et al. |
| 2008/0097999 A1* | 4/2008 | Horan .................... 707/10 |
| 2008/0104227 A1* | 5/2008 | Birnie et al. ............ 709/224 |
| 2008/0115082 A1 | 5/2008 | Simmons et al. |
| 2008/0117928 A1* | 5/2008 | Abhyanker ............... 370/431 |
| 2008/0126355 A1 | 5/2008 | Rowley |
| 2008/0126476 A1 | 5/2008 | Nicholas et al. |
| 2008/0126478 A1 | 5/2008 | Ferguson et al. |
| 2008/0148156 A1* | 6/2008 | Brewer et al. ........... 715/738 |
| 2008/0154733 A1 | 6/2008 | Wolfe |
| 2008/0155019 A1 | 6/2008 | Wallace et al. |
| 2008/0162211 A1 | 7/2008 | Addington |
| 2008/0162260 A1 | 7/2008 | Rohan et al. |
| 2008/0168068 A1* | 7/2008 | Hutheesing ............. 707/10 |
| 2008/0168175 A1* | 7/2008 | Tran ...................... 709/229 |
| 2008/0172173 A1* | 7/2008 | Chang et al. ............ 701/207 |
| 2008/0172288 A1 | 7/2008 | Pilskalns et al. |
| 2008/0201156 A1* | 8/2008 | Abhyanker ............... 705/1 |
| 2008/0208956 A1 | 8/2008 | Spiridellis et al. |
| 2008/0215994 A1 | 9/2008 | Harrison et al. |
| 2008/0221846 A1 | 9/2008 | Aggarwal et al. |
| 2008/0221984 A1* | 9/2008 | Abhyanker ............... 705/14 |
| 2008/0222308 A1* | 9/2008 | Abhyanker ............... 709/245 |
| 2008/0228719 A1* | 9/2008 | Abhyanker et al. ...... 707/3 |
| 2008/0228775 A1* | 9/2008 | Abhyanker et al. ...... 707/10 |
| 2008/0229424 A1* | 9/2008 | Harris et al. ............ 726/26 |
| 2008/0231630 A1 | 9/2008 | Shenkar et al. |
| 2008/0240397 A1* | 10/2008 | Abhyanker ............... 379/218.01 |
| 2008/0242317 A1* | 10/2008 | Abhyanker ............... 455/456.3 |
| 2008/0243598 A1* | 10/2008 | Abhyanker ............... 705/12 |
| 2008/0243667 A1 | 10/2008 | Lecomte |
| 2008/0250025 A1* | 10/2008 | Abhyanker ............... 707/10 |
| 2008/0255759 A1* | 10/2008 | Abhyanker ............... 701/209 |
| 2008/0263460 A1 | 10/2008 | Altberg et al. |
| 2008/0270158 A1* | 10/2008 | Abhyanker ............... 705/1 |
| 2008/0270945 A1* | 10/2008 | Abhyanker ............... 715/848 |
| 2008/0281854 A1* | 11/2008 | Abhyanker ............... 707/102 |
| 2008/0288277 A1 | 11/2008 | Fasciano |
| 2008/0294678 A1* | 11/2008 | Gorman et al. .......... 707/102 |
| 2008/0294747 A1* | 11/2008 | Abhyanker ............... 709/218 |
| 2008/0300979 A1* | 12/2008 | Abhyanker ............... 705/14 |
| 2008/0301565 A1* | 12/2008 | Abhyanker ............... 715/744 |
| 2008/0306754 A1* | 12/2008 | Abhyanker ............... 705/1 |
| 2008/0307053 A1 | 12/2008 | Mitnick et al. |
| 2008/0307066 A1 | 12/2008 | Amidon et al. |
| 2008/0307320 A1 | 12/2008 | Payne et al. |
| 2008/0319778 A1* | 12/2008 | Abhyanker ............... 705/1 |
| 2008/0319806 A1* | 12/2008 | Abhyanker ............... 705/5 |
| 2009/0003265 A1 | 1/2009 | Agarwal et al. |
| 2009/0006177 A1 | 1/2009 | Beaver et al. |
| 2009/0006473 A1 | 1/2009 | Elliott et al. |
| 2009/0007195 A1 | 1/2009 | Beyabani |
| 2009/0015582 A1* | 1/2009 | Abhyanker ............... 345/419 |
| 2009/0018850 A1* | 1/2009 | Abhyanker ............... 705/1 |
| 2009/0018925 A1* | 1/2009 | Abhyanker ............... 705/26 |
| 2009/0019004 A1* | 1/2009 | Abhyanker ............... 707/3 |
| 2009/0019085 A1* | 1/2009 | Abhyanker ............... 707/104.1 |
| 2009/0019122 A1* | 1/2009 | Abhyanker ............... 709/206 |
| 2009/0019366 A1* | 1/2009 | Abhyanker ............... 715/706 |
| 2009/0019373 A1* | 1/2009 | Abhyanker ............... 715/751 |
| 2009/0024740 A1* | 1/2009 | Abhyanker ............... 709/225 |
| 2009/0030927 A1 | 1/2009 | Cases et al. |
| 2009/0031006 A1 | 1/2009 | Johnson |

(56) References Cited

U.S. PATENT DOCUMENTS

| | | | |
|---|---|---|---|
| 2009/0031245 A1 | 1/2009 | Brezina et al. | |
| 2009/0043650 A1* | 2/2009 | Abhyanker et al. | 705/14 |
| 2009/0044254 A1 | 2/2009 | Tian | |
| 2009/0061883 A1* | 3/2009 | Abhyanker | 455/445 |
| 2009/0061902 A1* | 3/2009 | Abhyanker | 455/456.3 |
| 2009/0063252 A1* | 3/2009 | Abhyanker | 705/10 |
| 2009/0063467 A1* | 3/2009 | Abhyanker | 707/5 |
| 2009/0063500 A1 | 3/2009 | Zhai et al. | |
| 2009/0063565 A1* | 3/2009 | Abhyanker | 707/104.1 |
| 2009/0064011 A1* | 3/2009 | Abhyanker | 715/764 |
| 2009/0064144 A1* | 3/2009 | Abhyanker | 718/100 |
| 2009/0069034 A1* | 3/2009 | Abhyanker | 455/456.3 |
| 2009/0070435 A1* | 3/2009 | Abhyanker | 709/218 |
| 2009/0254971 A1 | 10/2009 | Herz et al. | |
| 2009/0284530 A1 | 11/2009 | Lester et al. | |
| 2010/0024045 A1 | 1/2010 | Sastry et al. | |
| 2011/0035401 A1* | 2/2011 | Nye | 707/769 |
| 2011/0066648 A1* | 3/2011 | Abhyanker et al. | 707/770 |
| 2011/0093340 A1 | 4/2011 | Kramer et al. | |
| 2011/0184643 A1* | 7/2011 | Abhyanker | 701/201 |
| 2011/0219318 A1* | 9/2011 | Abhyanker | 715/757 |
| 2011/0291851 A1* | 12/2011 | Whisenant | 340/686.1 |
| 2012/0166935 A1* | 6/2012 | Abhyanker | 715/234 |
| 2013/0054317 A1* | 2/2013 | Abhyanker | 705/14.4 |
| 2013/0072114 A1* | 3/2013 | Abhyanker | 455/41.1 |
| 2013/0073375 A1* | 3/2013 | Abhyanker | 705/14.39 |
| 2013/0080217 A1* | 3/2013 | Abhyanker | 705/14.1 |

OTHER PUBLICATIONS

Dan Kaplan. May 28, 2007 9:48 PM Fatdoor turns neighborhoods into online social networks. Venturebeat. http://venturebeat.com/2007/05/28/fatdoor-turns-neighborhoods-into-online-social-networks/.* fatdoor.com (alpha). Jun. 23, 2007. Netcentric Advocacy. http://www.network-centricadvocacy.net/2007/06/fatdoorcom-alph.html.*

Frontporchforum. Screenshots. Jul. 19, 2006. Webarchive.org. 1-15.*

* cited by examiner

| USER 1200 | VERIFIED? 1202 | RANGE 1204 | PRINCIPAL ADDRESS 1206 | LINKS 1208 | CONTRIBUTED? 1210 | OTHERS 1212 |
|---|---|---|---|---|---|---|
| JOE | YES | 5 MILES | 500 CLIFFORD, CUPERTINO CA | 858, BETTE, 854 BETTE | 858, BETTE, 10954 FARALLONE | CITY, STATE, ZIP, OTHER |
| JANE | NO | NOT ENABLED | 500 JOHNSON, CUPERTINO CA | 851 BETTE, 100 STEVEN'S ROAD | 500 HAMILTON, 1905 E. UNIVERSITY | - - - |
| ● | ● | ● | ● | ● | ● | ● |
| ● | ● | ● | ● | ● | ● | ● |
| ● | ● | ● | ● | ● | ● | ● |

TABLE 1250

FIGURE 12

CLAIM YOUR GEOGRAPHIC LOCATION

WHICH ADDRESS ARE CLAIMING :

[ 201 BENSON AVE ] —2002

DO YOU WANT TO DELIST THIS PROBLEM [ NO ▼ ]—2004

ABOUT YOU

UPLOAD PICTURE [ FAMILY PIC ▼ ]

PLEASE NOTE : YOU WILL NEED TO SUBMIT PROOF OF OWNERSHIP/ RESIDENCE IF DISPUTED —2006

CLAIM VIEW 2050

FIGURE 20

| EMAIL ADDRESS: | | |—2502
|---|---|
| REPEAT EMAIL ADDRESS: | |
| FIRST NAME: | |
| LAST NAME: | |
| PASSWORD: | |
| REPEAT PASSWORD: | |
| GENDER: | O MALE   O FEMALE |
| INTERESTED IN MEETING PEOPLE FOR: | |
| ☑ HOBBIES             O FAMILIES  O SINGLES | |
| ☑ NEIGHBORHOOD WATCH  O STUDENTS | |
| ☑ FRIENDS<br>☑ HELP | |
| ☐ JUST HERE FOR HELP | |

DID A NEIGHBOR REFER YOU TO FATDOOR?
NEIGHBORS EMAIL ADDRESS: [       ]
(TO AUTOMATICALLY CONNECT TO YOUR NEIGHBOR AND YOUR NEIGHBOR'S FRIENDS.)

| GROUPS: | O RAJ FOR CITY COUNCIL<br>O GREEN PEACE<br>O BARRACK OBAMA FOR PRESIDENT<br>O NEIGHBORHOOD PROTECTORS CLUB |
|---|---|
| DATE OF BIRTH: | [▼] [▼] [▼] |
| COUNTRY: | [▼] |
| ZIP/POSTAL CODE: | [    ]  (U.S. & CANADA ONLY) |
| HOME TOWN: | [    ]  (WHERE YOU GREW UP) |
| OCCUPATION: | [    ] |
| INTERESTS: | (SEPARATE INTERESTS WITH COMMAS)<br>[    ] |

2202 — USER INTERFACE

GEO-SPATIALLY CONSTRAINED PRIVATE NEIGHBORHOOD SOCIAL NETWORK

CLAIMS OF PRIORITY

This patent application is a Continuation patent application to:

(1) U.S. Utility patent application Ser. No. 11/653,194 titled 'LODGING AND REAL PROPERTY IN A GEO-SPATIAL MAPPING ENVIRONMENT' filed on Jan. 12, 2007, and the provisional and utility cases to which this case depends.

FIELD OF TECHNOLOGY

This disclosure relates generally to the technical fields of communications and, in one example embodiment, to a method, apparatus, and system of a geo-spatially constrained private neighborhood social network.

BACKGROUND

A neighborhood may be a geographically localized community in a larger city, town, and/or suburb. Residents of the neighborhood may refer to each other as neighbors, although this term may also be used across much larger distances in rural areas. In theory, the neighborhood may be small enough that the neighbors may be able to know each other by walking and/or driving a short distance (e.g., 5 miles) around their place of residence and/or their place of work. However, in practice, the neighbors may not know one another very well (e.g., because of busy schedules, fenced communities, lack of effort, a lack of time, etc.).

The neighborhood may be given a designated status through a neighborhood association, a neighborhood watch group, a political group, a homeowners association, and/or a tenant association. These groups may help in matters such as lawn care and fence height, and they may provide such services as block parties, neighborhood parks, children activities, special interest groups, and/or community security. However, getting messages out to residents of the neighborhood may require expensive direct mail, and/or time consuming door to door meetings with residents of the neighborhood.

A neighborhood watch (e.g., a crime watch, a block watch, a neighborhood crime watch, etc.) may be an organization of active residents devoted to crime and/or vandalism prevention in the neighborhood. Members of the neighborhood watch may stay alert of unusual activity, behaviors, and/or crime in the neighborhood. However, most residents may not be active participants of the neighborhood association (e.g., because of a lack of time), and may be unaware of safety, security, and/or prevention issues in their immediate area.

For example, in many American communities, while a few active residents know a lot of their neighbors, there are far more residents who do not even know what professions, interests, and reputations are of their immediate next-door neighbors. As a result, friendships among neighbors don't form as often, neighbors have more difficult time asking other neighbors for help, safety in the neighborhood suffers, quality of life is impacted, and a sense of community is diminishing.

BRIEF DESCRIPTION OF THE DRAWINGS

Example embodiments are illustrated by way of example and not limitation in the figures of the accompanying drawings, in which like references indicate similar elements and in which:

FIG. 12 is a table view of user address details, according to one embodiment.

FIG. 20 is a user interface view of claim view, according to one embodiment.

FIG. 25 is an exemplary graphical user interface view for data collection, according to one embodiment.

Figure 1:
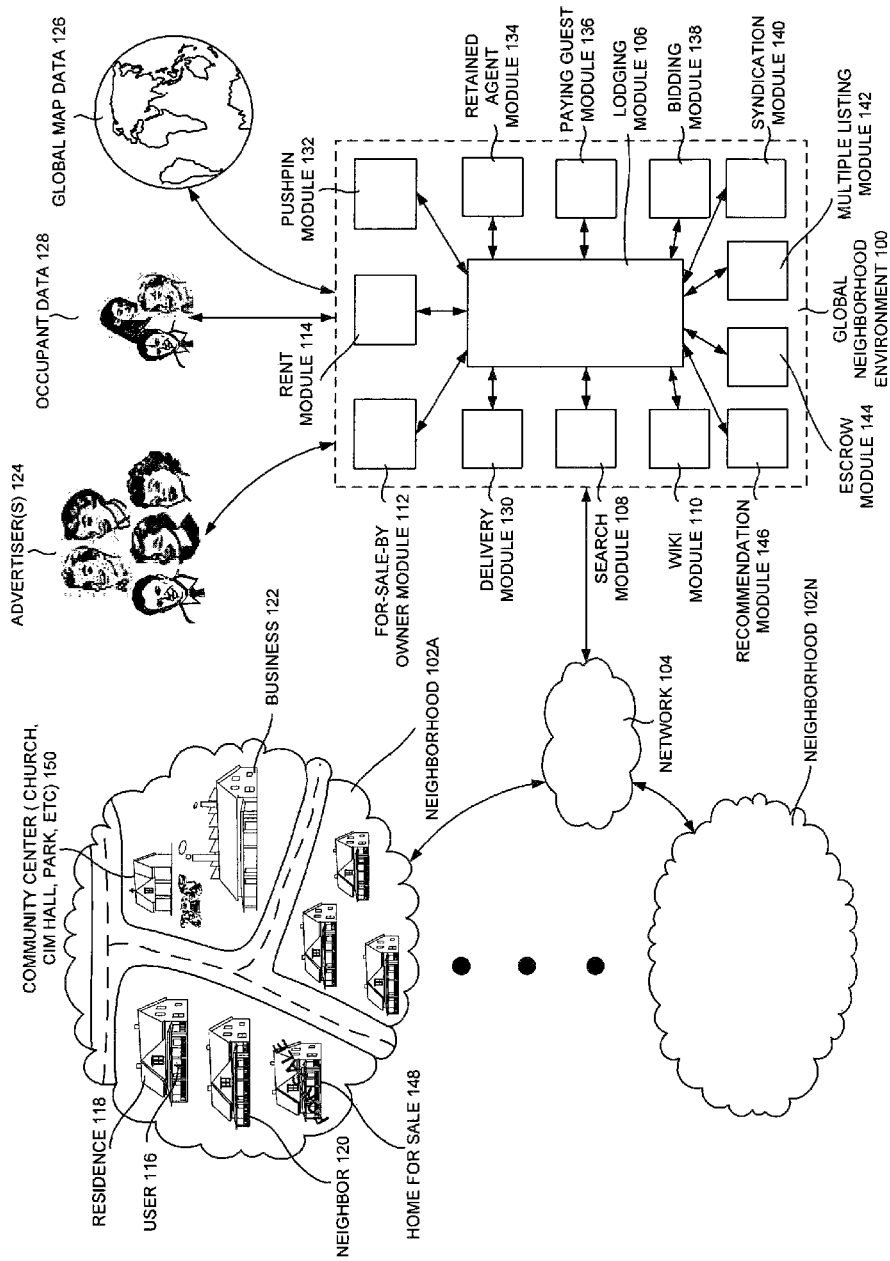
FIG. 1 is a system view of a global neighborhood environment communicating with the neighborhood(s) through a network, according to one embodiment.

Other features of the present embodiments will be apparent from the accompanying drawings and from the detailed description that follows.

SUMMARY

Disclosed are a method and system an online neighborhood social network designed to create private websites to facilitate communication among neighbors and build stronger neighborhoods. The private websites are embodied in a website having a domain name of nextdoor.com. For example, a method that verifies that a user lives at a residence associated with a residential address claimed by the user of an online neighborhood social network is claimed. The method restricts access to a particular neighborhood to the user and to neighboring users living within the neighborhood boundary of the residence. A social network page of the user is created once verified and access privileges are determined. A message is distributed to neighboring users that are verified to live within a neighborhood boundary of the residence. The method may designate the user as a lead user with an additional privilege based on a participation level of the user in the online community.

Furthermore, in one aspect, a system of a global neighborhood environment includes a computer server of the global neighborhood environment (1) to verify that a user lives at a residence associated with a geographic location claimed by the user of the global neighborhood environment using a processor and a memory, (2) to create a social network page of the user once verified, (3) to enable the user to constrain a communication to neighboring users within a geospatial vicinity of the residence of the user based on a neighborhood boundary, and (4) to distribute a message in a distance away from the residence of the user based on the neighborhood boundary (5) to provide an additional privilege as a lead user in the online community of the global neighborhood environment based on a participation level of the user in the online community or an activity level of the user associated with encouraging neighbors to participate in the online community and (6) to automatically determine a set of access privileges in the online community associated with each user of the online community by constraining access in private web sites of the online community to neighboring users based on each residence associated with each geographic location claimed by each user of the global neighborhood environment. The global neighborhood environment formed through the computer server is named nextdoor.com in this aspect.

The computer server may permit the user to set a privacy setting associated with a profile data of the user such that certain information is marked as private and is therefore masked from being visible to neighboring users of the online community in the global neighborhood environment. The computer server may permit the user to provide a recommendation or an event suggestion to neighboring users based on the residence associated with the geographic location claimed by the user of the global neighborhood environment. The computer server may permit the user of the global neighborhood environment to mark certain information communicated directly to a particular neighboring user as private (e.g., such that privately shared information is shared only with the particular neighboring user and is designated as non-public to other neighboring users of the online community).

The computer server may filter information to only display messages from a particular neighborhood associated with each verified user. The computer server may permit private posts only in the particular neighborhood to verified users having verified addresses within the neighborhood. The computer server may utilize a postcard method through which the computer server generates a physical postcard that is postal mailed to verify addresses of requesting users in a particular neighborhood of the social network. The global neighborhood environment is designed to create private websites to facilitate communication among neighbors and build stronger neighborhoods.

In another aspect, a computer server (1) to verify that a user lives at a residence associated with a geographic location claimed by the user of an online neighborhood social network using a processor and a memory, (2) to create a social network page of the user once verified in the online neighborhood social network, (3) to enable the user to constrain communications to neighboring users in a geospatial vicinity of the residence of the user based on a neighborhood boundary of the online neighborhood social network, (4) wherein the user is provided an additional privilege as a lead user in the online neighborhood social network based on a participation level of the user in the online neighborhood social network and/or an activity level of the user associated with encouraging neighbors to participate in the online neighborhood social network, (5) to automatically determine a set of access privileges in the online neighborhood social network associated with the neighborhood boundary of the online neighborhood social network by constraining access in a private website in the online neighborhood social network to the user and to neighboring users of the user based on each residence associated with each geographic location claimed by each user of the online neighborhood social network verified to live within the neighborhood boundary. The online neighborhood social network has a domain name of nextdoor.com.

The computer server may permit the user to set a privacy setting associated with a profile data such that certain information is marked as private in the online neighborhood social network and is therefore masked from being visible to neighboring users of the online neighborhood social network. The computer server may permit the user to provide a recommendation to neighboring users based on the residence associated with the geographic location claimed by the user of the online neighborhood social network. The computer server may permit the user of the online neighborhood social network to mark certain information communicated directly to a particular neighboring user as private, such that privately shared information is shared only with the particular neighboring user and is designated as non-public to other neighboring users of the online neighborhood social network.

The computer server may filter information to only display messages from a particular neighborhood associated with each verified user. The computer server may permit private posts only in the particular neighborhood to verified users having verified addresses within a particular neighborhood boundary associated with the particular neighborhood. The computer server may utilize a postcard method through which the computer server generates a physical postcard that is postal mailed to verify addresses of neighboring users living within the neighborhood boundary of the online neighborhood social network. The online neighborhood social network may be designed to create private websites to facilitate communication among neighbors and build stronger neighborhoods.

In yet another aspect, a method includes verifying that a user lives at a residence associated with a residential address claimed by the user of an online neighborhood social network using a processor and a memory, creating a social network page of the user once verified in the online neighborhood social network, distributing a message from the user to neighboring users that are verified to live within a neighborhood boundary of the residence, designating the user as a lead user having an additional privilege in a private website of the online neighborhood social network confined by the neighborhood boundary based on at least one of a participation level of the user in the online neighborhood social network and an activity level of the user associated with encouraging neighboring users to participate in the online neighborhood social network, automatically determining a set of access privileges in the private website of the online neighborhood social network associated with the user, and restricting access to a particular neighborhood in the private website of the online neighborhood social network to the user and to neighboring users living within the neighborhood boundary of the residence.

The neighboring users are determined based on each residence associated with each geographic location claimed by each neighboring user of the online neighborhood social network that is within the neighborhood boundary. In this yet another aspect, the online neighborhood social network has a domain name of nextdoor.com. The method may include permitting the user to set a privacy setting associated with a profile data such that certain information is marked as private in the online neighborhood social network and is therefore masked from being visible to neighboring users of the online neighborhood social network. The method may include distributing a recommendation of the user to neighboring users based on the residence associated with the geographic location claimed by the user of the online neighborhood social network. In addition, the method may publish an event listing posted by the user to neighboring users based on the residence associated with the geographic location claimed by the user of the online neighborhood social network.

The method may permit the user of the online neighborhood social network to mark certain information communicated to a particular neighboring user as private (e.g., may be designated as non-public to other neighboring users of the online neighborhood social network). The method may filter information to only display messages from a particular neighborhood associated with each verified user. The method may permit private posts only in the particular neighborhood to verified users having verified addresses within the neighborhood boundary.

The method may utilize a postcard method through which the computer server generates a physical postcard that is postal mailed to verify addresses of neighboring users living within the neighborhood boundary of the online neighborhood social network. The online neighborhood social network may be designed to create private websites to facilitate communication among neighbors and build stronger neighborhoods. The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

DETAILED DESCRIPTION

A method, apparatus and system of a geo-spatially constrained private neighborhood social network is disclosed. In the following description, for the purposes of explanation, numerous specific details are set forth in order to provide a thorough understanding of the various embodiments. It will be evident, however to one skilled in the art that the various embodiments may be practiced without these specific details.

People in suburbia and urban cities now may not even know who their neighbors are. Communities have become more insular. There may be a few active people in each neighborhood who know about their neighborhood and are willing to share what they know with others. They should be able to share this information with others through the Internet. Many people want to know who their neighbors are and express themselves and their families through the internet. People want to also know about recommendations and what kind of civic and cultural things are in the neighborhood. What is contemplated includes: A social network for people who want to get to know their neighbors and/or neighborhoods. Particularly, one in which a set of maps of neighborhoods (e.g., such as those on Zillow.com or provided through Google® or Microsoft®) are used as a basis on which a user can identify themselves with a particular address. This address may be verified through one or more of the modules on FIG. 6. Particularly, this address may be the current address of the user is living, a previous address where the user used to live, etc.

The address may be verified through a credit check of the user, or a copy of the user's drivers license. Once the user is approved in a particular home/location, the user can leave their comments about their home. They can mark their home information proprietary, so that no one else can contribute to their info without their permission. They can have separate private and public sections, in which the private section is shared with only verified addresses of neighbors, and the public section is shared with anybody viewing their profile. The user can then create separate social networking pages for homes, churches, locations, etc. surrounding his verified address. As such, the user can express him/herself through their profile, and contribute information about what they're neighborhood is like and who lives there. Only verified individuals or entities might be able to view information in that neighborhood.

The more information the user contributes, the higher his or her status will be in the neighborhood through a marker (e.g., a number of stars), or through additional services offered to the neighbor, such as the ability to search a profiles of neighbors in a larger distance range from a verified address of the user. For example, initially, the user may only be able to search profiles within 1 mile on their principal, current home after being verified as living in there. When they create a profiles for themselves and/or contribute profiles of other people, they may widen their net of private profiles they may be allowed to search (e.g., because they become a trusted party in the neighborhood by offering civic information). Neighbors can leave feedback for each other, and arrange private block parties, etc. through their private profile. All these features may possible through one or more of the embodiments and/or modules illustrated in FIGS. 1-28. Through their public profile, neighbors can know if there is a doctor living down the street, or an attorney around the corner. The FIGS. 6-34 illustrate various embodiments that may be realized. While a description is given here, a self-evident description can be derived for the software and various methods, software, and hardware directly from the attached Figures.

Figure 6:
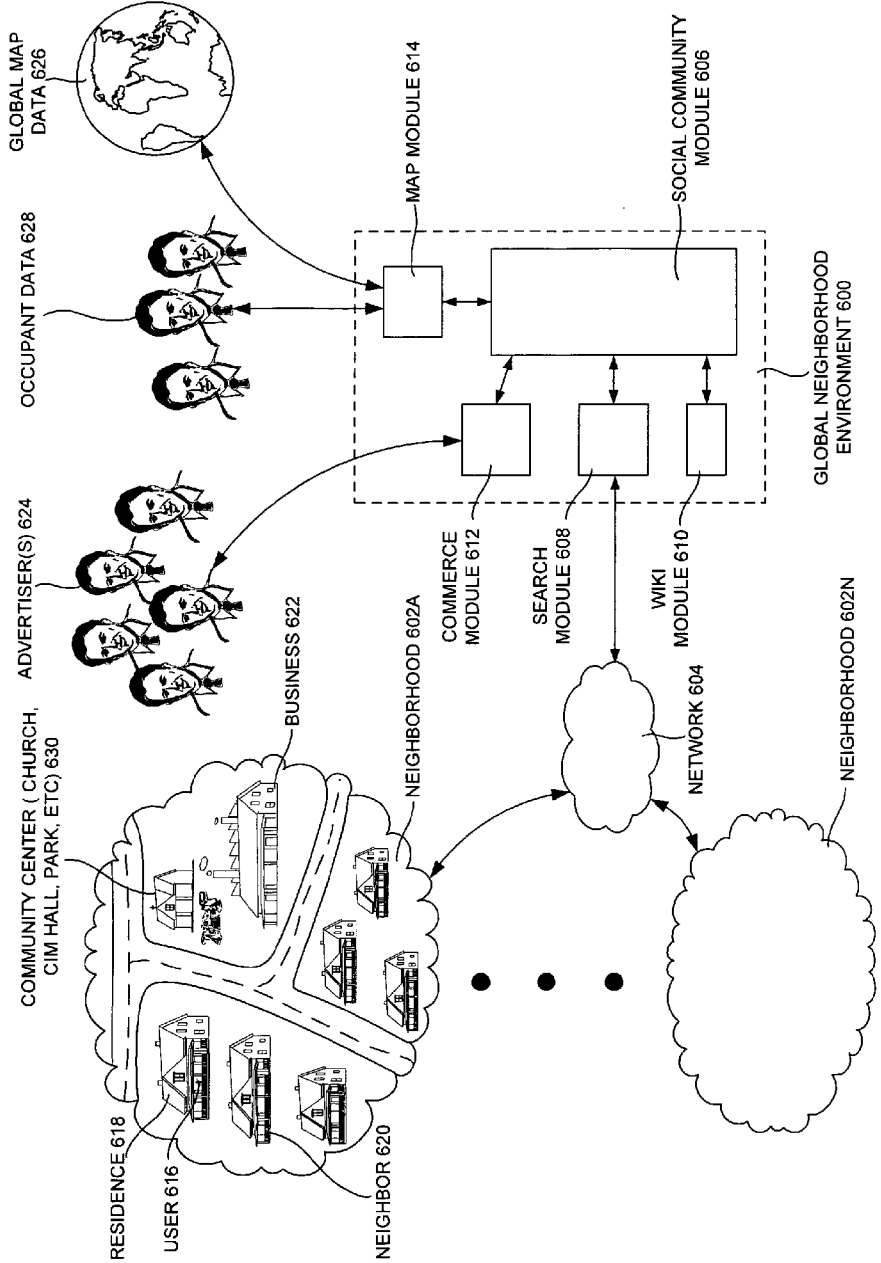
FIG. 6 is a system view of a global neighborhood environment communicating with the neighborhood(s) through a network, an advertiser(s), a global map data and an occupant data, according to one embodiment.

A neighborhood expression and user contribution system is disclosed. In one aspect, the technology allows users to see the value of millions of homes across the United States and/or the world, not just those that the user themselves own or live in, because they can share information about their neighbors. People living in apartments or condos can use the apartment/condo modeler wizard (e.g., as illustrated in FIG. 6) to create models (e.g. 2 or 3d) of their building and share information about their apartment/home and of their neighbors with others. The technology has an integrated targeted advertising system for enabling advertisers to make money through the social community module 100 by delivering targeted and non-targeted advertisements.

Aside from giving user generated content of information of homes, the system may also provide value estimates of homes it may also offers several unique features including value changes of each home in a given time frame (e.g. 1, 5, or 10 years) and aerial views of homes as well as the price of the surrounding homes in the area. It may also provides basic data of a given home such as square footage and the number of bedrooms and bathrooms. Users may can also obtain current estimates of homes if there was a significant change made such as recently modeled kitchen.

In the example systems and methods illustrated in FIGS. 6-34, neighbors may get to know each other and their surrounding businesses more easily through the Internet. The user interface view of the social community module may include a searchable map interface and/or a social networking page on the right when one clicks a particular home/location. The map interface may/may not include information about prices of a home, or information about the number of bedrooms of a home, etc. In essence, certain critical input information may be divided as follows:

Residential location: (1) name of the persons/family living in that residence (2) Their profession if any 3) Their educational background if any (4) Their recreational interests (5) About their family description box (6) Anything else people want to post about that person including their interests, hobbies, etc. (7) An ability for users to leave endorsements.

Business location or civic location (e.g., park, govt. building, church, etc.): (1) name of the business/location (2) email of the manager of the business/location (3) phone number of the business/location if known (4) anything else people want to say about the business (good or bad), for example, contributable through a wiki.

These two will be the primary types. Various features differentiate example embodiments of the social community module from other social networks. These differentiators include (1) interface driven by address (2) maps that can be viewed, zoomed in on, tied to a parcel #, etc. (3) Anyone can populate anyone's social network page. (4) Anybody can post in one of the boxes. They can post anonymously or publicly (5) If someone wants to override information that already has been established, they will need to have an identity (e.g., user name), to override published posting information.

However, according to one embodiment, if an owner of an entity location wishes to mark their location private, and uneditable by the public without their permission, they will need to pay (e.g., a monthly fixed fee) through the social community module. Alternatively, the owner of the entity location may not need to pay to mark the location as private and uneditable by the public without the owner's permission. Example embodiments of the social community module may feature info about businesses. They may also feature info about people that live in the homes, and may/may not display information on prices, number of bedrooms, etc.

The social community module (e.g., as described in FIG. 6) may be a search engine (e.g., Google®, Yahoo®, etc.) that uses maps (e.g., satellite map views) instead of text displays to show information, user profiles, reviews, promotions, ads, directions, events, etc. relevant to user searches.

The example systems and methods illustrated in FIGS. 6-34 may facilitate a social network membership that spreads virally by users inviting their friends. For example, every person that registers has their own profile, but registration may not be required to contribute content. However, registration may be required to "own" content on your own home, and have override permission to delete things that you don't like about yourself listed about you by others. In one embodiment, the social community module may need to confirm the user's identity and address (e.g., using digital signature tools, drivers license verification, etc.), and/or the user may need to pay a monthly fixed fee (e.g., through a credit card) to control their identity.

For example, they can get a rebate, and not have to pay the monthly fee for a particular month, if they invite at least 15 people that month AND contribute information about at least 10 of their neighbors, friends, civic, or business locations in their neighborhood. People can post pics of their family, their business, their home, etc. on their profile once they 'own' their home and register. In another embodiment, endorsements for neighbors by others will be published automatically. People can search for other people by descriptors (e.g., name, profession, distance away from me, etc.)

Profiles of users may be created and/or generated on the fly, e.g., when one clicks on a home.

People may be able to visually see directions to their neighborhood businesses, rather than reading directions through text in a first phase. After time, directions (e.g., routes) can be offered as well. Users can leave their opinions on businesses, but the social community module also enables users to leave opinions on neighbors, occupants or any entity having a profile on the map display. The social community module may not attempt to restrict freedom of speech by the users, but may voluntarily delete slanderous, libelous information on the request of an owner manually at any time.

In one embodiment, the methods and systems illustrated in FIGS. 6-34 enable people to search for things they want e.g. nearby pizzas etc. (e.g., by distance away). Advertisers can 'own' their listing by placing a display ad on nextdoor.com. Instead of click-through revenues when someone leaves the site, revenues will be realized when the link is clicked and someone views a preview html on the right of the visual map. Targeted advertisements may also be placed when someone searches a particular street, name, city, etc.

In another example embodiment, the social community module may enable users of the social network to populate profiles for apartments, buildings, condos, etc. People can create floors, layout, etc. of their building, and add social network pages on the fly when they click on a location that has multiple residents, tenants, or lessees.

A user interface associated with the social community module 100 may be clean, simple, and uncluttered (e.g., Simple message of "get to know your neighbors"). For example, the map interface shows neighbors. Methods and systems associated with the features described may focus on user experience, e.g., ensuring a compelling message to invite friends and/or others to join. A seed phase for implementation of the methods and systems illustrated in FIGS. 6-34 may be identified for building a membership associated with the social community module.

For example, a user having extensive networks in a certain area (e.g., a city) may seed those communities as well. The social network may encourage user expression, user content creation, ease of use on site to get maximum users/distribution as quickly as possible. In another embodiment, the social community module may ensure that infrastructure associated with operation of the social community module (e.g., servers) are able to handle load (e.g., data traffic) and keep up with expected growth.

For example, the user interface view illustrated in the various figures shows an example embodiment of the social community module of FIG. 6. The user interface view may include a publicly editable profile wall section allowing public postings that owners of the profile can edit. For example, any user may be able to post on an empty profile wall, but a user must claim the location to own the profile (e.g., may minimize barriers to users posting comments on profile walls).

Names featured on the profile wall may be links to the user profiles on the map (e.g., giving an immediate sense for the location of admirers (or detractors) relative to user location). In one embodiment, an action (e.g., mouse-over) on a comment would highlight the comment user's house on the map and names linking to user profiles. The user interface view may also utilize the mapping interface to link comments to locations.

For example, the various embodiments illustrate a comment announcing a garage sale, that is tied to a mappable location on the mapping interface. (e.g., allows people to browse references directly from people's profiles). In the various figures, an example display of the mapping interface is illustrated. In this example display, houses are shown in green, a church is shown in white, the red house shows the selected location and/or the profile owner's house, question marks indicate locations without profile owners, blue buildings are commercial locations, and the pink building represents an apartment complex.

Houses with stars indicate people associated with (e.g., "friends") of the current user. In one embodiment, a user action (e.g., mouse-over) on a commercial property displayed in the mapping interface may pull up a star (e.g., "***") rating based on user reviews, and/or a link to the profile for the property. A mouse-over action on the apartment complex may pull up a building schematic for the complex with floor plans, on which the user can see friends/profiles for various floors or rooms. Question marks indicated in the display may prompt users to own that profile or post comments on the wall for that space. A user action on any house displayed in the mapping interface may pull up a profile link, summary info such as status, profession, interests, etc. associated with the profile owner, a link to add the person as a friend, and/or a link to send a message to the user (e.g., the profile owner).

In another embodiment, a default profile view shown is that of the current user (e.g., logged in), and if the user clicks on any other profile, it may show their profile in that space instead (with few text changes to indicate different person). The events in your area view of the profile display in may have a default radius for notification of events (e.g., by street, by block, by neighborhood, county, etc.) Events are associated with user profiles and may link to locations displayed on the mapping interfaces. The hot picks section may be an ad/promotional zone, with default settings for radius of alerts also configurable.

For example, the "Find a Friend" section may permit users to search by name, address, interests, status, profession, favorite movies/music/food etc. Users are also able to search within a given radius of their location. In one embodiment, the user interface view may include a link for the user to invite other people to join the network (e.g., may encourage users who see a question-mark on a house or a location on the mapping interface that corresponds to a real location associated with someone they know to contact that person and encourage them to join and own that profile through the social community module).

Some of the reasons we believe these embodiments are unique include:

Search engine that provides a visual map (e.g., rather than text) display of information relevant to user queries.

Users can search on the map for other people having certain professional, educational, personal, extracurricular, cultural, political and/or family etc. profiles or interests, within any location range.

Users can search for information on the map, that is accessible directly through profile displays. For example, the user may search for information about a certain subject and be directed to a profile of another user having information about the subject. Alternatively, the user may view the search subject itself as a visible item (e.g., if applicable to the search query) having a profile on the map display, along with additional information associated with the item (e.g., contributed by other users).

Allows users to search, browse and view information posted by other users about an entity location such as a home, a business property, a condo, an apartment complex, etc. directly on a map display Allows users to browse, form and join groups and communities based on location, preferences, interests, friend requests, etc.

Users can send messages to other people through their profiles within the map display Users can find friends, business associates, vendors, romantic partners, etc. on the map within any location range (e.g., in their neighborhood, street, subdivision, etc.) by browsing the map display or searching for people with certain profile characteristics and/or similar interests.

Users can view, browse and post comments/information/reviews about entity locations and/or people associated with those locations (e.g., occupants of a house, families, apartment residents, businesses, non-governmental entities, etc.), even for locations that do not have a profile owner. For example, all entity locations visible on the map display may link to a profiles on which any user can post comments. To own the profile and edit the information posted about an entity location or the occupant(s), the occupant(s) would have to join the network associated with the social community module and become the owner of the profile. The profile owner would then become visible in the map display (e.g., entity locations without profile owners may only be visible as questions marks on the map, having blank profiles but public comment sections).

Users can share their comments and opinions about locations, preferences and/or interests on their profiles that are visible and searchable on the map display Automatically notifies users of events and promotions in an area (e.g., scope of area can be selected by the user), and highlights venues and user profiles on the map.

Users can post reviews about entity locations (e.g., businesses) such that ratings for entity locations are visible on the map. Other users can trace the location of the users that posted the comments on the map.

Users who post comments on other profiles can be traced directly on the map through their comments. Alternatively, users can choose to submit anonymous postings or comments on other user/entity profiles, and/or may choose not to be traceable on the map through their comments.

For entity locations having more than one residency unit (e.g., apartment complexes), people can create and post on profiles for any room/floor of the location (e.g., by entering information on a schematic view of the location that is visible on the map).

Users can visually determine routes/directions/orientation to locations that they can browse within the map display. Additionally, users can generate written driving, walking or public transit directions between points of interest (e.g., from the user's house to a friend's house) within the map display.

Users can communicate (e.g., through live chat) directly with other users in the area based on an association determined through their profiles Business entity locations can generate targeted ads and promotions within locations on the map display (e.g., virtual billboards).

The social community module can realize revenue based on ad clickthroughs by users, without the users being directed away from the interface. For example, when a user clicks on any targeted ad/promotion displayed on the map, the profile of the entity associated with the ad/promotion may be generated alongside the map display.

Neighborhood or neighborhood (see spelling differences) is a geographically localized community located within a larger city or suburb. The residents of a given neighborhood are called neighbors (or neighbors), although this term may also be used across much larger distances in rural areas.

Traditionally, a neighborhood is small enough that the neighbors are all able to know each other. However in practice, neighbors may not know one another very well at all. Villages aren't divided into neighborhoods, because they are already small enough that the villagers can all know each other.

The system however may work in any country and any geography of the world. In Canada and the United States, neighborhoods are often given official or semi-official status through neighborhood associations, neighborhood watches, or block watches. These may regulate such matters as lawn care and fence height, and they may provide such services as block parties, neighborhood parks, and community security. In some other places the equivalent organization is the parish, though a parish may have several neighborhoods within it depending on the area.

In localities where neighborhoods do not have an official status, questions can arise as to where one neighborhood begins and another ends, such as in the city of Philadelphia, Pa. Many cities may use districts and wards as official divisions of the city, rather than traditional neighborhood boundaries.

In the mainland of the People's Republic of China, the term is generally used for the urban administrative unit usually found immediately below the district level, although an intermediate, sub-district level exists in some cities. They are also called streets (administrative terminology may vary from city to city). Neighborhoods encompass 2,000 to 10,000 families. Within neighborhoods, families are grouped into smaller residential units or quarters of 100 to 600 families and supervised by a residents' committee; these are subdivided into residents' small groups of fifteen to forty families. In most urban areas of China, neighborhood, community, residential community, residential unit, residential quarter have the same meaning.

The system and methods may be distributed through neighborhood associations. A neighborhood or neighborhood (see spelling differences) is a geographically localized community located within a larger city or suburb. The residents of a given neighborhood are called neighbors (or neighbors), although this term may also be used across much larger distances in rural areas.

Traditionally, a neighborhood is small enough that the neighbors are all able to know each other. However in practice, neighbors may not know one another very well at all. Villages aren't divided into neighborhoods, because they are already small enough that the villagers can all know each other. Each of the technologies and concepts disclosed herein may be embodied in software and/or hardware through one or more of the modules/embodiments discussed in FIGS. 6-34.

A block party is a large public celebration in which many members of a single neighborhood congregate to observe a positive event of some importance. Many times, there will be celebration in the form of playing music and dance. Block parties gained popularity in the United States during the 1970s. Block Parties were often held outdoors and power for the DJ's sound system was taken illegally from street lights. This was famously referenced in the song "South Bronx" by KRS-One with the line:

"Power from a street light made the place dark. But yo, they didn't care, they turned it out." It is also interesting to note that many inner city block parties were actually held illegally, as they might be described as loitering. However, police turned a blind eye to them, reasoning that if everyone from the neighborhood was gathered in one place there was less chance of crime being committed elsewhere.

In the suburbs, block parties are commonly held on holidays such as Fourth of July or Labor Day. Sometimes the occasion may be a theme such a "Welcome to the Neighborhood" for a new family or a recent popular movie. Often block parties involve barbecuing, lawn games such as Simon Says and group dancing such as the Electric Slide, the Macarena or line dancing.

In other usage, a block party has come to mean any informal public celebration. For example, a block party can be conducted via television even though there is no real block in the observance. The same is true for the Internet. The block party is closely related to the beach party. The British equivalent is the street party.

The systems and methods illustrated in FIGS. 6-34 may have software to emulate a block party or a neighborhood watch. A neighborhood watch (also called a crime watch or neighborhood crime watch) is a citizens' organization devoted to crime and vandalism prevention within a neighborhood. It is not a vigilante organization, since members are expected not to directly intervene in possible criminal activity. Instead, neighborhood watch members are to stay alert to unusual activity and contact the authorities. It builds on the concept of a town watch from Colonial America.

The current American system of neighborhood watches began developing in the late 1960s as a response to the rape and murder of Kitty Genovese in Queens, N.Y. People became outraged that three dozen witnesses did nothing to save Genovese or to apprehend her killer Some locals formed groups to watch over their neighborhoods and to look out for any suspicious activity in their areas. Shortly thereafter, the National Sheriffs' Association began a concerted effort in 1972 to revitalize the "watch group" effort nationwide.

A neighborhood watch (also called a crime watch or neighborhood crime watch) is a citizens' organization devoted to crime and vandalism prevention within a neighborhood. It is not a vigilante organization, since members are expected not to directly intervene in possible criminal activity. Instead, neighborhood watch members are to stay alert to unusual activity and contact the authorities. It builds on the concept of a town watch from Colonial America.

The current American system of neighborhood watches began developing in the late 1960s as a response to the rape and murder of Kitty Genovese in Queens, N.Y. People became outraged that three dozen witnesses did nothing to save Genovese or to apprehend her killer. Some locals formed groups to watch over their neighborhoods and to look out for any suspicious activity in their areas. Shortly thereafter, the National Sheriffs' Association began a concerted effort in 1972 to revitalize the "watch group" effort nationwide.

The various methods, systems, and apparatuses disclosed herein and illustrated and described using the attached FIGS. 6-34 can be applied to creating online community organizations of neighborhoods of any form. During human growth and maturation, people encounter sets of other individuals and experiences. Infants encounter first, their immediate family, then extended family, and then local community (such as school and work). They thus develop individual and group identity through associations that connect them to life-long community experiences.

As people grow, they learn about and form perceptions of social structures. During this progression, they form personal and cultural values, a world view and attitudes toward the larger society. Gaining an understanding of group dynamics and how to "fit in" is part of socialization. Individuals develop interpersonal relationships and begin to make choices about whom to associate with and under what circumstances.

During adolescence and adulthood, the individual tends to develop a more sophisticated identity, often taking on a role as a leader or follower in groups. If associated individuals develop the intent to give of themselves, and commit to the collective well-being of the group, they begin to acquire a sense of community.

Socialization: The process of learning to adopt the behavior patterns of the community is called socialization. The most fertile time of socialization is usually the early stages of life, during which individuals develop the skills and knowledge and learn the roles necessary to function within their culture and social environment. For some psychologists, especially those in the psychodynamic tradition, the most important period of socialization is between the ages of 1 and 10. But socialization also includes adults moving into a significantly different environment, where they must learn a new set of behaviors.

Socialization is influenced primarily by the family, through which children first learn community norms. Other important influences include school, peer groups, mass media, the workplace and government. The degree to which the norms of a particular society or community are adopted determines one's willingness to engage with others. The norms of tolerance, reciprocity and trust are important "habits of the heart," as de Tocqueville put it, in an individual's involvement in community.

Continuity of the connections between leaders, between leaders and followers, and among followers is vital to the strength of a community. Members individually hold the collective personality of the whole. With sustained connections and continued conversations, participants in communities develop emotional bonds, intellectual pathways, enhanced linguistic abilities, and even a higher capacity for critical thinking and problem-solving. It could be argued that successive and sustained contact with other people might help to remove some of the tension of isolation, due to alienation, thus opening creative avenues that would have otherwise remained impassable.

Conversely, sustained involvement in tight communities may tend to increase tension in some people. However, in many cases, it is easy enough to distance oneself from the "hive" temporarily to ease this stress. Psychological maturity and effective communication skills are thought to be a function of this ability. In nearly every context, individual and collective behaviors are required to find a balance between inclusion and exclusion; for the individual, a matter of choice; for the group, a matter of charter. The sum of the creative energy (often referred to as "synergy") and the strength of the mechanisms that maintain this balance is manifest as an observable and resilient sense of community.

McMillan and Chavis (1986) identify four elements of "sense of community": 1) membership, 2) influence, 3) integration and fulfillment of needs, and 4) shared emotional connection. They give the following example of the interplay between these factors: Someone puts an announcement on the dormitory bulletin board about the formation of an intramural dormitory basketball team. People attend the organizational meeting as strangers out of their individual needs (integration and fulfillment of needs). The team is bound by place of residence (membership boundaries are set) and spends time together in practice (the contact hypothesis). They play a game and win (successful shared valent event). While playing, members exert energy on behalf of the team (personal investment in the group). As the team continues to win, team members become recognized and congratulated (gaining honor and status for being members). Someone suggests that they all buy matching shirts and shoes (common symbols) and they do so (influence).

A Sense of Community Index (SCI) has been developed by Chavis and his colleagues (1986). Although originally designed to assess sense of community in neighborhoods, the index has been adapted for use in schools, the workplace and a variety of types of communities.

Communitarianism as a group of related but distinct philosophies (or ideologies) began in the late 20th century, opposing classical liberalism, capitalism and socialism while advocating phenomena such as civil society. Not necessarily hostile to social liberalism, communitarianism rather has a different emphasis, shifting the focus of interest toward communities and societies and away from the individual. The question of priority, whether for the individual or community, must be determined in dealing with pressing ethical questions about a variety of social issues, such as health care, abortion, multiculturalism, and hate speech.

Effective communication practices in group and organizational settings are important to the formation and maintenance of communities. How ideas and values are communicated within communities are important to the induction of new members, the formulation of agendas, the selection of leaders and many other aspects. Organizational communication is the study of how people communicate within an organizational context and the influences and interactions within organizational structures. Group members depend on the flow of communication to establish their own identity within these structures and learn to function in the group setting. Although organizational communication, as a field of study, is usually geared toward companies and business groups, these may also be seen as communities. The principles can also be applied to other types of communities.

If the sense of community exists, both freedom and security exist as well. The community then takes on a life of its own, as people become free enough to share and secure enough to get along. The sense of connectedness and formation of social networks comprise what has become known as social capital.

Azadi Tower is a town square in modern Iran. Social capital is defined by Robert D. Putnam as "the collective value of all social networks (who people know) and the inclinations that arise from these networks to do things for each other (norms of reciprocity)." Social capital in action can be seen in groups of varying formality, including neighbors keeping an eye on each others' homes. However, as Putnam notes in Bowling Alone: The Collapse and Revival of American Community (2000), social capital has been falling in the United States. Putnam found that over the past 25 years, attendance at club meetings has fallen 58 percent, family dinners are down 33 percent, and having friends visit has fallen 45 percent.

Western cultures are thus said to be losing the spirit of community that once were found in institutions including churches and community centers. Sociologist Ray Oldenburg states in The Great Good Place that people need three places: 1) The home, 2) the workplace, and, 3) the community hang-out or gathering place.

With this philosophy in mind, many grassroots efforts such as The Project for Public Spaces are being started to create this "Third Place" in communities. They are taking form in independent bookstores, coffeehouses, local pubs and through many innovative means to create the social capital needed to foster the sense and spirit of community.

Community development is often formally conducted by universities or government agencies to improve the social well-being of local, regional and, sometimes, national communities. Less formal efforts, called community building or community organizing, seek to empower individuals and groups of people by providing them with the skills they need to effect change in their own communities. These skills often assist in building political power through the formation of large social groups working for a common agenda. Community development practitioners must understand both how to work with individuals and how to affect communities' positions within the context of larger social institutions.

Formal programs conducted by universities are often used to build a knowledge base to drive curricula in sociology and community studies. The General Social Survey from the National Opinion Research Center at the University of Chicago and the Saguaro Seminar at the John F. Kennedy School of Government at Harvard University are examples of national community development in the United States. In The United Kingdom, Oxford University has led in providing extensive research in the field through its Community Development Journal, used worldwide by sociologists and community development practitioners.

At the intersection between community development and community building are a number of programs and organizations with community development tools. One example of this is the program of the Asset Based Community Development Institute of Northwestern University. The institute makes available downloadable tools to assess community assets and make connections between non-profit groups and other organizations that can help in community building. The Institute focuses on helping communities develop by "mobilizing neighborhood assets"—building from the inside out rather than the outside in.

Community building and organizing: M. Scott Peck is of the view that the almost accidental sense of community which exists at times of crisis, for example in New York City after the attacks of Sep. 11, 2001, can be consciously built. Peck believes that the process of "conscious community building" is a process of building a shared story, and consensual decision making, built upon respect for all individuals and inclusivity of difference. He is of the belief that this process goes through four stages:

Pseudo-community: Where participants are "nice with each other", playing-safe, and presenting what they feel is the most favorable sides of their personalities. Chaos: When people move beyond the inauthenticity of pseudo-community and feel safe enough to present their "shadow" selves. This stage places great demands upon the facilitator for greater leadership and organization, but Peck believes that "organizations are not communities", and this pressure should be resisted.

Emptying: This stage moves beyond the attempts to fix, heal and convert of the chaos stage, when all people become capable of acknowledging their own woundedness and brokenness, common to us all as human beings. Out of this emptying comes Authentic community: the process of deep respect and true listening for the needs of the other people in this community. This stage Peck believes can only be described as "glory" and reflects a deep yearning in every human soul for compassionate understanding from one's fellows.

More recently Scott Peck has remarked that building a sense of community is easy. It is maintaining this sense of community that is difficult in the modern world. The Ithaca Hour is an example of community-based currency. Community building can use a wide variety of practices, ranging from simple events such as potlucks and small book clubs to larger-scale efforts such as mass festivals and construction projects that involve local participants rather than outside contractors. Some communities have developed their own "Local Exchange Trading Systems" (LETS) and local currencies, such as the Ithaca Hours system, to encourage economic growth and an enhanced sense of community.

Community building that is geared toward activism is usually termed "community organizing." In these cases, organized community groups seek accountability from elected officials and increased direct representation within decision-making bodies. Where good-faith negotiations fail, these constituency-led organizations seek to pressure the decision-makers through a variety of means, including picketing, boycotting, sit-ins, petitioning, and electoral politics. The ARISE Detroit! coalition and the Toronto Public Space Committee are examples of activist networks committed to shielding local communities from government and corporate domination and inordinate influence.

Community organizing is sometimes focused on more than just resolving specific issues. Organizing often means building a widely accessible power structure, often with the end goal of distributing power equally throughout the community. Community organizers generally seek to build groups that are open and democratic in governance. Such groups facilitate and encourage consensus decision-making with a focus on the general health of the community rather than a specific interest group.

The three basic types of community organizing are grassroots organizing, coalition building, and faith-based community organizing (also called "institution-based community organizing," "broad-based community organizing" or "congregation-based community organizing").

Community service is usually performed in connection with a nonprofit organization, but it may also be undertaken under the auspices of government, one or more businesses, or by individuals. It is typically unpaid and voluntary. However, it can be part of alternative sentencing approaches in a justice system and it can be required by educational institutions.

The most common usage of the word "community" indicates a large group living in close proximity. Examples of local community include: A municipality is an administrative local area generally composed of a clearly defined territory and commonly referring to a town or village. Although large cities are also municipalities, they are often thought of as a collection of communities, due to their diversity.

A neighborhood is a geographically localized community, often within a larger city or suburb. A planned community is one that was designed from scratch and grew up more or less following the plan. Several of the world's capital cities are planned cities, notably Washington, D.C., in the United States, Canberra in Australia, and Brasilia in Brazil. It was also common during the European colonization of the Americas to build according to a plan either on fresh ground or on the ruins of earlier Amerindian cities. Identity: In some contexts, "community" indicates a group of people with a common identity other than location. Members often interact regularly. Common examples in everyday usage include: A "professional community" is a group of people with the same or related occupations. Some of those members may join a professional society, making a more defined and formalized group.

These are also sometimes known as communities of practice. A virtual community is a group of people primarily or initially communicating or interacting with each other by means of information technologies, typically over the Internet, rather than in person. These may be either communities of interest, practice or communion. (See below.) Research interest is evolving in the motivations for contributing to online communities.

Some communities share both location and other attributes. Members choose to live near each other because of one or more common interests. A retirement community is designated and at least usually designed for retirees and seniors—often restricted to those over a certain age, such as 55. It differs from a retirement home, which is a single building or small complex, by having a number of autonomous households.

An intentional community is a deliberate residential community with a much higher degree of social interaction than other communities. The members of an intentional community typically hold a common social, political or spiritual vision and share responsibilities and resources. Intentional communities include Amish villages, ashrams, cohousing, communes, ecovillages, housing cooperatives, kibbutzim, and land trusts.

Special nature of human community Music in Central Park, a public space. Definitions of community as "organisms inhabiting a common environment and interacting with one another," while scientifically accurate, do not convey the richness, diversity and complexity of human communities. Their classification, likewise is almost never precise. Untidy as it may be, community is vital for humans. M. Scott Peck expresses this in the following way: "There can be no vulnerability without risk; there can be no community without vulnerability; there can be no peace, and ultimately no life, without community." This conveys some of the distinctiveness of human community.

Particularly, disclosed are a method and system an online neighborhood social network designed to create private websites to facilitate communication among neighbors and build stronger neighborhoods. The private websites are embodied in a website having a domain name of nextdoor.com. For example, a method that verifies that a user lives at a residence associated with a residential address claimed by the user of an online neighborhood social network is claimed. The method restricts access to a particular neighborhood to the user and to neighboring users living within the neighborhood boundary of the residence. A social network page of the user is created once verified and access privileges are determined. A message is distributed to neighboring users that are verified to live within a neighborhood boundary of the residence. The method may designate the user as a lead user with an additional privilege based on a participation level of the user in the online community.

Furthermore, in one aspect, a system of a global neighborhood environment includes a computer server of the global neighborhood environment (1) to verify that a user lives at a residence associated with a geographic location claimed by the user of the global neighborhood environment using a processor and a memory, (2) to create a social network page of the user once verified, (3) to enable the user to constrain a communication to neighboring users within a geospatial vicinity of the residence of the user based on a neighborhood boundary, and (4) to distribute a message in a distance away from the residence of the user based on the neighborhood boundary (5) to provide an additional privilege as a lead user in the online community of the global neighborhood environment based on a participation level of the user in the online community or an activity level of the user associated with encouraging neighbors to participate in the online community and (6) to automatically determine a set of access privileges in the online community associated with each user of the online community by constraining access in private web sites of the online community to neighboring users based on each residence associated with each geographic location claimed by each user of the global neighborhood environment. The global neighborhood environment formed through the computer server is named nextdoor.com in this aspect.

The computer server may permit the user to set a privacy setting associated with a profile data of the user such that certain information is marked as private and is therefore masked from being visible to neighboring users of the online community in the global neighborhood environment. The computer server may permit the user to provide a recommendation or an event suggestion to neighboring users based on the residence associated with the geographic location claimed by the user of the global neighborhood environment. The computer server may permit the user of the global neighborhood environment to mark certain information communicated directly to a particular neighboring user as private (e.g., such that privately shared information is shared only with the particular neighboring user and is designated as non-public to other neighboring users of the online community).

The computer server may filter information to only display messages from a particular neighborhood associated with each verified user. The computer server may permit private posts only in the particular neighborhood to verified users having verified addresses within the neighborhood. The computer server may utilize a postcard method through which the computer server generates a physical postcard that is postal mailed to verify addresses of requesting users in a particular neighborhood of the social network. The global neighborhood environment is designed to create private websites to facilitate communication among neighbors and build stronger neighborhoods.

In another aspect, a computer server (1) to verify that a user lives at a residence associated with a geographic location claimed by the user of an online neighborhood social network using a processor and a memory, (2) to create a social network page of the user once verified in the online neighborhood social network, (3) to enable the user to constrain communications to neighboring users in a geospatial vicinity of the residence of the user based on a neighborhood boundary of the online neighborhood social network, (4) wherein the user is provided an additional privilege as a lead user in the online neighborhood social network based on a participation level of the user in the online neighborhood social network and/or an activity level of the user associated with encouraging neighbors to participate in the online neighborhood social network, (5) to automatically determine a set of access privileges in the online neighborhood social network associated with the neighborhood boundary of the online neighborhood social network by constraining access in a private website in the online neighborhood social network to the user and to neighboring users of the user based on each residence associated with each geographic location claimed by each user of the online neighborhood social network verified to live within the neighborhood boundary. The online neighborhood social network has a domain name of nextdoor.com.

The computer server may permit the user to set a privacy setting associated with a profile data such that certain information is marked as private in the online neighborhood social network and is therefore masked from being visible to neighboring users of the online neighborhood social network. The computer server may permit the user to provide a recommendation to neighboring users based on the residence associated with the geographic location claimed by the user of the online neighborhood social network. The computer server may permit the user of the online neighborhood social network to mark certain information communicated directly to a particular neighboring user as private, such that privately shared information is shared only with the particular neighboring user and is designated as non-public to other neighboring users of the online neighborhood social network.

The computer server may filter information to only display messages from a particular neighborhood associated with each verified user. The computer server may permit private posts only in the particular neighborhood to verified users having verified addresses within a particular neighborhood boundary associated with the particular neighborhood. The computer server may utilize a postcard method through which the computer server generates a physical postcard that is postal mailed to verify addresses of neighboring users living within the neighborhood boundary of the online neighborhood social network. The online neighborhood social network may be designed to create private websites to facilitate communication among neighbors and build stronger neighborhoods.

In yet another aspect, a method includes verifying that a user lives at a residence associated with a residential address claimed by the user of an online neighborhood social network using a processor and a memory, creating a social network page of the user once verified in the online neighborhood social network, distributing a message from the user to neighboring users that are verified to live within a neighborhood boundary of the residence, designating the user as a lead user having an additional privilege in a private website of the online neighborhood social network confined by the neighborhood boundary based on at least one of a participation level of the user in the online neighborhood social network and an activity level of the user associated with encouraging neighboring users to participate in the online neighborhood social network, automatically determining a set of access privileges in the private website of the online neighborhood social network associated with the user, and restricting access to a particular neighborhood in the private website of the online neighborhood social network to the user and to neighboring users living within the neighborhood boundary of the residence.

The neighboring users are determined based on each residence associated with each geographic location claimed by each neighboring user of the online neighborhood social network that is within the neighborhood boundary. In this yet another aspect, the online neighborhood social network has a domain name of nextdoor.com. The method may include permitting the user to set a privacy setting associated with a profile data such that certain information is marked as private in the online neighborhood social network and is therefore masked from being visible to neighboring users of the online neighborhood social network. The method may include distributing a recommendation of the user to neighboring users based on the residence associated with the geographic location claimed by the user of the online neighborhood social network. In addition, the method may publish an event listing posted by the user to neighboring users based on the residence associated with the geographic location claimed by the user of the online neighborhood social network.

The method may permit the user of the online neighborhood social network to mark certain information communicated to a particular neighboring user as private (e.g., may be designated as non-public to other neighboring users of the online neighborhood social network). The method may filter information to only display messages from a particular neighborhood associated with each verified user. The method may permit private posts only in the particular neighborhood to verified users having verified addresses within the neighborhood boundary.

The method may utilize a postcard method through which the computer server generates a physical postcard that is postal mailed to verify addresses of neighboring users living within the neighborhood boundary of the online neighborhood social network. The online neighborhood social network may be designed to create private websites to facilitate communication among neighbors and build stronger neighborhoods. The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

FIG. 1 is a system view of a global neighborhood environment 100 communicating with neighborhood(s) 102A-N through a network 104, an advertiser(s) 124, a global map data 126, an occupant data 128, according to one embodiment. Particularly FIG. 1 illustrates the global neighborhood environment 100, the neighborhood 102A-N, the network 104, the advertiser(s) 124, the global map data 126, and the occupant data 128, according to one embodiment.

The global neighborhood environment 100 may contain a lodging module 106, a search module 108, a wiki module 110, a for sale by owner module 112, a rent module 114, a delivery module 130, a pushpin module 132, a retained agent module 134, a paying guest module 136, a bidding module 138, a syndication module 140, a multiple listing module 142, a escrow module 144, and a recommendation module 146, according to one embodiment. The neighborhood 120 may include a user 116, a residence 118, a neighbor 120, a business 122, a home for sale 148, and a community center 150, according to one embodiment.

The global neighborhood environment 100 may include set of instructions that may facilitate the registered and/or unregistered user of the global neighborhood environment to communicate information (e.g., the information associated in buying, selling, listing, biding, etc.) associated with a real property in the geo-spatial environment. The neighborhood(s) 102 may be a geographically localized community associated with the real property in a geospatial environment. The neighborhood(s) 102A-N may contain registered and unregistered users of the global neighborhood environment associated with the real property of the global neighborhood environment 100. The network 104 may facilitate the global neighborhood environment to communicate the information associated with the neighborhood(s) 102. The lodging module 106 may enable the registered users of a wiki social network to geo-spatially mark properties which the user has claimed (e.g., the registered user may geo-spatially mark properties as available in an open market to potentially interested parties.).

The search module 108 may enable a search (e.g., a people search, a business search, a category search, etc.) of any data in the lodging module 106 and/or may enable embedding of any content (e.g., in search engines, blogs, social networks, professional networks, professional networks, etc.) in the global neighborhood environment.

The wiki module 110 may enable the registered users to create and/or update their information associated with the real property in the geo-spatial environment. A 'wiki' (e.g., may be enabled through the wiki module 110) can be defined as a perpetual collective work of many authors. Similar to a blog in a structure and/or a logic, a wiki may allow anyone to edit, delete and/or modify content that has been placed on the Web site using a browser interface, including the work of previous authors. In contrast, a blog (e.g., or a social network page), typically authored by an individual, may not allow visitors to change a original posted material, only add comments to an original content. The term wiki may refer to either the web site or the software used to create the site. The term 'wiki' also implies fast creation, ease of creation, and community approval in many software contexts.

The for-sale-by-owner module 112 may provide an advertisement system to the business that may enable the users to purchase the real property in the neighborhood(s) 102. The for-sale-by-owner module 112 may also modify an availability status to a for-sale-by-owner status. The for-sale-by-owner module 112 may apply a metadata (e.g., indicating a price, a duration, etc.) and/or a condition of the real property being marketed to the real property. The rent module 114 may modify the availability status to a for rent status. In addition, the rent module 114 may apply the metadata (e.g., indicating the price, the physical characteristic, etc.) and/or the condition of the real property to the real property. The user 116 may be the registered and/or unregistered users who may be interested to buy, sell, list and/or bid the real property in the geo-spatial environment. The residence 118 may be a real estate existing in the neighborhood(s) 102.

The business 122 may be a customer service, finance, sales, production, communications/public relations and/or marketing organization that may be located in the neighborhood(s) 102. The advertiser(s) 124 may be the individual and/or a firm who may be involved in encouraging the user's attention to the real property in the geo-spatial environment through a variety of media.

The global map data 126 may contain details/maps of any area, region and/or neighborhood (e.g., the neighborhood 102A-N of FIG. 1) of the real property in the geo-spatial environment. The occupant data 128 may be the information associated with the registered and/or unregistered users of the global neighborhood environment residing in the neighborhood(s) 102. The delivery module 130 may automatically generate a marketing flyer (e.g., the marketing flyers may contain details of the real property in print and web form). Also, the delivery module 130 may deliver physical goods and/or services to listers and/or bidders in the geo-spatial environment based on user generated requests in the geo-spatial environment at a pre, during, and/or post transaction event. In addition, the delivery module 130 may install a physical marker in the physical location of the real property based on a confirmation request of the user.

The pushpin module 132 may automatically set a new latitude and longitude location when the user relocates a pointer in the geo-spatial environment indicating the physical location of the real property in the geo-spatial environment. The pushpin module 132 may set the latitude and longitude location based on a relocation of a pushpin indicator of the real property in the geo-spatial environment.

The retained agent module 134 may modify the availability status to a retained status based on the request of the user. Also, the retained agent module 134 may apply the agent profile of the retained agent to enable the user of the global neighborhood environment to view the agent profile concomitantly in the real property surrounded by the wiki profiles in the map. The paying guest module 136 may enable the user (e.g., buyer, bidder, real estate agent, etc.) to book the real property in the global neighborhood environment on selecting the social networking profile of the another user (e.g., owner, real estate agent, etc.) who may have requested the real property as rental.

The paying guest module 136 may enable another user (e.g., owner, real estate agent, etc.) to process a payment on confirmation of a booking of the real property by another user on a particular time. The bidding module 138 may enable prospective buyer(s) to bid on any of a tenancy and/or ownership interest in the real property in the global neighborhood environment. The bidding module 138 may pre-qualify the prospective buyer (e.g., who may have the interest to buy the real property) and/or may facilitate the user to invite an other prospective buyers to transact the real property with the user of the global neighborhood environment.

The syndication module 140 may publish the real property across a realtor multiple listing service database when requested by the user. The multiple listing module 142 may update the listing in a multiple listing services in the geo-spatial environment concurrently with the wiki pages and/or the real property claimed by the user. The escrow module 144 may carryout verifications and/or audit reporting (e.g., a home inspection reporting, a termite inspection reporting, a title report auditing, a disclosure check-off procedure, etc.) associated with transactions of the real property in the global neighborhood environment.

The recommendation module 146 may create a community of a real estate transaction, verification, and inspection parties to facilitate the escrow process. The recommendation module 146 may provide recommendations through a recommendation interface in the geo-spatial environment to the selected neighbors of the users in the global neighborhood environment.

The home for sale 148 may be any real property in the neighborhood(s) 102 of the global neighborhood environment offered for sale by the user (e.g., an owner, a real estate agent, an occupant, etc.) of the global neighborhood environment. The community center 150 may be public locations in a surrounding area of real property in the neighborhood(s) 102 where members of the community may gather for group activities, social support, public information, and other purposes.

In example embodiment illustrated in FIG. 1, the global neighborhood environment 100 may communicate with the neighborhood 102 A-N through the network 104. The global neighborhood environment 100 as illustrated in example embodiment of FIG. 1 may communicate the data with the global map data 126 and the occupant data 128. The global neighborhood environment 100 may interact with the advertisers 124 according to the example embodiment illustrated in FIG. 1. In the example embodiment illustrated in FIG. 1, the lodging module 106 of the global neighborhood environment 100 may communicate with the search module 108, the wiki module 110, and the for-sale-by owner module 112.

For example, the user (e.g., the prospective buyer, the prospective bidder, etc.) may be associated with the real property (e.g., immovable property such as homes, offices, commercial places, etc.) in the geo-spatial environment when the user claims the real property. A profile of the user and the real property may be concurrently displayed in the geo-spatial environment in a map. Furthermore, wiki profiles associated with different real properties (e.g., generated through the wiki module 110 of FIG. 1) may be simultaneously generated in the map surrounding the real property claimed by the user (e.g., the prospective buyer, the prospective bidder, etc.). Also, a status of the real property claimed by the user may be marked in the geo-spatial environment as being available through an indicator expressing an availability status of the real property (e.g., the indicator may indicate an availability as the for-sale-by owner, retained agent, property for rent, etc.).

In addition, the availability status may be modified to the for-sale-by-owner status (e.g., through the for-sale-by owner module 112 of FIG. 1). Also, the meta-data may be applied to the real property indicating the price, the duration, the physical characteristic, and/or the condition of the real property. Furthermore, a set of providers (e.g., the advertisers 124 of FIG. 1) having availability to deliver and/or install a lawn sign to the physical location of the real property may be geo-spatially determined based on the confirmation request of the user (e.g., the lister, the seller, etc.). Moreover, the marketing flyer having details of the real property may be automatically generated in a print and/or web form.

In addition, the buyer/tenant tools 500 may also allow the user of the global neighborhood environment who wishes to acquire any one of the tenancy interest and ownership interest to bid and/or buy a home through online real property marketplace (e.g., Fatdoor.com). Furthermore, the availability status may be retained to a retained agent status based on a request of the user (e.g., using the retained agent module 134 of FIG. 1). Also, an agency profile of the retained agent may be geo-spatially applied to the real property such that the agency profile may appear concurrently with the real property and/or may be surrounded by wiki profiles in the map. In addition, the real property across a realtor multiple listing service database may be syndicated upon request of the user.

Also, the availability status may be modified to the for rent status (e.g., the rent status may be modified through rent module 114 of FIG. 1). The meta-data indicating the price, a term, the duration, the physical characteristic, and/or the condition of the real property may be applied to the real property (e.g., home, office, restaurants, etc.). Furthermore, a prospective resident of the real property in a particular window of time in the geo-spatial environment may be booked when the user selects a social networking profile of another user who has requested the real property as a rental. A payment of another user may be processed when another user (e.g., the prospective bidder) confirms a booking of the real property on a particular day.

The prospective buyers who may wish to acquire any one of the tenancy and an ownership interest in the real property may be pre-qualified (e.g., using the bidding module 138 of FIG. 1). In addition, the prospective buyers may be enabled to bid on (e.g., using the bidding module 138 of FIG. 1) any one of the tenancy interest and the ownership interest in the real property (e.g., home, office space, restaurants, etc.). Also, an optimal one of the prospective buyers may be invited to transact the real property with the user.

In addition, a representation of properties listed in the multiple listing services may be concurrently generated directly in the geo-spatial environment along with the wiki pages and the real property claimed by the user. Furthermore, the escrow process may be conducted directly in the geo-spatial environment (e.g., through the escrow module 144 of FIG. 1) including any verifications and/or audit reporting associated with the real property transaction including a home inspection reporting, a termite inspection reporting, a flood inspection reporting, a title report auditing, and/or a disclosure check-off procedure.

Moreover, the community (e.g., the community center 150 of FIG. 1) of real estate transaction, verification, and/or inspection parties may be built to facilitate the escrow process, and providing a recommendation to a chosen few of the real estate transaction, verification, and/or inspection parties to the neighbors (e.g., the neighbor 120 of FIG. 1) of the user through a recommendation interface in the geo-spatial environment.

Furthermore, a system includes any number of neighborhoods 102 having the registered users and/or unregistered users of a global neighborhood environment 100. The system also includes a lodging module 106 of the global neighborhood environment 100 to enable the registered users of a wiki-based social network overlying a global mapping infrastructure to geo-spatially mark properties that they have claimed as being available in the open market to the potentially interested parties (e.g., the prospective buyers, the prospective sellers, etc.).

In addition, the system includes the wiki module 110 of the global neighborhood environment 100 to enable the registered users to create the social network page of themselves, and/or to edit information associated with the unregistered users identifiable through a viewing of the physical properties in which the unregistered users reside when the registered users have knowledge of characteristics associated with the unregistered users so that the potentially interested parties have an ability to view a consensus social characteristic of neighbors (e.g., the neighbor 120 of FIG. 1) surrounding a property marked as transact able.

The system may further include a search module 108 of the global neighborhood environment 100 to enable the people search, the business search, and/or the category search of any data in the lodging module 106 and/or to enable embedding of any content in the global neighborhood environment 100 in other search engines, blogs, social networks, professional networks and/or static websites. Also, the system may include the for-sale-by-owner module 112 of the global neighborhood environment 100 to modify the availability status to the for-sale-by-owner status (e.g., the FSBO 212 of FIG. 2), to apply the meta-data indicating the price, the duration, the physical characteristic, and/or the condition of the real property being marketed to the real property.

Figure 5A:
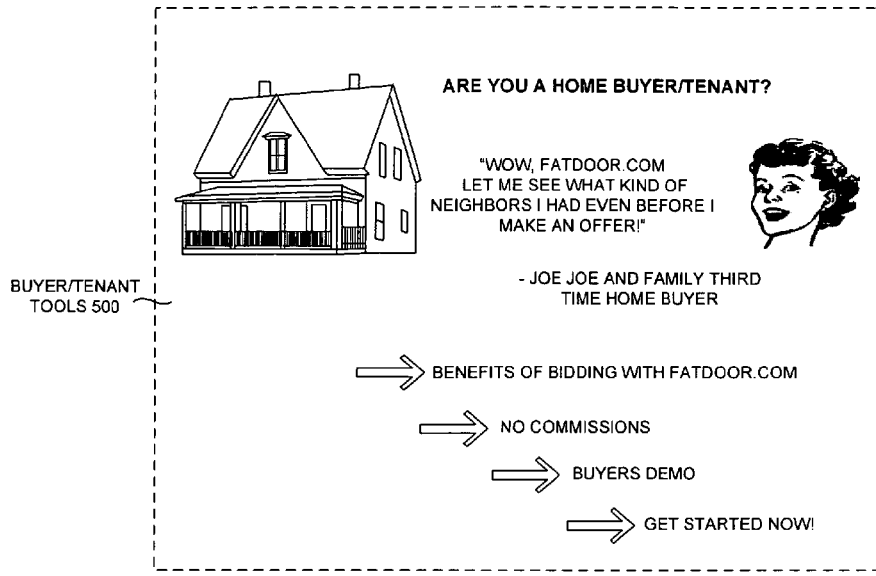
FIG. 5A is a user interface view of a buyer/tenant tools, according to one embodiment.
Figure 5B:
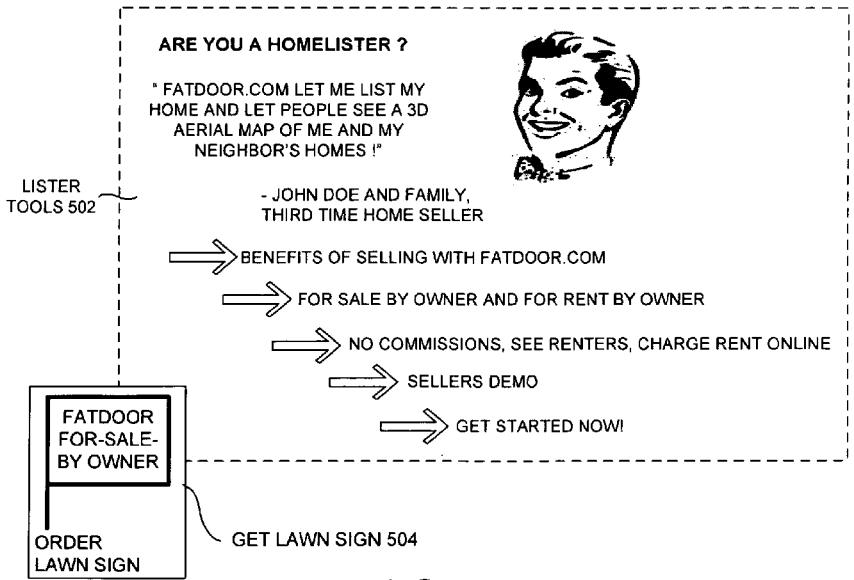
FIG. 5B is a user interface view of a lister tools, according to one embodiment.

Furthermore, the system may include the delivery module 130 of the global neighborhood environment 100 to geo-spatially determine which of the set of providers have the availability to deliver and/or install the physical marker in a physical location (e.g., when the user orders the lawn sign through get lawn sign link 504 of FIG. 5B) of the real property based on the confirmation request of the user, and/or to automatically generate the marketing flyer (e.g., the lawn sign) having details of the real property in the print and/or the web form. Moreover, the system may also include the pushpin module 132 to automatically set the new latitude and longitude location based on the relocation of the pushpin indicator of the real property when the user relocates the pointer in the geo-spatial environment (e.g., using move pin link 214 of FIG. 2) indicating the physical location of the real property.

The system may include the retained agent module 134 of the global neighborhood environment 100 to transform the availability status to the retained agent status based on a request of the user, and/or to geo-spatially apply an agency profile of the retained agent to the real property such that the agency profile appears concurrently with the real property and is surrounded by the wiki profiles in the map.

Also, the system may include the syndication module 140 of the global neighborhood environment 100 to publish the real property across the realtor multiple listing service database upon request of the user (e.g., the lister, the seller, the owner, etc.). In addition, the system may include the rent module 114 of the global neighborhood environment 100 to modify the availability status to the for rent status and/or to apply the meta-data indicating the price, the term, the duration, the physical characteristic, and/or the condition of the real property to the real property.

The system may further include a paying guest module 136 of the global neighborhood environment 100 to book the prospective resident (e.g., the residence 118 of FIG. 1) of the real property in the global neighborhood environment 100 in the particular window of time when the user selects the social networking profile of another user who has requested the real property as the rental, and/or to process the payment of the another user (e.g., the owner, the lister, etc.) when the another user confirms the booking of the real property on the particular day.

The system may include the bidding module 138 of the global neighborhood environment 100 to pre-qualify prospective buyers (e.g., the potential interested parties) who wish to acquire the tenancy and/or the ownership interest in the real property, to enable the prospective buyers to bid on any one of the tenancy interest and the ownership interest in the real property, and/or to invite an optimal one of the prospective buyers to transact the real property with the user.

Furthermore, the system may include the multiple listing module 142 of the global neighborhood environment 100 to incorporate a representation of properties listed in the multiple listing service directly in the geo-spatial environment along with wiki pages and a real property claimed by the user (e.g., the user willing to buy/sell the real property).

Also, the system may include the escrow module 144 of the global neighborhood environment 100 to perform verifications and/or audit reporting associated with the real property transaction including the home inspection reporting, the termite inspection reporting, the flood inspection reporting, the title report auditing, and/or the disclosure check-off procedure.

Moreover, the system may include the recommendation module 146 of the global neighborhood environment 100 to build the community of real estate transaction, verification, and/or inspection parties to facilitate the escrow process, and/or to provide the recommendation to the chosen few of the real estate transaction (e.g., the selected users of the global neighborhood environment 100 may be recommended), verification, and/or inspection parties to neighbors (e.g., the neighbor 120 of FIG. 1) of the user through the recommendation interface in the geo-spatial environment.

A global neighborhood environment 100 includes a first instruction set to visualize real property tenancy and/or for sale availability and/or to reside above the map data, in which the social network underlies the visualization network in that each prospective lister and/or bidder of the real property may be expressible to one and other in the geo-spatial environment. Furthermore, the global neighborhood environment 100 includes a second instruction set integrated with the first instruction set to enable users of the social network to mark owned ones of their properties as being available as rental properties and/or for sale and which provides a positive and negative user generated content of neighbors surrounding the owned ones of the properties being available as the rental properties and/or for sale (e.g., the availability status of the real property may be displayed through the profile view as illustrated in FIG. 2).

In addition, the global neighborhood environment 100 includes a third instruction set to provide a free form of expression of the users sharing information about any entities and/or people residing in any geographical location identifiable in the satellite map data, and/or to provide a technique of each of the users to claim the geographic location to control content in their respective claimed geographic locations. Also, the global neighborhood environment 100 includes a fourth instruction set integrated with the first instruction set and the second instruction set to enable global exploration of properties being marketed in the geo-spatial environment by indexing each of the data shared by the users of any of the people and/or entities residing in any geographic location.

Moreover, the global neighborhood environment 100 may include a fifth instruction set to schedule delivery of physical goods and/or services to listers and/or bidders in the geo-spatial environment based on user generated requests in the geo-spatial environment at a pre, during, and/or post transaction event.

Figure 2:
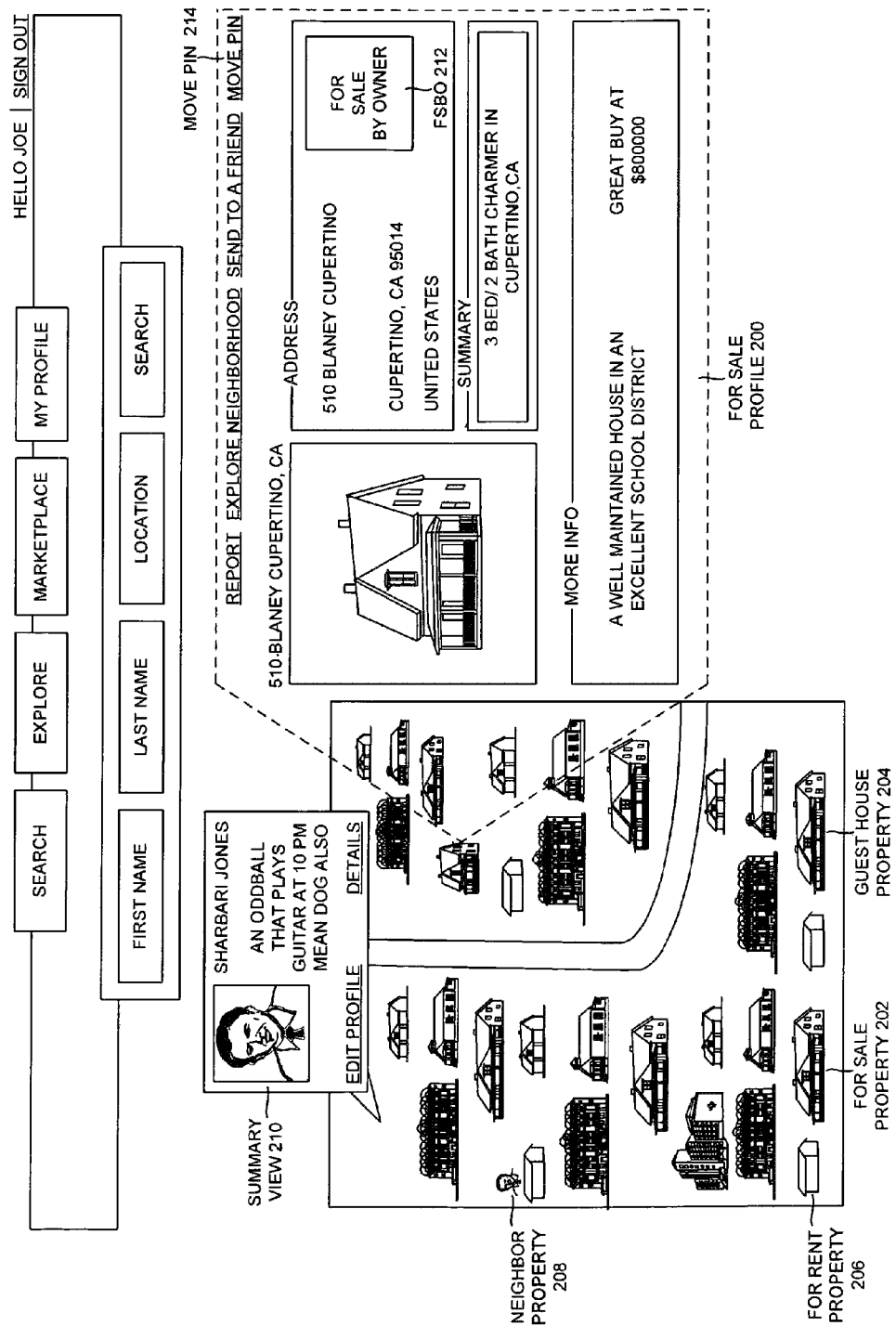
FIG. 2 is a user interface view of for-sale profile of a real property in a geo-spatial environment, according to one embodiment.

FIG. 2 is a user interface view of for-sale profile of a real property in a geo-spatial environment, according to one embodiment. Particularly FIG. 2 illustrates the for-sale profile 200, a for-sale property 202, a guest house property 204, a for-rent property 206, a neighbor property 208, a summary view 210, a FSBO 212, and a move pin link 214, according to one embodiment.

The for-sale profile 200 may be the profile of the real property of the global neighborhood environment 100 of FIG.

1 requested by the user. The for-sale profile 200 may display information associated with the real property (e.g., address, status of availability, price of the real property, facilities, neighborhood features, etc.) in the geo-spatial environment claimed by the user. The for-sale property 202 may be the real property in the geo-spatial environment displayed in the aerial map window listed by the another user (e.g., the owner of the real property, the listers, the real estate agents, etc.) for sale.

The guest house property 204 may display location of the guest house property in the aerial map that may facilitate the user to book the prospective resident of the real property in the global neighborhood environment 100. The for-rent property 206 may display the real property requested by the user of the global neighborhood environment as rental on the aerial map. The neighbor property 208 may display the location and/or the information associated with the neighbor's property of the user who may wish to acquire any one of the tenancy interest and ownership interest in the real property in the surrounding area of the neighbor's property. The summary view 210 may display the information associated with the registered user and/or unregistered user of the global neighborhood environment in the map and/or may allow to edit the profile of the user associated with the real property in the geo-spatial environment. The summary view 210 may enable the potentially interested parties to view the consensus social characteristic of neighbors surrounding the real property marked as transactable through the pushpin indicator.

The FSBO 212 may display the availability status of the real property as for-sale-by owner and/or may also enable the user (e.g., the buyer, the bidder, the tenant, etc.) to access the information associated with the real property which the user (e.g., the buyer, the bidder, the tenant, etc.) wishes to acquire any one of the tenancy interest and ownership interest. The FSBO 212 may offer information that may contain the price, the physical characteristic, condition of the real property, etc. The move pin link 214 may enable the user (e.g., the buyer, the bidder, the tenant, etc.) to view the new latitude and longitude location (e.g., the physical location of the real property) through relocation of pushpin indicator of the real property.

In example embodiment illustrated in FIG. 2, the user interface view displays the profile of the real property in the geospatial environment in the aerial map requested by the user who wishes to acquire any one of the tenant interest and ownership interest in the real property and that may contain the information such as address of the real property, the availability status of the real property, the facilities in the real property, the price of the real property, etc.

The user interface view as illustrated in example embodiment of FIG. 2 may also display the information associated with the physical location of the real property in geo-spatial environment the such as guest houses, properties for sale, properties for rent, neighbor's properties, etc. located by the user (e.g., the buyer, the bidder, the tenant, the owner, a real estate agent, etc.) through the pointer in the geo-spatial environment. The interface view illustrated in FIG. 2 may also display the summary view of the occupants when the user of the global neighborhood environment 100 locates the pointer on the aerial map to view details (e.g., details of Sharbari Jones illustrated in FIG. 2) of the occupants associated with the real property in the geo-spatial environment. The interface view of FIG. 2 may enable the user of the global neighborhood environment 100 of FIG. 1 to locate the physical location of the real property through the move pin link 214.

For example, the user, resident and/or business profiles associated with the different real properties surrounding the real property may be previewed in response to a mouse having both positive and/or negative wiki-compiled data. Furthermore, the new latitude and longitude location may be automatically set based on the relocation of the pushpin indicator of the real property when the user relocates the pointer in the geo-spatial environment indicating the physical location of the real property.

It should be noted that physical mailers may be distributed to users based on any interest of a registered user. For example, the geospatial environment may be pre-seeded with postal address data. Even when an address is not associated with a registered user, any user (e.g., such as a user selling and/or renting their home) may be able to communicate with any neighbor and/or person having a physical address in the geo-spatial environment. For example, any registered user can send a message to an entire neighborhood. Those who are registered users may receive an email, while those who are not registered users may receive a physical postcard or mailer (e.g., such as a coupon book).

Users may be able to customize a look and feel of the physical mailer. In addition, users may be able to pre-purchase electronic 'postage stamps', and/or create a debit/credit account that they can use to pay for physical mail pieces. A service fee may be assessed (e.g., 20% of postage amount) on the physical mail pieces sent through the geospatial environment. Likewise, each mail piece (e.g., a postcard, a home for rent/sale, an envelope, a coupon book, a greeting card, a holiday card, a wedding announcement, a block party invite) may include a logo of the geospatial provider (e.g., a Fatdoor-.com logo), to increase brand awareness. Users may receive a rebate for their mailing costs if they allow one or more targeted text or display ads to be put on the cover or envelope of the mail piece. As such, users in the geospatial environment can communicate with each other through both physical (e.g., postal) and through electronic (e.g., email, instant message, SMS, etc.) means simultaneously.

Figure 3:
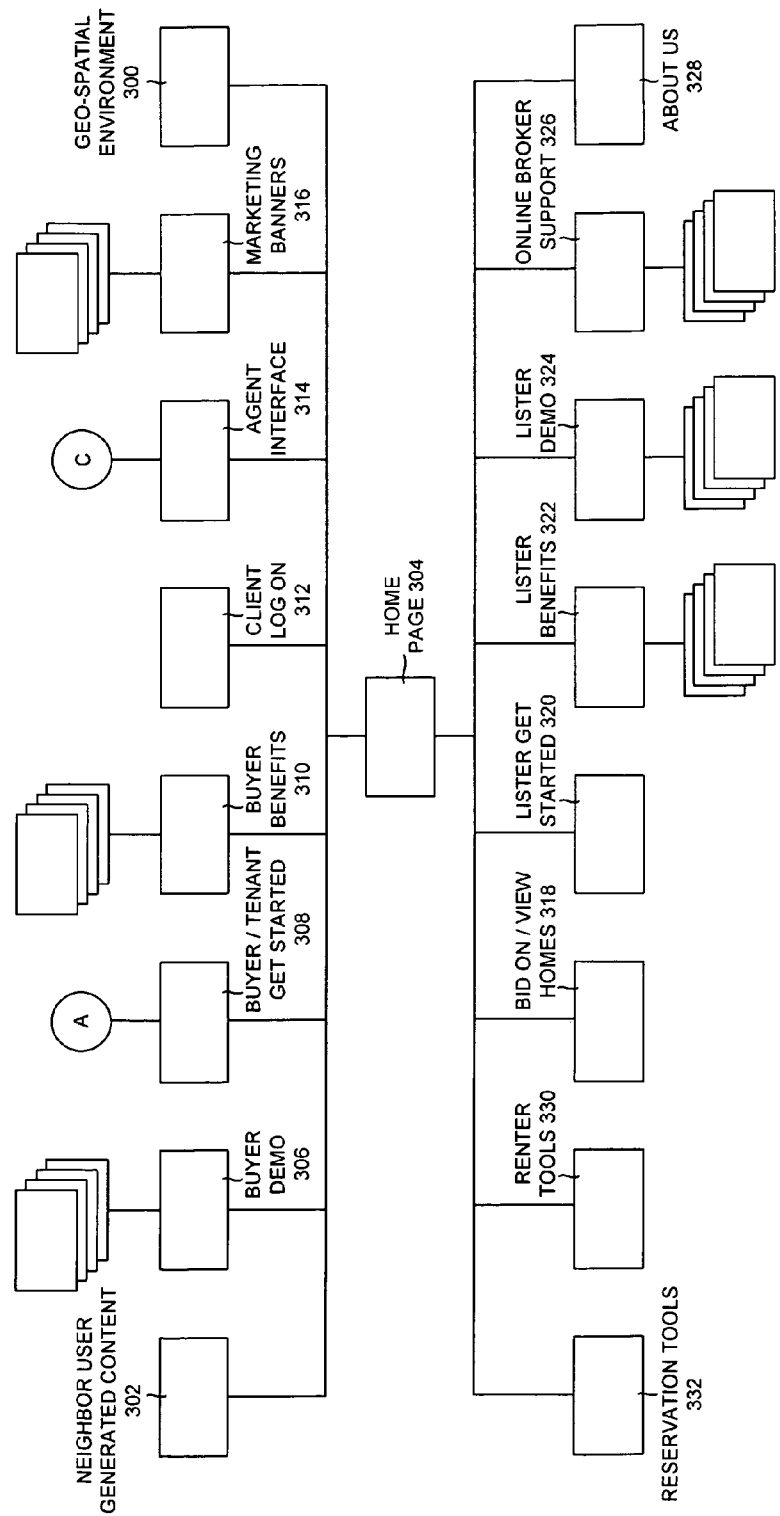
FIG. 3 is tree diagram of top level of a website for buying and listing the real property in the geo-spatial environment, according to one embodiment.

FIG. 3 is tree diagram of top level of a website for buying and/or listing the real property in the geo-spatial environment, according to one embodiment. Particularly FIG. 3 illustrates the geo-spatial environment 300, a neighbor user generated content 302, the home page 304, a buyer demo 306, a buyer/tenant get started 308, a buyer benefits 310, a client log on 312, an agent interface 314, a marketing banners 316, a bid on/view homes 318, a lister get started 320, a lister benefits 322, a lister demo 324, an online broker support 326, an about us 328, renter tools 330, reservation tools 332, according to one embodiment.

The geo-spatial environment 300 may provide and/or display virtual map of the geographical location in the neighborhood 102A-N of the real property. The neighbor user generated content 302 may be the content (e.g., the content generated may be positive and/or negative) associated with the user located in the geographical localized community. The neighbor user generated content 302 may be generated through the set of instructions contained in the global neighborhood environment 100. The home page 304 may be start page, front page and/or main web page of the website of the entity associated with real property transaction (e.g., the website of the real estate agency).

In addition, the home page 304 may usually include hyperlinks to other web pages of the website of the real property transactions in the geo-spatial environment. The buyer demo 306 may enable the prospective buyer to buy and/or bid the real property associated with neighborhood 102A-N through a demo (e.g., a video clip, a power point presentation, etc.). The buyer demo 306 may allow information displaying the price, the duration, the physical characteristic and/or the condition of the real property on the request of the user (e.g., the prospective buyer). The buyer/tenant get started 308 may facilitate the prospective buyer/tenant (e.g., who may have a wish to acquire any one of the tenant interest and ownership interest in the real property of the neighborhood) to bid on and/or buy online the real property in the geo-spatial environment.

The buyer benefits 310 may offer the benefits associated with the transaction (e.g., bidding, buying, etc.) of the real property in the geo-spatial environment through the real property online marketplace (e.g., Fatdoor.com). The client log on 312 may permit access to privileges and/or facilities to the registered user of the global neighborhood environment for bidding, buying, listing, etc. The agent interface 314 may display the retained agent status based on the request of the user and/or may support the creation and/or retrieval of the agent listed. The marketing banners 316 may enable the registered user of the global neighborhood environment 100 to generate automatically the marketing flyer having details (e.g., details may be in print form and/or web form) of the real property.

The bid on/view homes 318 may enable the user (e.g., the prospective buyer, the prospective bidder, etc.) to bid on the real property in the geo-spatial environment and/or facilitate the user to preview the details (e.g., the image of the real property, the information associated with the real property, etc.) the real property in the geo-spatial environment.

The lister get started 320 may allow the user (e.g., the owner, the real estate agent, etc.) to list the real property for sale, for rent, etc. in the web page. The lister benefits 322 may allow the user of the global neighborhood environment (e.g., interested in listing the real property) to know the benefits of listing, selling and/or renting the real property (e.g., no commission, no delays, etc.) through the online real property marketplace (e.g., Fatdoor.com). The lister demo 324 may enable the prospective lister to list and/or sell the real property associated with the neighborhood 102A-N through a demo presentation (e.g., a video clip, a power point presentation, etc.). The lister demo 324 may guide a user (e.g., the lister, the seller, the owner, etc.) to list the real property on the website (e.g., Fatdoor.com).

The online broker support 326 may offer help information to the user (e.g., the prospective buyer, the lister, the seller, the agent, etc.) of the global neighborhood environment 100 to solve the problems related to transaction of the real property (e.g., listing, selling, renting, buying, bidding, etc.) in the geo-spatial environment. The about us 328 may provide information associated with the entity (e.g., a company, a firm, a real estate agency, etc.).

The renter tools 330 may offer the information associated with renting a real property and/or may facilitate the potentially interested parties to book the prospective resident of the real property in the geo-spatial environment. The renter tools 330 may also allow the prospective renter to make payment after confirmation of booking of the real property on the particular time. The reservation tools 332 may facilitate the prospective buyer reserve transaction associated with the real estate property for the particular period of time.

In example embodiment FIG. 3 illustrates the home page 304 through which the user (e.g., the prospective buyer, the prospective seller, etc.) of the global neighborhood environment 100 may be enabled to chose the facilities and/or the privileges for online transaction of the real property in the geo-spatial environment using the hyperlinks on the webpage.

Figure 4:
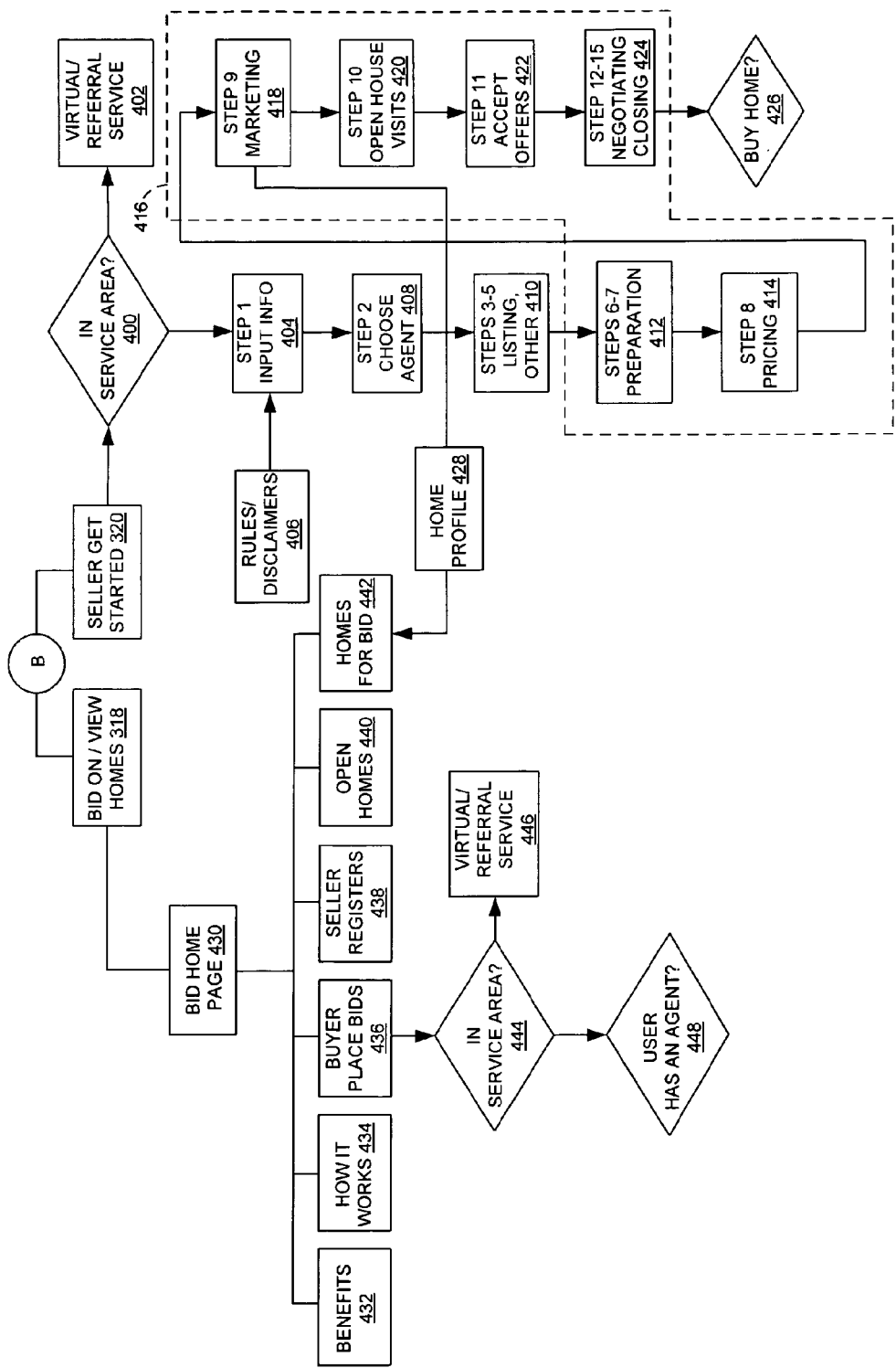
FIG. 4 is a tree diagram showing online selling process and bidding process of the real property in the geo-spatial environment, according to one embodiment.

FIG. 4 is a tree diagram showing online selling process and bidding process of the real property in the geo-spatial environment, according to one embodiment. In example embodiment, FIG. 4 illustrates bidding and selling processes of the real property through various hyperlinks displayed on the website. In the example embodiment illustrated in FIG. 4, the user who may be interested in selling the real property obtains the access for website for online transaction (e.g., buying, selling, bidding, etc.) of the real property. The seller may begin the selling process at the home page 304 by selecting the link seller get started 320.

A in service area? link 400 may enable the user to verify whether the real property belonging to the seller is in the service area of the website associated with real property transaction in geo-spatial environment or not. If the real property associated with the lister/seller is not in the service area then the seller may be provided access to the selected virtual/referral service after clicking the link virtual/referral services 402 (e.g., a service provided through the listing agents).

On the other hand, if the seller's real property is in the service area the seller may be prompted to enter the personal information for the purpose of starting the process through the link (step 1 input info 404). Rules/disclaimers 406 may provide the seller with the information regarding the rules and procedures governing bidding on a real property in the geo-spatial environment through the website (e.g., Fatdoor.com) as well as any appropriate legal action notifications and disclaimers. A step 2 choose agent link 408 may enable the user to select a agent associated with the transaction of real property in geo-spatial environment and/or may also provide more information associated with the real estate agent.

The seller may be prompted to register with the website of real property transaction after submitting the necessary information associated with the real property in the geo-spatial environment through step 3-5 listing, other 410. Once the seller becomes the registered user of the global neighborhood environment the website enables the seller to submit documents and required information (e.g., the photograph of the real property, scheduled time of open houses, inspection reports, etc.) (Step 6-7 preparation 412). Furthermore the seller may also submit an asking price of the real property in the geo-spatial environment requested by the seller for sale. Furthermore, a personalized transaction manager 416 may be generated by which the seller will interact with the site going forward. The website of real property transaction in geo-spatial environment may conduct the marketing of the real property (step 9 marketing 418) that may include generating the profile of the houses containing the availability status, address, asking price and other information associated with the real property in geo-spatial environment for sale (home profile 428).

The seller may host an open house visit (step 10 open house visits 420) on a particular day notified to the potential interest parties through the internet. Then the seller may receive the offers (step 11 accept offer 422) through the website and seller negotiates and/or accepts the offers from the potential interested parties. The seller may further negotiate any contingencies and/or other matter to facilitate closing of escrow (step 12-15 negotiate closing 424) and transfer of properties. Selling of the real property may also put the seller in a position of buying (buy home? 426) a new real property.

In example embodiment illustrated in FIG. 4, a bid on/view homes 318 may facilitate the user (e.g., the prospective buyer, the prospective bidder, etc.) to bid on the real property in the geo-spatial environment the user wish to acquire and/or may also allow the user to view the homes through the interface device. The home profile 428 may facilitate the user of the global neighborhood environment 100 to view the profile of the real property in the geo-spatial environment that may include information such as the availability status of the real property, address of the home, the asking price of the real property, inspection reports, etc. The bid home page 430 may provide access to information regarding benefits of using the site through the link benefits 432 and information associated with the rules, procedures and legal information related to the site through link how it works 434. Also, the bid home page 430 may allow the user to view the listing of the open houses through the hyper link open homes 440 and/or also may enable the user to view the homes for which bids are being accepted through the link homes for bid 444. In addition, the seller registers link 438 may allow the user to register the real property on the site. The bid home page 430 may enable the user to bid/buy a real property through the link buyer place bids 436. Furthermore, the user can also check whether the real property is in the geographical location serviced by the site or not. Also, user may query for the availability of an agent to buy a real property in the geo-spatial environment.

FIG. 5A is a user interface view of a buyer/tenant tools 500, according to one embodiment. Particularly the FIG. 5A illustrates the buyer/tenant tools 500, according to one embodiment. The buyer/tenant tools 500 may enable the user (e.g., the buyer, tenant, etc.) of the global neighborhood environment to access the information associated with the real property in the geospatial environment. The buyer/tenant tools 500 may offer the real property buyer/tenant to view the benefits of buying the real property (e.g., home) through the real property online marketplace (e.g., Fatdoor.com). The buyer/tenant tools 500 may facilitate the user (e.g., prospective buyer, tenant, etc.) to access a demo (e.g., the videos showing the instruction of buying a home through Fatdoor.com).

In addition, the buyer/tenant tools 500 may also allow the user of the global neighborhood environment who wishes to acquire any one of the tenancy interest and ownership interest to bid and/or buy a home through online real property marketplace (e.g., Fatdoor.com). Also, the buyer/tenant tools 500 may enable user (e.g., bidder, buyer, tenant, etc.) to express their views associated with real property (e.g., views associated with the real property user planning to own/rent.)

FIG. 5B is a user interface view of the lister tools 502, according to one embodiment. The lister tools 502 may facilitate the user (e.g., a lister, an owner, etc.) to express the views associated with the real property the users may wish to acquire. The lister tools 502 may offer the real property lister to view the benefits of listing and/or selling a real property (e.g., home) through the real property online marketplace (e.g., Fatdoor.com). The lister tools 502 may also facilitate the user (e.g., prospective buyer, tenant, etc.) to access a seller's demo (e.g., the videos showing the instruction of selling/listing a home through Fatdoor.com).

In addition, the lister tools 502 may allow the user of the global neighborhood environment 100 to list a home on online real property marketplace (e.g., Fatdoor.com) through a link get started. The lister tools 502 may enable the user to access other information such as charge rent, commissions, renters information, etc. The get lawn sign link 504 may enable the user (e.g., the seller, the lister, etc.) to order and/or install the lawn sign to a physical location of the real property through the lister tools 502.

FIG. 6 is a system view of a global neighborhood environment 600 communicating with neighborhood(s) 602A-N through a network 604, an advertiser(s) 624, a global map data 626, an occupant data 628, according to one embodiment. Particularly FIG. 6 illustrates the global neighborhood environment 600, the neighborhood 602A-N, the network 604, advertiser(s) 624, global map data 626, and the occupant data 628, according to one embodiment. The global neighborhood environment 600 may contain a social community module 606, a search module 608, a wiki module 610, a commerce module 612 and a map module 614. The neighborhood may include a user 616, a residence 618, a neighbor 620 and a business 622, a community center 630, according to one embodiment.

The global neighborhood environment 600 may include any number of neighborhoods having registered users and/or unregistered users. The neighborhood(s) 602 may be a geographically localized community in a larger city, town, and/or suburb. The network 604 may be search engines, blogs, social networks, professional networks and static website that may unite individuals, groups and/or community. The social community module 606 may generate a building creator in which the registered users may create and/or modify empty wiki profiles (e.g., a wiki profile 1706 of FIG. 17A-17B, a wiki profile 1802 of FIG. 18A, a wiki profile 2204 of FIG. 22). The search module 608 may include searching of information of an individual, group and/or community.

The wiki module 610 may enable the registered users to create and/or update their information. A 'wiki' (e.g., may be enabled through the wiki module 610) can be defined as a perpetual collective work of many authors. Similar to a blog in structure and logic, a wiki allows anyone to edit, delete or modify content that has been placed on the Web site using a browser interface, including the work of previous authors. In contrast, a blog (e.g., or a social network page), typically authored by an individual, may not allow visitors to change the original posted material, only add comments to the original content. The term wiki refers to either the web site or the software used to create the site. The term 'wiki' also implies fast creation, ease of creation, and community approval in many software contexts (e.g., wiki means "quick" in Hawaiian).

The commerce module 612 may provide an advertisement system to a business that may enable the users to purchase location in the neighborhood(s) 602. The map module 614 may be indulged in study, practice, representing and/or generating maps, or globes. The user 616 may be an individuals and/or households that may purchase and/or use goods and services and/or be an active member of any group or community and/or resident and/or a part of any neighborhood(s) 602. The residence 618 may be a house, a place to live and/or like a nursing home in a neighborhood(s) 602.

The community center 630 may be public locations where members of a community may gather for group activities, social support, public information, and other purposes. The business 622 may be a customer service, finance, sales, production, communications/public relations and/or marketing organization that may be located in the neighborhood(s) 602. The advertiser(s) 624 may be an individual and/or a firm drawing public who may be responsible in encouraging the people attention to goods and/or services by promoting businesses, and/or may perform through a variety of media. The global map data 626 may contain the details/maps of any area, region and/or neighborhood.

In example embodiment illustrated in FIG. 6, the social community module 606 of the global neighborhood environment 600 may communicate with the neighborhood(s) 602 through the network 604 and/or the search module 608. The social community module 606 of the global neighborhood environment 600 may communicate with the advertiser(s) 624 through the commerce module, the occupant data 628 and/or global map data 626 through the map module 614, as illustrated in example embodiment of FIG. 6.

For example, the neighborhoods 602A-N may have registered users and/or unregistered users of a global neighborhood environment 600. Also, the social community module 606 of the global neighborhood environment 600 may generate a building creator (e.g., building builder 2102 of FIG. 21) in which the registered users may create and/or modify empty wiki profiles, building layouts, social network pages, and/or floor levels structures housing residents and/or businesses in the neighborhood.

In addition, the wiki module 610 of the global neighborhood environment 600 may enable the registered users to create a social network page of themselves, and/or may edit information associated with the unregistered users identifiable through a viewing of physical properties in which, the unregistered users reside when the registered users have knowledge of characteristics associated with the unregistered users.

Furthermore, the search module 608 of the global neighborhood environment 600 may enable a people search (e.g., the people search widget 800 of FIG. 8), a business search (e.g., the business search module 802 of FIG. 8), and/or a category search (e.g., the category search widget 804 of FIG. 8) of any data in the social community module 606 and/or may enable embedding of any content in the global neighborhood environment 600 in other search engines, blogs, social networks, professional networks and/or static websites.

The commerce module 612 of the global neighborhood environment 600 may provide an advertisement system to a business who purchase their location in the global neighborhood environment 600 in which the advertisement may be viewable concurrently with a map indicating a location of the business, and/or in which revenue may be attributed to the global neighborhood environment 600 when the registered users and/or the unregistered users click-in on a simultaneously displayed data of the advertisement along with the map indicating a location of the business.

Moreover, a map module 614 of the global neighborhood environment 600 may include a map data associated with a satellite data (e.g., generated by the satellite data module 1100 of FIG. 11) which may serve as a basis of rendering the map in the global neighborhood environment 600 and/or which includes a simplified map generator which may transform the map to a fewer color and/or location complex form using a parcel data which identifies some residence, civic, and/or business locations in the satellite data.

In addition, a first instruction set may enable a social network to reside above a map data, in which the social network may be associated with specific geographical locations identifiable in the map data. Also, a second instruction set integrated with the first instruction set may enable users of the social network to create profiles of other people through a forum which provides a free form of expression of the users sharing information about any entities and/or people residing in any geographical location identifiable in the satellite map data, and/or to provide a technique of each of the users to claim a geographic location (e.g., a geographic location 1704 of FIG. 17A) to control content in their respective claimed geographic locations (e.g., a geographic location 1704 of FIG. 17A).

Figure 17A:
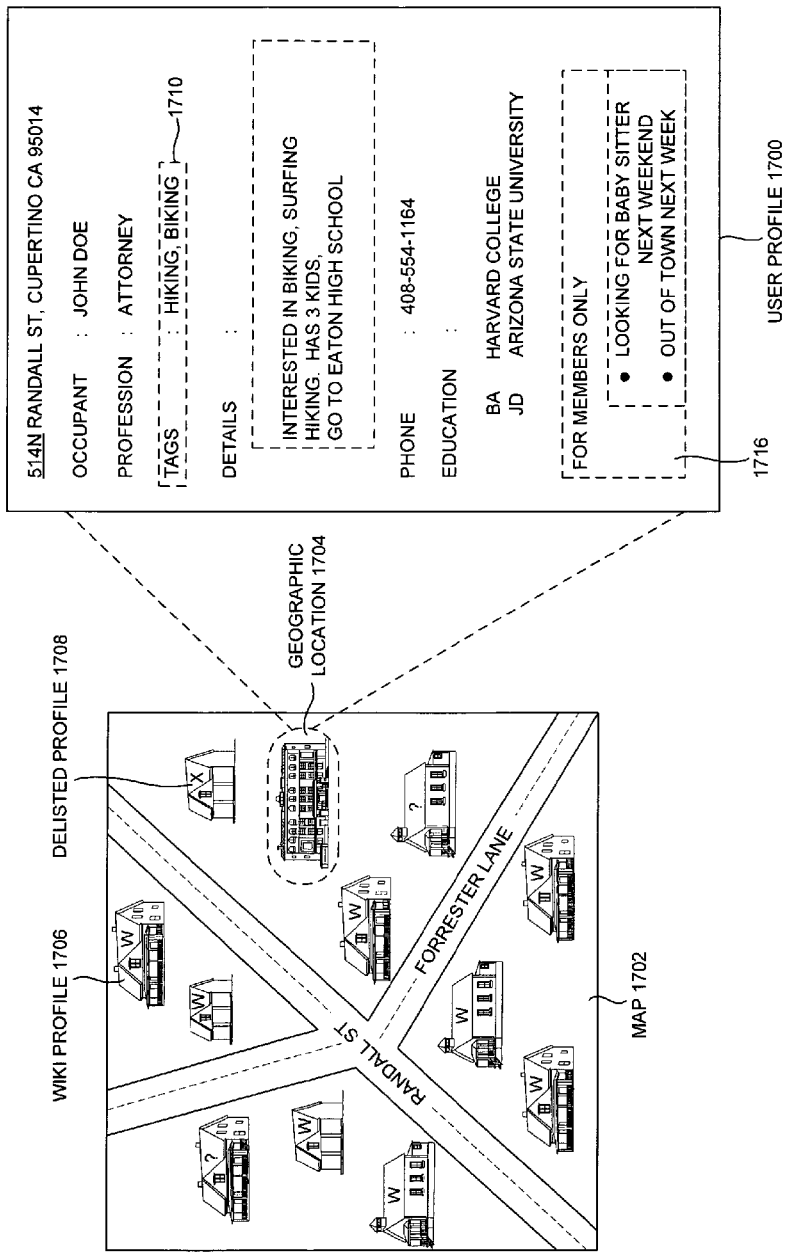
FIG. 17A is a user interface view of mapping user profile of the geographical location, according to one embodiment.

Furthermore, a third instruction set integrated with the first instruction set and the second instruction set may enable searching of people in the global neighborhood environment 600 by indexing each of the data shared by the user 616 of any of the people and/or the entities residing in any geographic location (e.g., a geographic location 1704 of FIG. 17A). A fourth instruction set may provide a moderation of content about each other posted of the user 616 through trusted users of the global neighborhood environment 600 who have an ability to ban specific users and/or delete any offensive and libelous content in the global neighborhood environment 600.

Also, a fifth instruction set may enable an insertion of any content generated in the global neighborhood environment 600 in other search engines through a syndication and/or advertising relationship between the global neighborhood environment 600 and/or other internet commerce and search portals.

Moreover, a sixth instruction set may grow the social network through neighborhood groups, local politicians, block watch communities, issue activism groups, and neighbor(s) 620 who invite other known parties and/or members to share profiles of themselves and/or learn characteristics and information about other supporters and/or residents in a geographic area of interest through the global neighborhood environment 600.

Also, a seventh instruction set may determine quantify an effect on at least one of a desirability of a location, a popularity of a location, and a market value of a location based on an algorithm that considers a number of demographic and social characteristics of a region surrounding the location through a reviews module.

Figure 7:
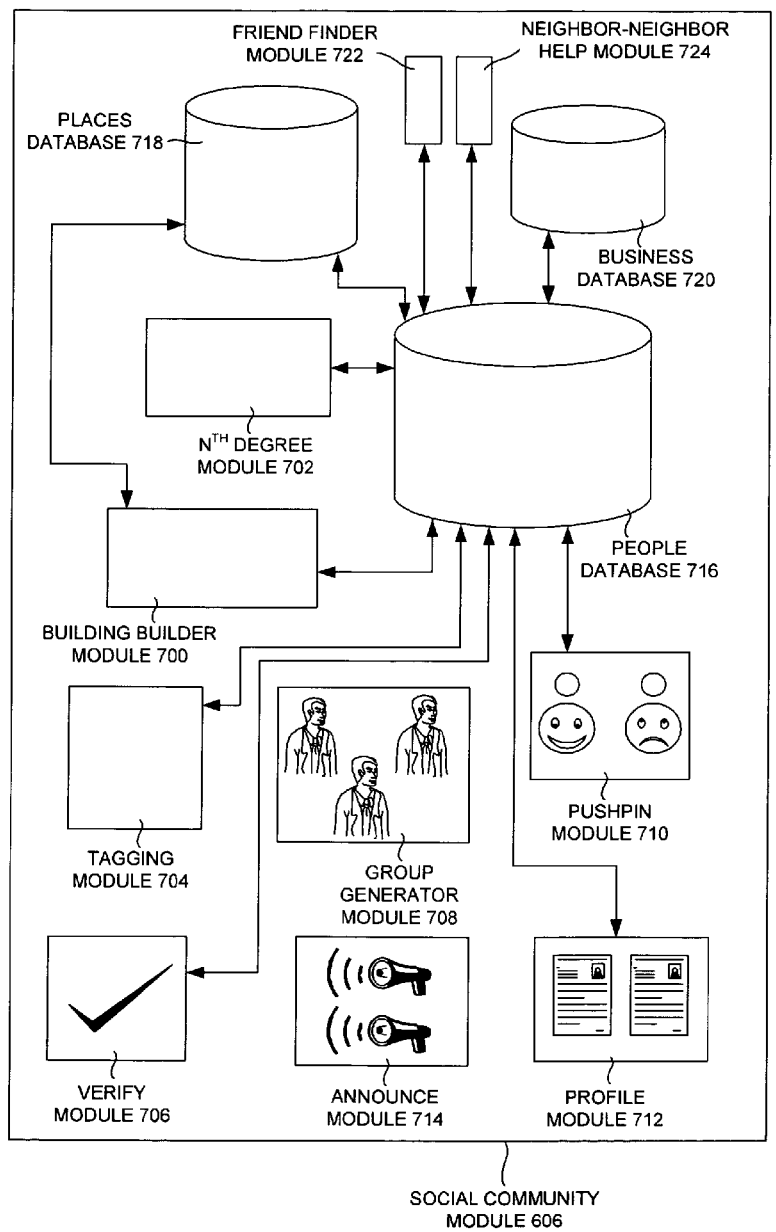
FIG. 7 is an exploded view of a social community module of FIG. 6, according to one embodiment.

FIG. 7 is an exploded view of the social community module 606 of FIG. 6, according to one embodiment. Particularly FIG. 7 illustrates a building builder module 700, an $N^{th}$ degree module 702, a tagging module 704, a verify module 706, a groups generator module 708, a pushpin module 710, a profile module 712, an announce module 714, a people database 716, a places database 718, a business database 720, a friend finder module 722 and a neighbor-neighbor help module 724, according to one embodiment.

The $N^{th}$ degree module 702 may enable the particular registered user to communicate with an unknown registered user through a common registered user who may be a friend and/or a member of a common community. The tagging module 704 may enable the user 616 to leave brief comments on each of the wiki profiles (e.g., the wiki profile 1706 of FIG. 17A-17B, the wiki profile 1802 of FIG. 18A, the wiki profile 2204 of FIG. 22) and social network pages in the global neighborhood environment (e.g., the global neighborhood environment 600 of FIG. 6).

The verify module 706 may validate the data, profiles and/or email addresses received from various registered user(s) before any changes may be included. The groups generator module 708 may enable the registered users to form groups may be depending on common interest, culture, style, hobbies and/or caste. The pushpin module 710 may generate customized indicators of different types of users, locations, and interests directly in the map. The profile module 712 may enable the user to create a set of profiles of the registered users and to submit media content of themselves, identifiable through a map.

The announce module 714 may distribute a message in a specified range of distance away from the registered users when a registered user purchases a message to communicate to certain ones of the registered users surrounding a geographic vicinity adjacent to the particular registered user originating the message. The people database 716 may keep records of the visitor/users (e.g., a user 616 of FIG. 6). The places database module 718 may manage the data related to the location of the user (e.g., address of the registered user). The business database 720 may manage an extensive list of leading information related to business. The friend finder module 722 may match the profile of the registered user with common interest and/or help the registered user to get in touch with new friends or acquaintances.

For example, the verify module 706 of the social community module 606 of FIG. 6 may authenticate an email address of a registered user prior to enabling the registered user to edit information associated with the unregistered users through an email response and/or a digital signature technique. The groups generator module 708 of the social community module (e.g., the social community module 606 of FIG. 6) may enable the registered users to form groups with each other surrounding at least one of a common neighborhood (e.g., a neighborhood 602A-N of FIG. 6), political, cultural, educational, professional and/or social interest.

In addition, the tagging module 704 of the social community module (e.g., the social community module 606 of FIG. 6) may enable the registered users and/or the unregistered users to leave brief comments on each of the wiki profiles (e.g., the wiki profile 1706 of FIG. 17A-17B, the wiki profile 1802 of FIG. 18A, the wiki profile 2204 of FIG. 22) and/or social network pages in the global neighborhood environment (e.g., the global neighborhood environment 600 of FIG. 6), in which the brief comments may be simultaneously displayed when a pointing device rolls over a pushpin indicating a physical property associated with any of the registered users and/or the unregistered users. Also, the pushpin module 710 of the social community module 606 of FIG. 6 may be generating customized indicators of different types of users, locations, and/or interests directly in the map.

Further, the announce module 714 of the social community module 606 of FIG. 6 may distribute a message in a specified range of distance away from the registered users when a registered user purchases a message to communicate to certain ones of the registered users surrounding a geographic vicinity adjacent to the particular registered user originating the message, wherein the particular registered user purchases the message through a governmental currency and/or a number of tokens collected by the particular user (e.g., the user 616 of FIG. 6) through a creation of content in the global neighborhood environment (e.g., the global neighborhood environment 600 of FIG. 6).

In addition, the $N^{th}$ degree module 702 of the social community module 606 of FIG. 6 may enable the particular registered user to communicate with an unknown registered user through a common registered user known by the particular registered user and/or the unknown registered user that is an $N^{th}$ degree of separation away from the particular registered user and/or the unknown registered user.

Moreover, the profile module 712 of the social community module 606 of FIG. 6 may create a set of profiles of each one of the registered users and to enable each one of the registered users to submit media content of themselves, other registered users, and unregistered users identifiable through the map.

Figure 8:
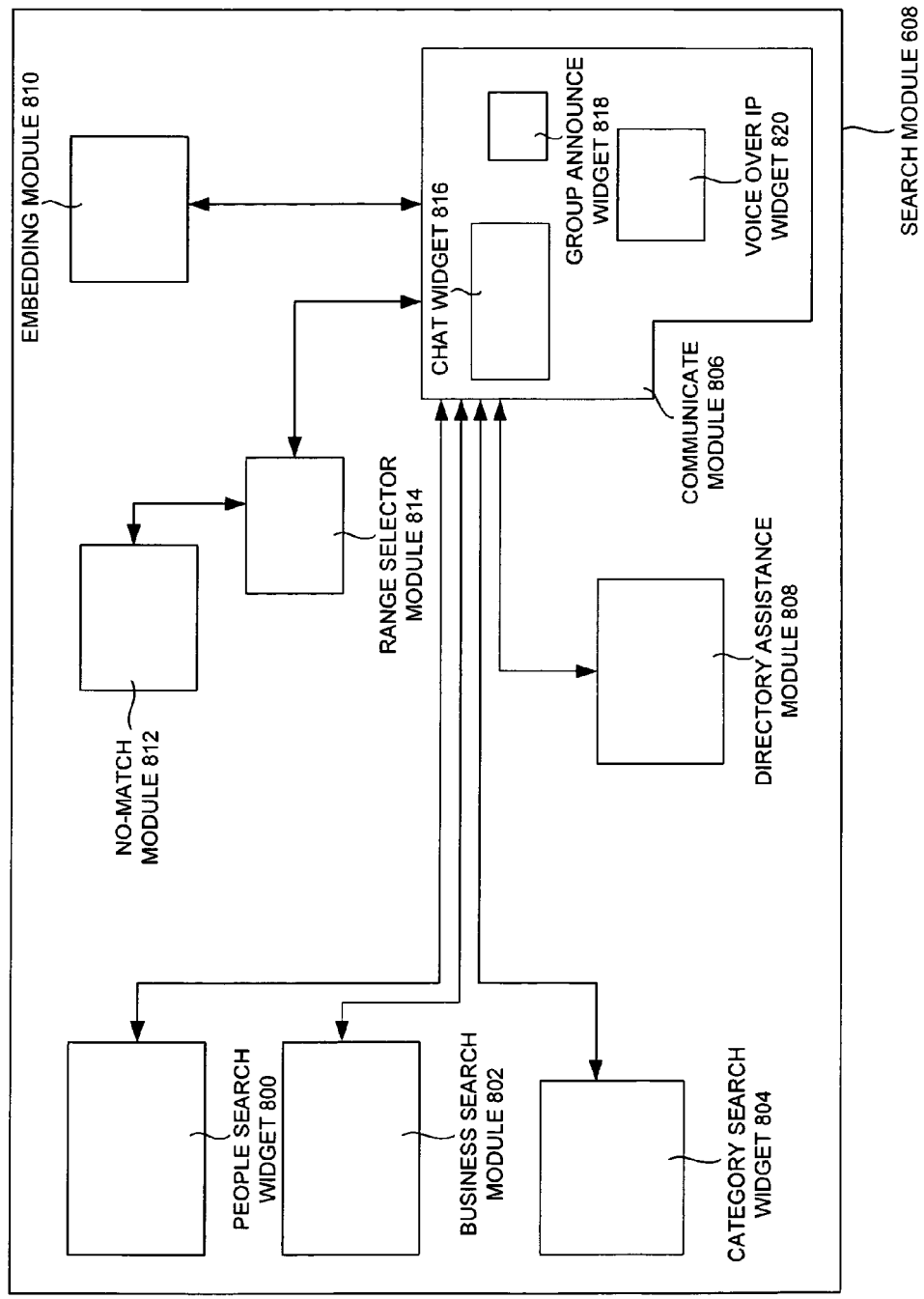
FIG. 8 is an exploded view of a search module of FIG. 6, according to one embodiment.

FIG. 8 is an exploded view of the search module 608 of FIG. 6, according to one embodiment. Particularly FIG. 8 illustrates a people search widget 800, a business search module 802, a category search widget 804, a communicate module 806, a directory assistance module 808, an embedding module 810, a no-match module 812, a range selector module 814, a chat widget 816, a group announce widget 818, a Voice Over IP widget 820, according to one embodiment.

The people search widget 800 may help in getting the information like the address, phone number and/or e-mail id of the people of particular interest from a group and/or community. The business search module 802 may help the users (e.g., the user 616 of FIG. 6) to find the companies, products, services, and/or business related information they need to know about.

The category search widget 804 may narrow down searches from a broader scope (e.g., if one is interested in information from a particular center, one can go to the category under the center and enter one's query there and it will return results from that particular category only). The communicate module 806 may provide/facilitate multiple by which one can communicate, people to communicate with, and subjects to communicate about among different members of the global neighborhood environment (e.g., the global neighborhood environment 600 of FIG. 6).

The directory assistance module 808 may provide voice response assistance to users (e.g., the user 616 of FIG. 6) assessable through a web and telephony interface of any category, business and search queries of user's of any search engine contents. The embedding module 810 may automatically extract address and/or contact info from other social networks, search engines, and content providers.

Figure 18A:
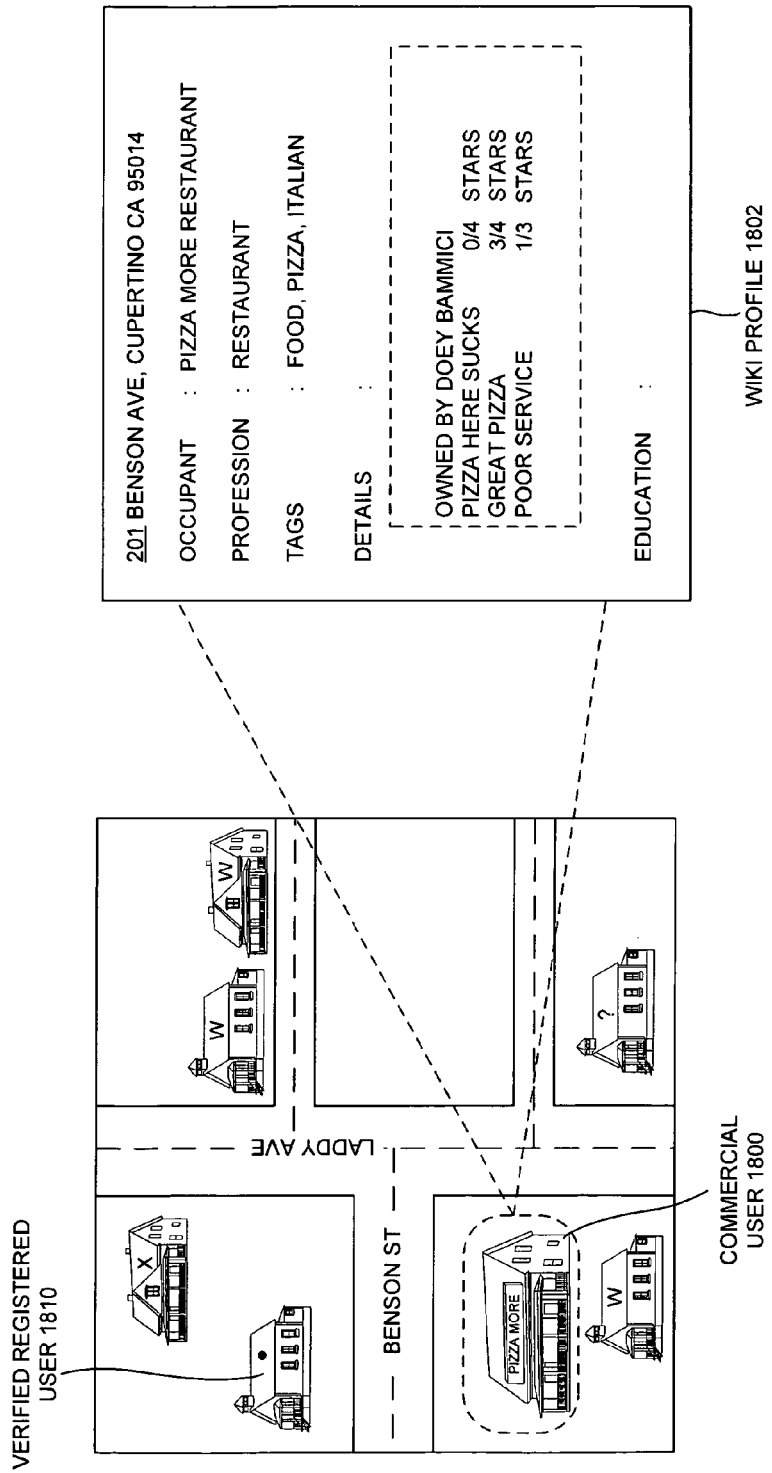
FIG. 18A is a user interface view of mapping of a wiki profile of the commercial user, according to one embodiment.
Figure 18B:
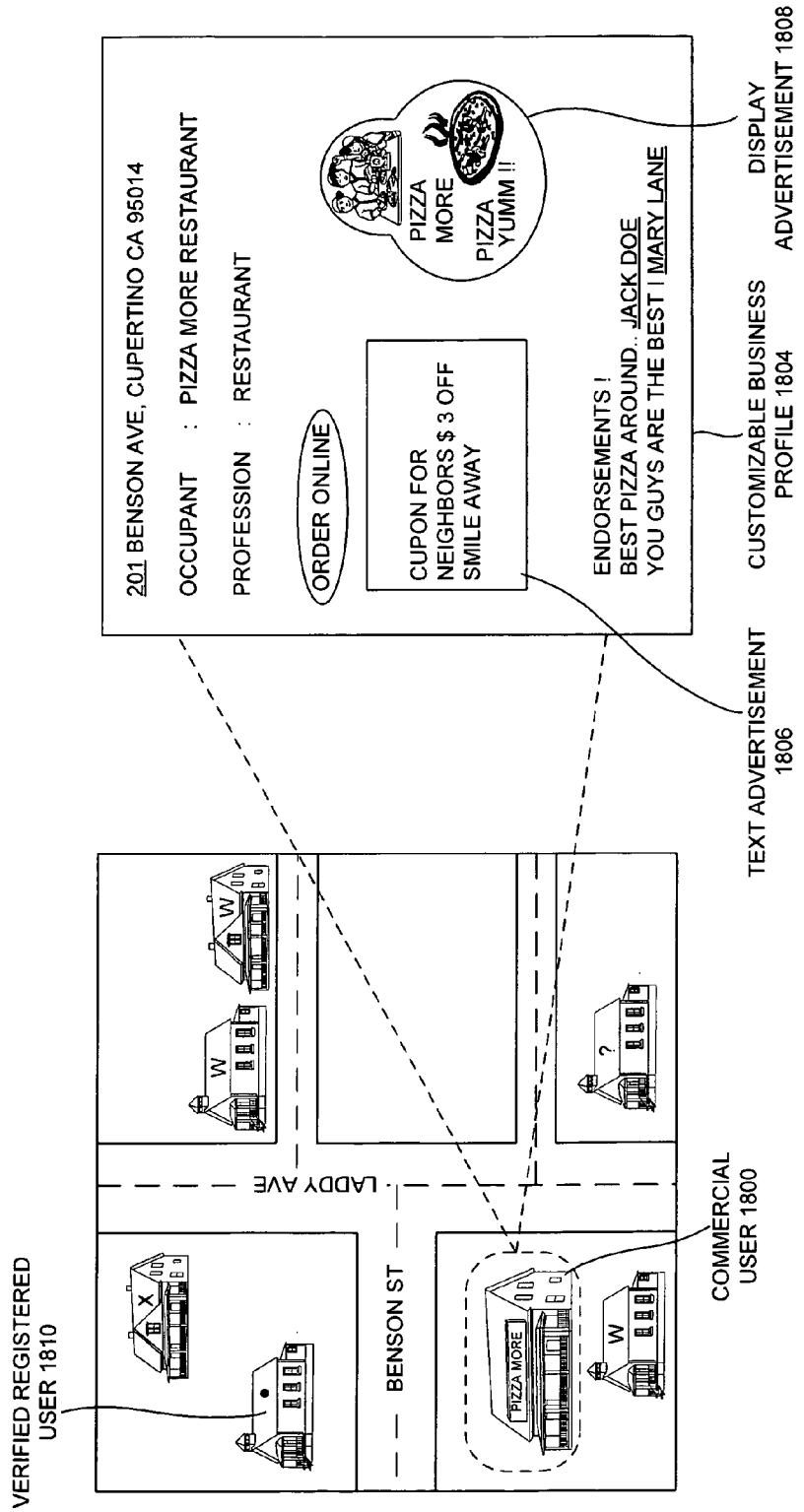
FIG. 18B is a user interface view of mapping of customizable business profile of the commercial user, according to one embodiment.
Figure 21:
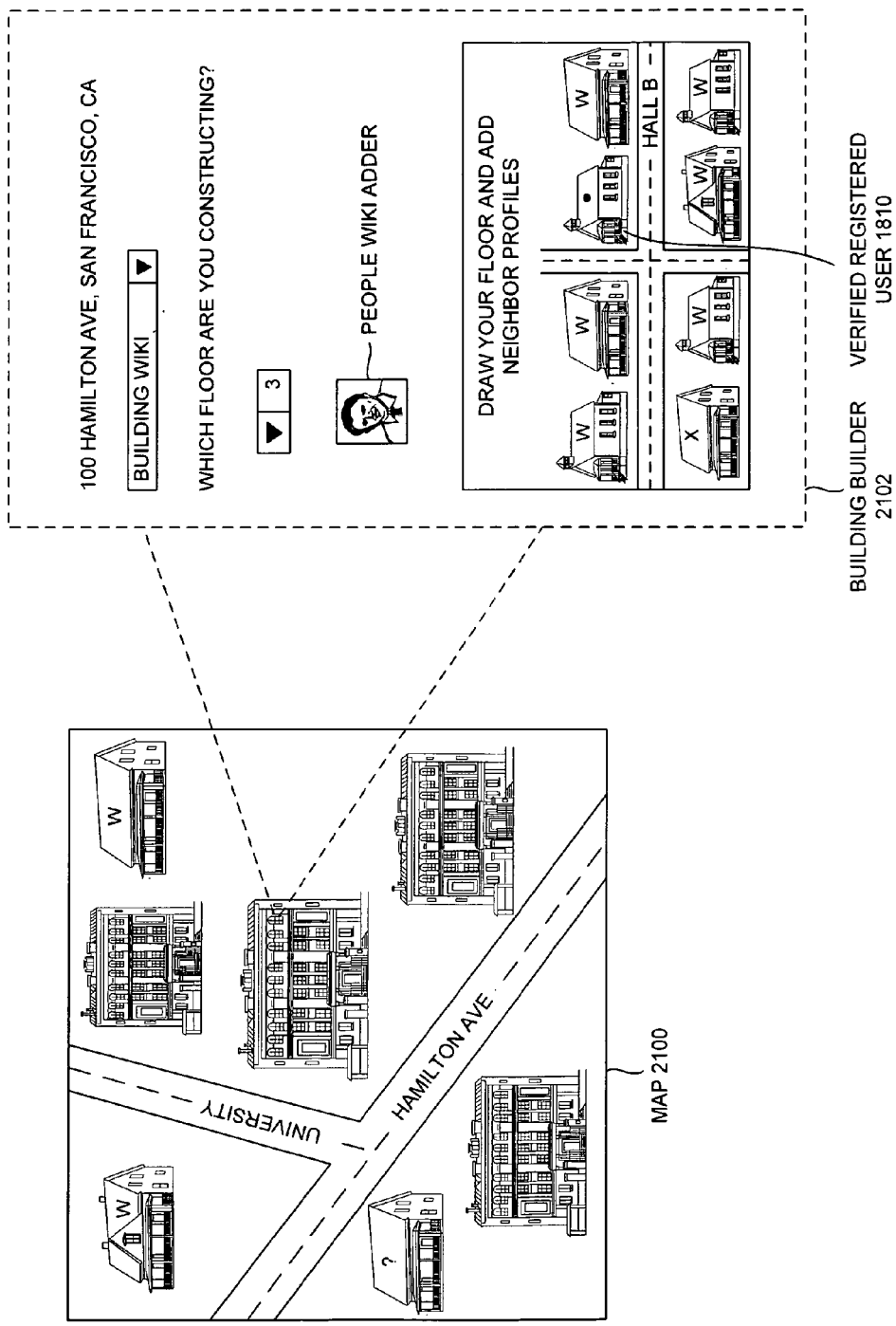
FIG. 21 is a user interface view of a building builder, according to one embodiment.

The no-match module 812 may request additional information from a verified registered user (e.g., a verified registered user 1810 of FIG. 18A-B, a verified registered user 1810 of FIG. 21) about a person, place, and business having no listing in the global neighborhood environment (e.g., the global neighborhood environment 600 of FIG. 6) when no matches are found in a search query of the verified registered user (e.g., a verified registered user 1810 of FIG. 18A-B, a verified registered user 1810 of FIG. 21).

The chat widget 816 may provide people to chat online, which is a way of communicating by broadcasting messages to people on the same site in real time. The group announcement widget 818 may communicate with a group and/or community may be by Usenet, Mailing list, calling and/or E-mail message sent to notify subscribers. The Voice over IP widget 820 may help in routing of voice conversations over the Internet and/or through any other IP-based network. The communicate module 806 may communicate directly with the people search widget 800, the business search module 802, the category search widget 804, the directory assistance module 808, the embedding module 810 may communicate with the no-match module 812 through the range selector module 814.

For example, a search module 608 of the global neighborhood environment (e.g., the global neighborhood environment 600 of FIG. 6) may enable the people search, the business search, and the category search of any data in the social community module (e.g., the social community module 606 of FIG. 6) and/or may enable embedding of any content in the global neighborhood environment (e.g., the global neighborhood environment 600 of FIG. 6) in other search engines, blogs, social networks, professional networks and/or static websites.

In addition, the communicate module 806 of the search module 608 may enable voice over internet, live chat, and/or group announcement functionality in the global neighborhood environment (e.g., the global neighborhood environment 600 of FIG. 6) among different members of the global neighborhood environment (e.g., the global neighborhood environment 600 of FIG. 6).

Also, the directory assistance module 808 of the search module 608 may provide voice response assistance to users (e.g., the user 616 of FIG. 6) assessable through a web and/or telephony interface of any category, business, community, and residence search queries of users (e.g., the user 616 of FIG. 6) of any search engine embedding content of the global neighborhood environment (e.g., the global neighborhood environment 600 of FIG. 6).

The embedding module 810 of the search module 608 may automatically extract address and/or contact info from other social networks, search engines, and content providers, and/ or to enable automatic extraction of group lists from contact databases of instant messaging platforms.

Furthermore, the no-match module 812 of the search module 608 to request additional information from the verified registered user (e.g., the verified registered user 1810 of FIG. 18A-B) about a person, place, and/or business having no listing in the global neighborhood environment (e.g., the global neighborhood environment 600 of FIG. 6) when no matches are found in a search query of the verified registered user (e.g., the verified registered user 1810 of FIG. 18A-B, the verified registered user 1810 of FIG. 21) and to create a new wiki page based on a response of the verified registered user (e.g., the verified registered user 1810 of FIG. 18A-B, the verified registered user 1810 of FIG. 21) about the at least one person, place, and/or business not previously indexed in the global neighborhood environment (e.g., the global neighborhood environment 600 of FIG. 6).

Figure 9:
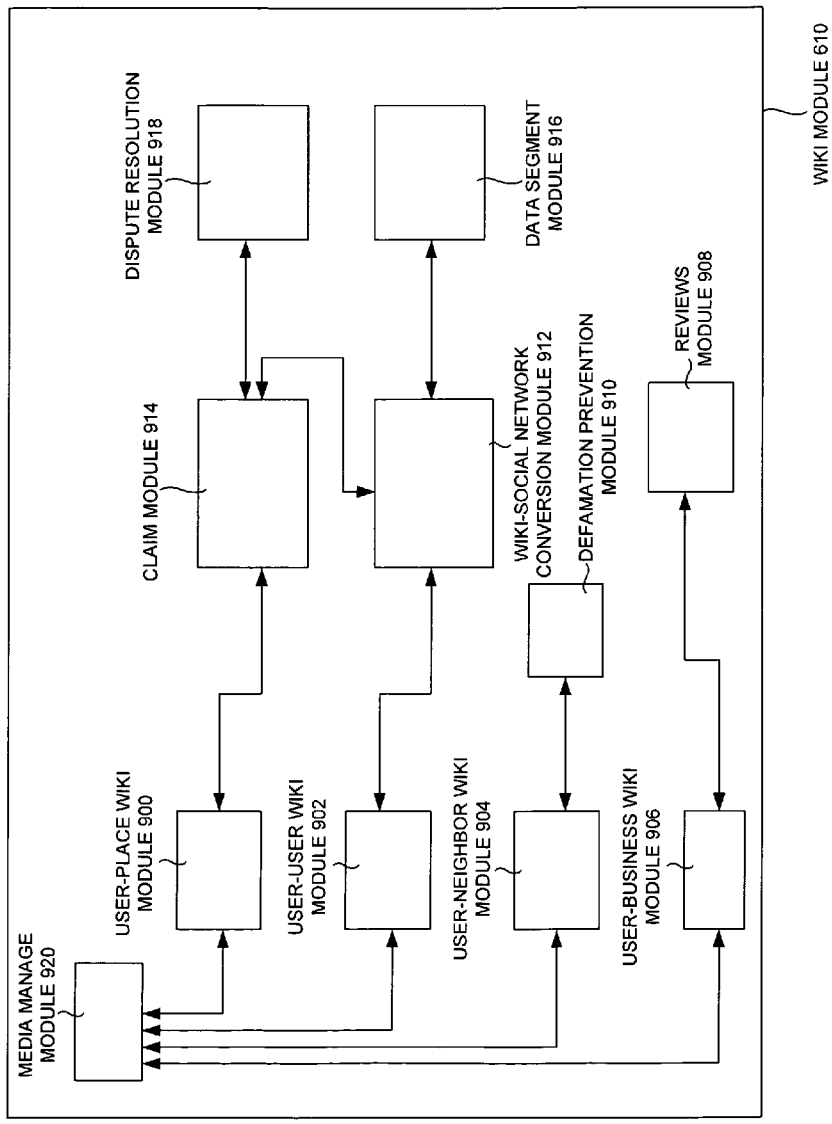
FIG. 9 is an exploded view of a wiki module of FIG. 6, according to one embodiment.

FIG. 9 is an exploded view of the wiki module 610 of FIG. 6, according to one embodiment. Particularly FIG. 9 illustrates a user-place wiki module 900, a user-user wiki module 902, a user-neighbor wiki module 904, a user-business wiki module 906, a reviews module 908, a defamation prevention module 910, a wiki-social network conversion module 912, a claim module 914, a data segment module 916, a dispute resolution module 918 and a media manage module 920, according to one embodiment.

The user-place wiki module 900 may manage the information of the user (e.g., the user 616 of FIG. 6) location in the global neighborhood environment (e.g., the global neighborhood environment 600 of FIG. 6). The user-user wiki module 902 may manage the user (e.g., the user 616 of FIG. 6) to view a profile of another user and geographical location in the neighborhood. The user-neighbor wiki module 904 may manage the user (e.g., the users 616 of FIG. 6) to view the profile of the registered neighbor and/or may trace the geographical location of the user in the global neighborhood environment (e.g., the global neighborhood environment 600 of FIG. 6). The user-business wiki module 906 may manage the profile of the user (e.g., the user 616 of FIG. 6) managing a commercial business in the neighborhood environment. The reviews module 908 may provide remarks, local reviews and/or ratings of various businesses as contributed by the users (e.g., the user 616 of FIG. 6) of the global neighborhood environment (e.g., the global neighborhood environment 600 of FIG. 6). The defamation prevention module 910 may enable the registered users to modify the information associated with the unregistered users identifiable through the viewing of the physical properties.

Figure 17B:
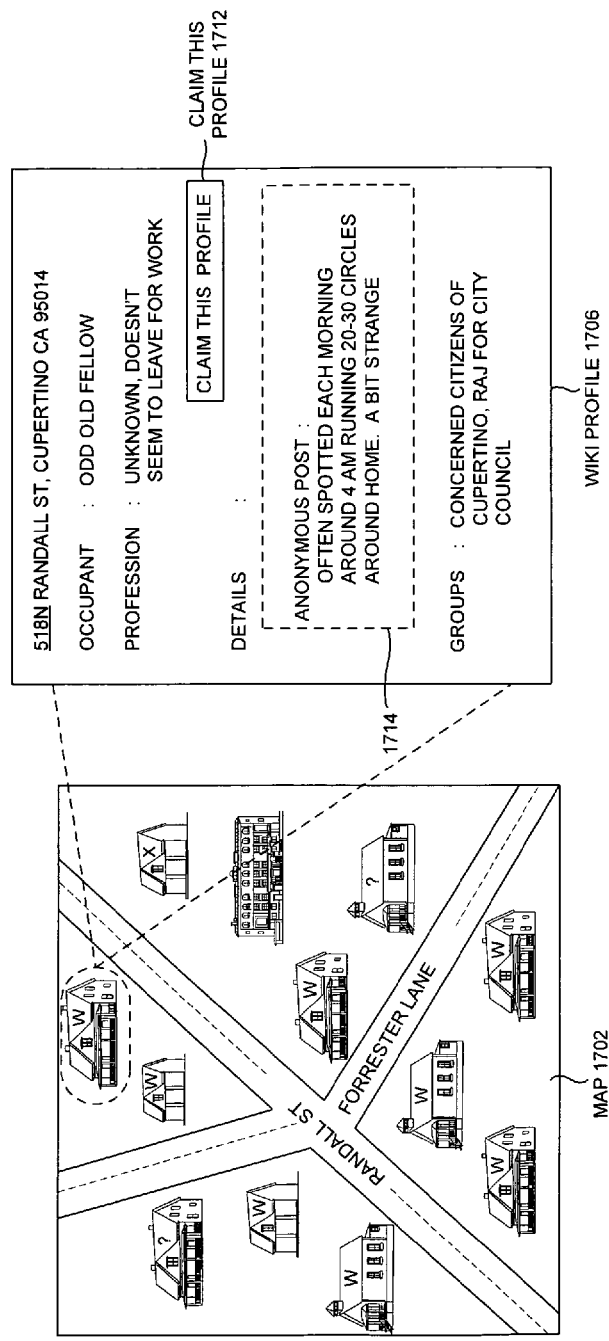
FIG. 17B is a user interface view of mapping of the wiki profile, according to one embodiment.
Figure 22:
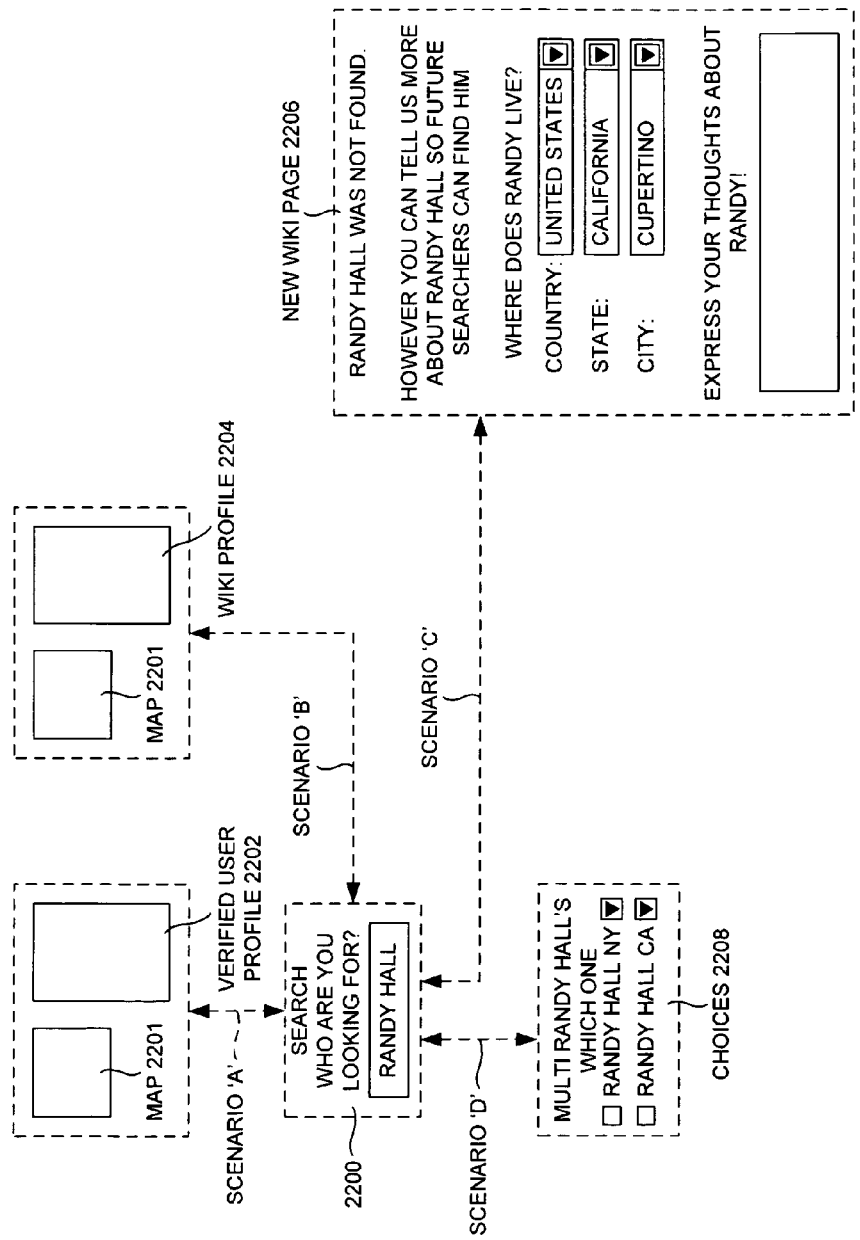
FIG. 22 is a systematic view of communication of wiki data, according to one embodiment.

The wiki-social network conversion module 912 of the wiki module 610 of FIG. 6 may transform the wiki profiles (e.g., the wiki profile 1706 of FIG. 17A-17B, the wiki profile 1802 of FIG. 18A, the wiki profile 2204 of FIG. 22) to social network profiles when the registered users claim the wiki profiles (e.g., the wiki profile 1706 of FIG. 17A-17B, the wiki profile 1802 of FIG. 18A, the wiki profile 2204 of FIG. 22).

The claim module 914 may enable the unregistered users to claim the physical properties associated with their residence (e.g., the residence 618 of FIG. 6). The dispute resolution module 918 may determine a legitimate user among different unregistered users who claim a same physical property. The media manage module 920 may allows users (e.g., the user 616 of FIG. 6) to manage and/or review a list any product from product catalog using a fully integrated, simple to use interface.

The media manage module 920 may communicate with the user-place wiki module 900, user-user wiki module 902, the user-neighbor wiki module 904 and the reviews module 908 through user-business wiki module 906. The user-place wiki module 900 may communicate with the dispute resolution module 918 through the claim module 914. The user-user wiki module 902 may communicate with the data segment module 916 through the wiki-social network conversion module 912. The user-neighbor wild module 904 may communicate with the defamation prevention module 910. The user-business wiki module 906 may communicate with the reviews module 908. The wiki-social network conversion module 912 may communicate with the claim module 914.

For example, the wiki module 610 of the global neighborhood environment (e.g., the global neighborhood environment 600 of FIG. 6) may enable the registered users to create the social network page of themselves, and may edit information associated with the unregistered users identifiable through a viewing of physical properties in which the unregistered users reside when the registered users have knowledge of characteristics associated with the unregistered users. Also, the claim module 914 of wiki module 610 may enable the unregistered users to claim the physical properties associated with their residence.

Furthermore, the dispute resolution module 918 of the wiki module 610 may determine a legitimate user of different unregistered users who claim a same physical property. The defamation prevention module 910 of the wiki module 610 may enable the registered users to modify the information associated with the unregistered users identifiable through the viewing of the physical properties, and/or to enable registered user voting of an accuracy of the information associated with the unregistered users.

Moreover, the reviews module of the wiki module 610 may provide comments, local reviews and/or ratings of various businesses as contributed by the registered users and/or unregistered users of the global network environment (e.g., the global neighborhood environment 600 of FIG. 6). The wiki-social network conversion module 912 of the wiki module 610 of FIG. 6 may transform the wiki profiles (e.g., the wiki profile 1706 of FIG. 17A-17B, the wiki profile 1802 of FIG. 18A, the wiki profile 2204 of FIG. 22) to social network profiles when the registered users claim the wiki profiles (e.g., the wiki profile 1706 of FIG. 17A-17B, the wiki profile 1802 of FIG. 18A, the wiki profile 2204 of FIG. 22).

Figure 10:
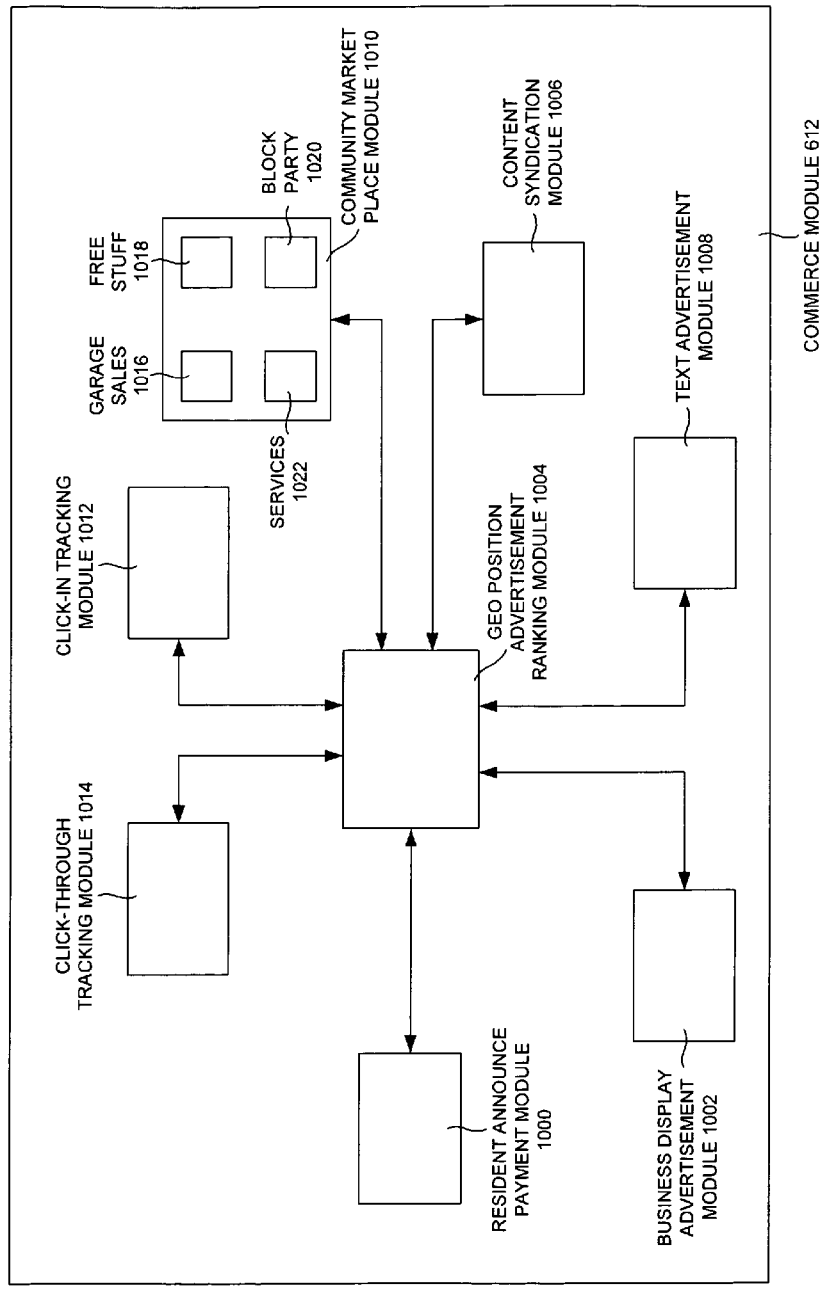
FIG. 10 is an exploded view of a commerce module of FIG. 6, according to one embodiment.

FIG. 10 is an exploded view of the commerce module 612 of FIG. 6, according to one embodiment. Particularly FIG. 10 illustrates a resident announce payment module 1000, a business display advertisement module 1002, a geo position advertisement ranking module 1004, a content syndication module 1006, a text advertisement module 1008, a community marketplace module 1010, a click-in tracking module 1012, a click-through tracking module 1014, according to one embodiment.

The community marketplace module 1010 may contain garage sales 1016, a free stuff 1018, a block party 1020 and services 1022, according to one embodiment. The geo-position advertisement ranking module 1004 may determine an order of the advertisement in a series of other advertisements provided in the global neighborhood environment (e.g., the global neighborhood environment 600 of FIG. 6) by other advertisers. The click-through tracking module 1014 may determine a number of click-throughs from the advertisement to a primary website of the business.

A click-in tracking module 1012 may determine a number of user (e.g., the user 616 of FIG. 6) who clicked in to the advertisement simultaneously. The community marketplace module 1010 may provide a forum in which the registered users can trade and/or announce messages of trading events with at least each other. The content syndication module 1006 may enable any data in the commerce module (e.g., the commerce module 612 of FIG. 6,10) to be syndicated to other network based trading platforms.

The business display advertisement module 1002 may impart advertisements related to business (e.g., the business 622 of FIG. 6), public relations, personal selling, and/or sales promotion to promote commercial goods and services. The text advertisement module 1008 may enable visibility of showing advertisements in the form of text in all dynamically created pages in the directory. The resident announce payment module 1000 may take part as component in a broader and complex process, like a purchase, a contract, etc.

The block party 1020 may be a large public celebration in which many members of a single neighborhood (e.g., the neighborhood 602A-N of FIG. 6) congregate to observe a positive event of some importance. The free stuff 1018 may be the free services (e.g., advertisement, links etc) available on the net. The garage sales 1016 may be services that may be designed to make the process of advertising and/or may find a garage sale more efficient and effective. The services 1022 may be non-material equivalent of a good designed to provide a list of services that may be available for the user (e.g., the user 616 of FIG. 6).

The geo position advertisement ranking module 1004 may communicate with the resident announce payment module 1000, the business display advertisement module 1002, the content syndication module 1006, the text advertisement module 1008, the community marketplace module 1010, the click-in tracking module 1012 and the click-through tracking module 1014.

For example, the commerce module 608 of the global neighborhood environment (e.g., the global neighborhood environment 600 of FIG. 6) may provide an advertisement system to a business which may purchase their location in the global neighborhood environment (e.g., the global neighborhood environment 600 of FIG. 6) in which the advertisement may be viewable concurrently with a map indicating a location of the business, and/or in which revenue may be attributed to the global neighborhood environment (e.g., the global neighborhood environment 600 of FIG. 6) when the registered users and/or the unregistered users click-in on a simultaneously displayed data of the advertisement along with the map indicating a location of the business.

Also, the geo-position advertisement ranking module 1004 of the commerce module 612 may determine an order of the advertisement in a series of other advertisements provided in the global neighborhood environment (e.g., the global neighborhood environment 600 of FIG. 6) by other advertisers, wherein the advertisement may be a display advertisement, a text advertisement, and/or an employment recruiting portal associated with the business that may be simultaneously displayed with the map indicating the location of the business.

Moreover, the click-through tracking module 1014 of the commerce module 612 of FIG. 6 may determine a number of click-throughs from the advertisement to a primary website of the business. In addition, the click in tracking module 1012 of the commerce module 612 may determine the number of users (e.g., the user 616 of FIG. 6) who clicked in to the advertisement simultaneously displayed with the map indicating the location of the business.

The community marketplace module 1010 of the commerce module 612 of FIG. 6 may provide a forum in which the registered users may trade and/or announce messages of trading events with certain registered users in geographic proximity from each other. Also, the content syndication module 1006 of the commerce module 612 of the FIG. 6 may enable any data in the commerce module 612 to be syndicated to other network based trading platforms.

Figure 11:
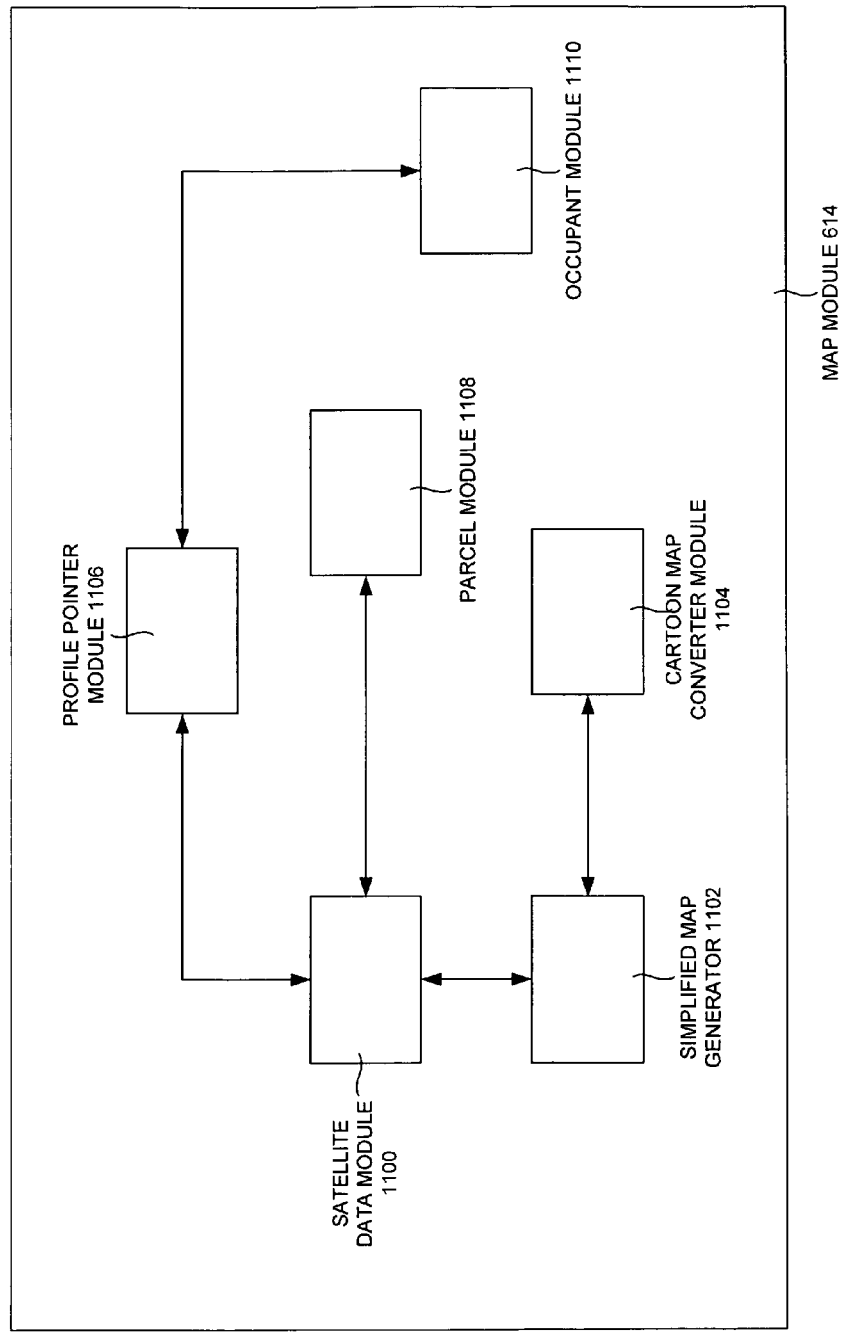
FIG. 11 is an exploded view of a map module of FIG. 6, according to one embodiment.

FIG. 11 is an exploded view of a map module 614 of FIG. 6, according to one embodiment. Particularly FIG. 11 may include a satellite data module 1100, a simplified map generator module 1102, a cartoon map converter module 1104, a profile pointer module 1106, a parcel module 1108 and occupant module 1110, according to one embodiment. The satellite data module 1100 may help in mass broadcasting (e.g., maps) and/or as telecommunications relays in the map module 614 of FIG. 6.

The simplified map generator module 1102 may receive the data (e.g., maps) from the satellite data module 1100 and/or may convert this complex map into a simplified map with fewer colors. The cartoon map converter module 1104 may apply a filter to the satellite data (e.g., data generated by the satellite data module 1100 of FIG. 11) into a simplified polygon based representation.

The parcel module 1108 may identify some residence, civic, and business locations in the satellite data (e.g., the satellite data module 1100 of FIG. 11). The occupant module 1110 may detect the geographical location of the registered user in the global neighborhood environment (e.g., the global neighborhood environment 600 of FIG. 6). The profile pointer module 1106 may detect the profiles of the registered user via the data received from the satellite. The cartoon map converter module 1104 may communicate with, the satellite data module 1100, the simplified map generator module 1102, the profile pointer module 1106 and the occupant module 1110. The parcel module 1108 may communicate with the satellite data module 1100.

For example, a map module 614 of the global neighborhood environment (e.g., the global neighborhood environment 600 of FIG. 6) may include a map data associated with a satellite data (e.g., data generated by the satellite data module 1100 of FIG. 11) which serves as a basis of rendering the map in the global neighborhood environment (e.g., the global neighborhood environment 600 of FIG. 6) and/or which includes a simplified map generator (e.g., the simplified map generator module 1102 of FIG. 11) which may transform the map to a fewer color and location complex form using a parcel data which identifies residence, civic, and business locations in the satellite data.

Also, the cartoon map converter module 1104 in the map module 614 may apply a filter to the satellite data (e.g., data generated by the satellite data module 1100 of FIG. 11) to transform the satellite data into a simplified polygon based representation using a Bezier curve algorithm that converts point data of the satellite data to a simplified form.

FIG. 12 is a table view of user address details, according to one embodiment. Particularly the table 1250 of FIG. 12 illustrates a user field 1200, a verified field? 1202, a range field 1204, a principal address field 1206, a links field 1208, a contributed? field 1210 and an other field(s) 1212, according to one embodiment. The table 1250 may include the information related to the address verification of the user (e.g., the user 616 of FIG. 6). The user field 1200 may include information such as the names of the registered users in a global neighborhood environment (e.g., a global neighborhood environment 600 of FIG. 6).

The verified? field 1202 may indicate the status whether the data, profiles and/or email address received from various registered user are validated or not. The range field 1204 may correspond to the distance of a particular registered user geographical location in the global neighborhood environment (e.g., the global neighborhood environment 600 of FIG. 6).

The principal address field 1206 may display primary address of the registered user in the global neighborhood environment (e.g., the global neighborhood environment 600 of FIG. 6). The links field 1208 may further give more accurate details and/or links of the address of the user (e.g., the user 616 of FIG. 6). The contributed? field 1210 may provide the user with the details of another individual and/or users contribution towards the neighborhood environment (e.g., the global neighborhood environment 600 of FIG. 6). The other(s) field 1212 may display the details like the state, city, zip and/or others of the user's location in the global neighborhood environment (e.g., the global neighborhood environment 600 of FIG. 6).

The user field 1200 displays "Joe" in the first row and "Jane" in the second row of the user field 1200 column of the table 1250 illustrated in FIG. 12. The verified field? 1202 displays "Yes" in the first row and "No" in the second row of the verified? field 1202 column of the table 1250 illustrated in FIG. 12. The range field 1204 displays "5 miles" in the first row and "Not enabled" in the second row of the range field 1204 column of the table 1250 illustrated in FIG. 12. The principal address field 1206 displays "500 Clifford Cupertino, Calif." in the first row and "500 Johnson Cupertino, Calif." in the second row of the principle address field 1206 column of the table 1250 illustrated in FIG. 12. The links field 1208 displays "859 Bette, 854 Bette" in the first row and "851 Bette 100 Steven's Road" in the second row of the links field 1208 column of the table 1250 illustrated in FIG. 12.

The contributed? field 1210 displays "858 Bette, 10954, Farallone" in the first row and "500 Hamilton, 1905E University" in the second row of the contributed field 1210 column of the table 1250 illustrated in FIG. 12. The other(s) field 1212 displays "City, State, Zip, other" in the first row of the other(s) field 1212 column of the table 1250 illustrated in FIG. 12.

Figure 13:
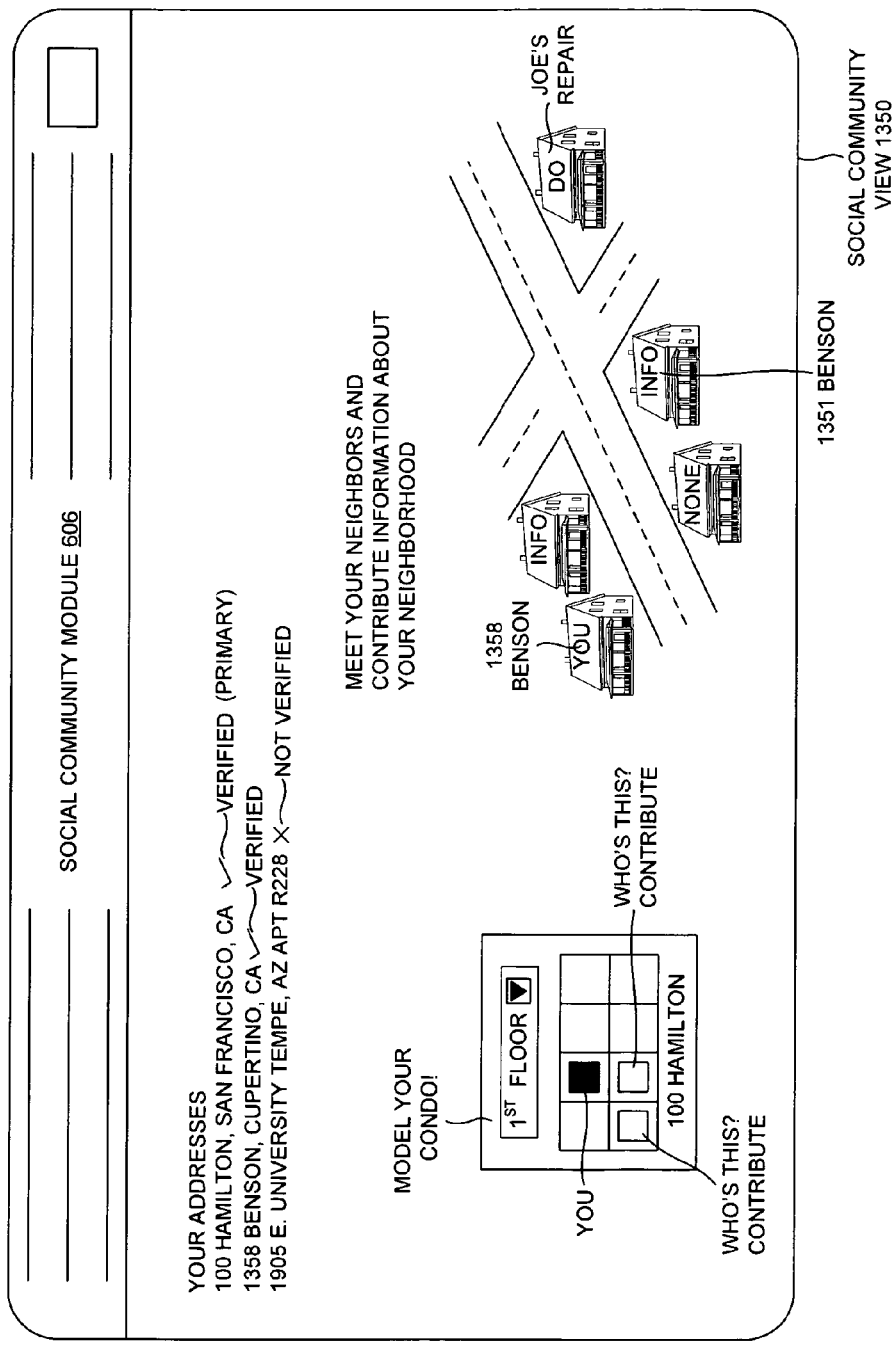
FIG. 13 is a social community view of a social community module, according to one embodiment.

FIG. 13 is a user interface view of the social community module 606, according to one embodiment. The user interface view 1350 may display the information associated with the social community module (e.g., the social community module 606 of FIG. 6). The user interface view 1350 may display map of the specific geographic location associated with the user profile of the social community module (e.g., the social community module 606 of FIG. 6). The user interface view 1350 may display the map based geographic location associated with the user profile (e.g., the user profile 1700 of FIG. 17A) only after verifying the address of the registered user of the global neighborhood environment (e.g., the global neighborhood environment 600 of FIG. 6).

In addition, the user interface view 1350 may provide a building creator (e.g., the building builder 2102 of FIG. 21), in which the registered users of the global neighborhood environment (e.g., the global neighborhood environment 600 of FIG. 6) may create and/or modify empty wiki profiles (e.g., a wiki profile 1706 of FIG. 17A-17B, a wiki profile 1802 of FIG. 18A, a wiki profile 2204 of FIG. 22), building layouts, social network pages, etc. The user interface view 1350 of the social community module 606 may enable access to the user (e.g., the user 616 of FIG. 6) to model a condo on any floor (e.g., basement, ground floor, first floor, etc.) selected through the drop down box by the registered user of the global neighborhood environment (e.g., the global neighborhood environment 600 of FIG. 6). The user interface view 1350 of the social community module (e.g., the social community module 606 of FIG. 6) may enable the registered user of the global neighborhood environment (e.g., the global neighborhood environment 600 of FIG. 6) to contribute information about their neighbors (e.g., the neighbor 620 of FIG. 6).

Figure 14:
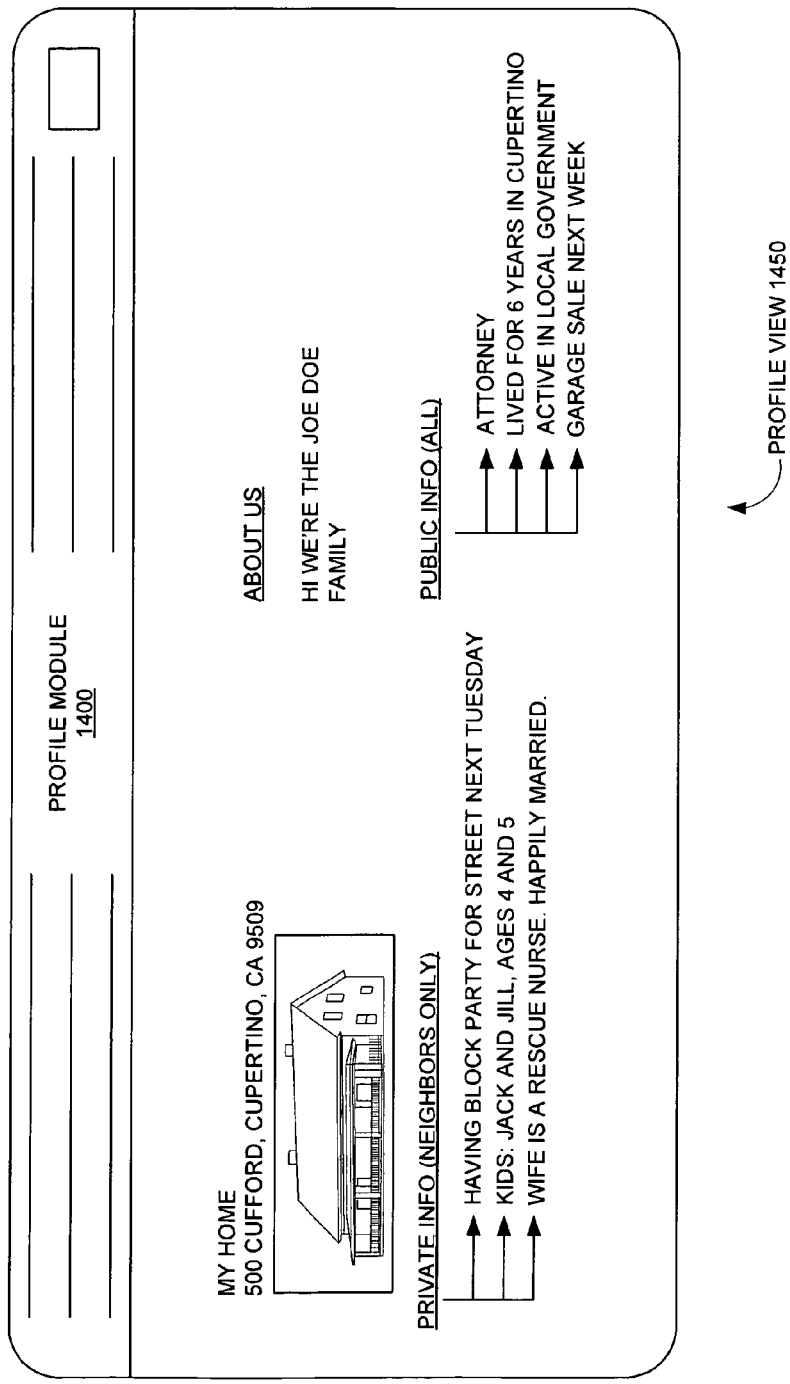
FIG. 14 is a profile view of a profile module, according to one embodiment.

FIG. 14 is a profile view 1450 of a profile module 1400, according to one embodiment. The profile view 1450 of profile module 1400 may offer the registered user to access the profile about the neighbors (e.g., the neighbor 620 of FIG. 6). The profile view 1450 of profile module 1400 may indicate the information associated with the profile of the registered user of the global neighborhood environment (e.g., the global neighborhood environment 600 of FIG. 6). The profile view 1450 may display the address of the registered user. The profile view 1450 may also display events organized by the neighbors (e.g., the neighbor 620 of FIG. 6), history of the neighbors (e.g., the neighbor 620 of FIG. 6), and/or may also offer the information (e.g., public, private, etc) associated with the family of the neighbors (e.g., the neighbor 620 of FIG. 6) located in the locality of the user (e.g., the user(s) 616 of FIG. 6) of the global neighborhood environment (e.g., the global neighborhood environment 600 of FIG. 6).

Figure 15:
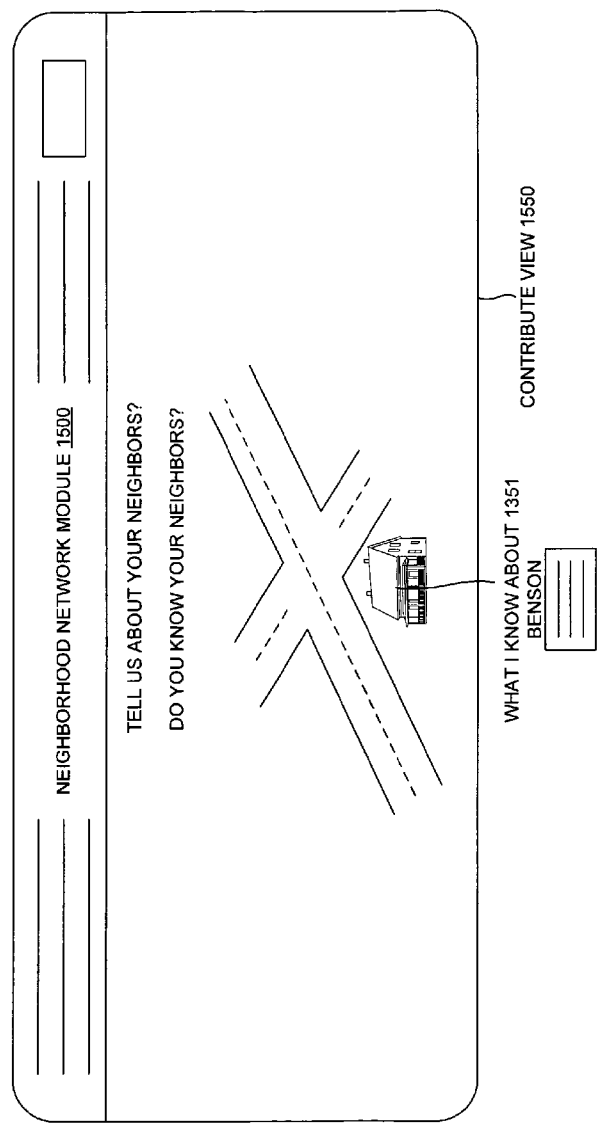
FIG. 15 is a contribute view of a neighborhood network module, according to one embodiment.

FIG. 15 is a contribute view 1550 of a neighborhood network module 1500, according to one embodiment. The contribute view 1550 of the neighborhood network module 1500 may enable the registered user of the global neighborhood environment (e.g., the global neighborhood environment 600 of FIG. 6) to add information about their neighbors in the neighborhood network. The contribute view 1550 of the neighborhood network module 1500 may offer registered user of the global neighborhood environment (e.g., the global neighborhood environment 600 of FIG. 6) to add valuable notes associated with the family, events, private information, etc.

Figure 16:
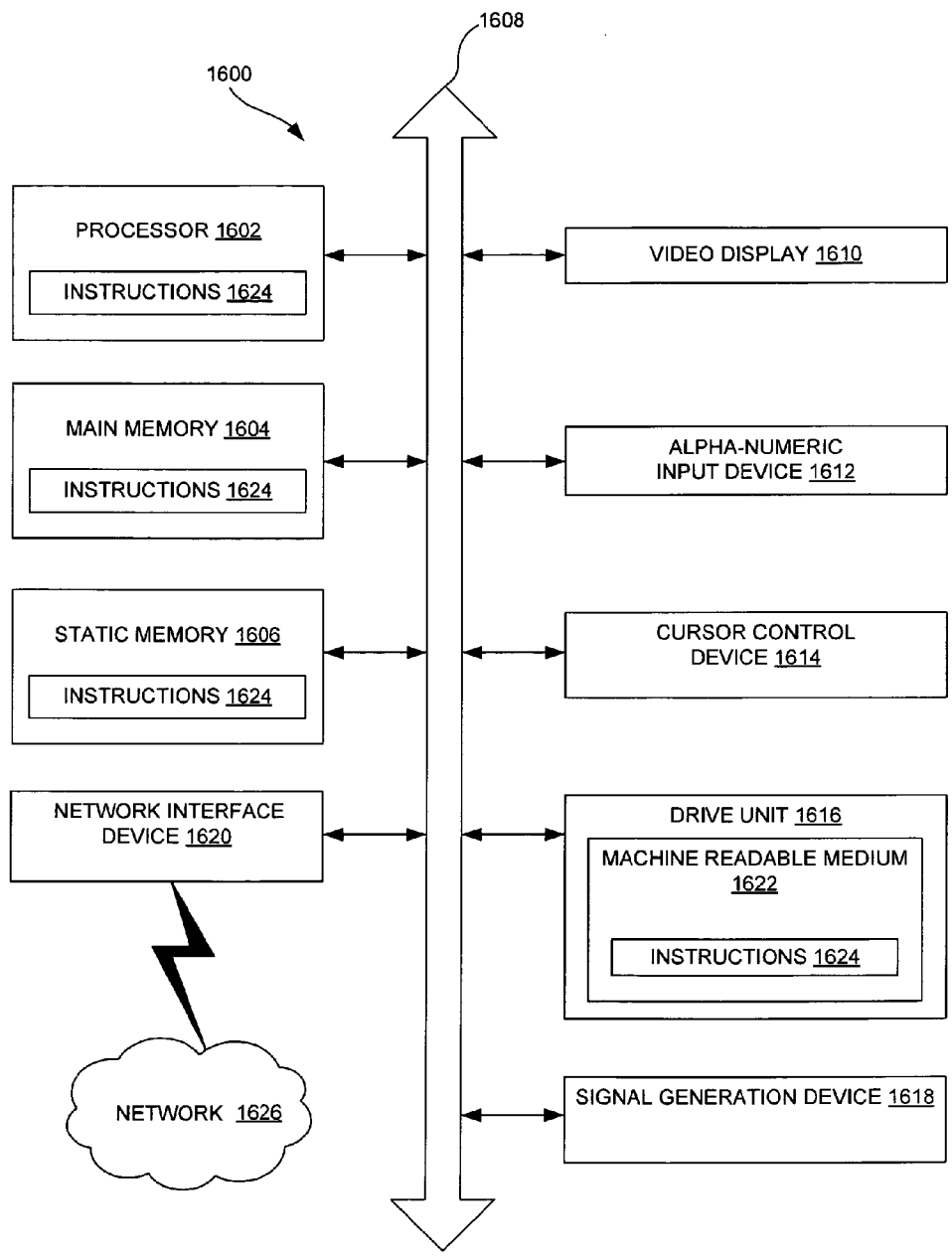
FIG. 16 is a diagrammatic system view of a data processing system in which any of the embodiments disclosed herein may be performed, according to one embodiment.

FIG. 16 is a diagrammatic system view, according to one embodiment. FIG. 16 is a diagrammatic system view 1600 of a data processing system in which any of the embodiments disclosed herein may be performed, according to one embodiment. Particularly, the diagrammatic system view 1600 of FIG. 16 illustrates a processor 1602, a main memory 1604, a static memory 1606, a bus 1608, a video display 1610, an alpha-numeric input device 1612, a cursor control device 1614, a drive unit 1116, a signal generation device 1618, a machine readable medium 1622, instructions 1624, and a network 1626, according to one embodiment.

The diagrammatic system view 1600 may indicate a personal computer and/or a data processing system in which one or more operations disclosed herein are performed. The processor 1602 may be microprocessor, a state machine, an application specific integrated circuit, a field programmable gate array, etc. (e.g., Intel® Pentium® processor). The main memory 1604 may be a dynamic random access memory and/or a primary memory of a computer system.

The static memory 1606 may be a hard drive, a flash drive, and/or other memory information associated with the data processing system. The bus 1608 may be an interconnection between various circuits and/or structures of the data processing system. The video display 1610 may provide graphical representation of information on the data processing system. The alpha-numeric input device 1612 may be a keypad, keyboard and/or any other input device of text (e.g., a special device to aid the physically handicapped). The cursor control device 1614 may be a pointing device such as a mouse.

The drive unit 1616 may be a hard drive, a storage system, and/or other longer term storage subsystem. The signal generation device 1618 may be a bios and/or a functional operating system of the data processing system. The machine readable medium 1622 may provide instructions on which any of the methods disclosed herein may be performed. The instructions 1624 may provide source code and/or data code to the processor 1602 to enable any one/or more operations disclosed herein.

FIG. 17A is a user interface view of mapping a user profile 1700 of the geographic location 1704, according to one embodiment. In the example embodiment illustrated in FIG. 17A, the user profile 1700 may contain the information associated with the geographic location 1704. The user profile 1700 may contain the information associated with the registered user. The user profile 1700 may contain information such as address user of the specific geographic location, name of the occupant, profession of the occupant, details, phone number, educational qualification, etc.

The map 1702 may indicate the global neighborhood environment (e.g., the global neighborhood environment 600 of FIG. 6) of the geographical location 1704, a wiki profile 1706 (e.g., the wiki profile 1802 of FIG. 18A, the wiki profile 2204 of FIG. 22), and a delisted profile 1708. The geographical location 1704 may be associated with the user profile 1700. The wiki profile 1706 may be the wiki profile 1706 associated with the neighboring property surrounding the geographic location 1704. The delisted profile 1708 illustrated in example embodiment of FIG. 17A, may be the wiki profile 1706 that may be delisted when the registered user claims the physical property. The block 1710 illustrated in the example embodiment of FIG. 17A may be associated with hobbies, personal likes, etc. The block 1716 may be associated with events, requirements, etc. that may be displayed by the members of the global neighborhood environment (e.g., the global neighborhood environment 600 of FIG. 6).

For example, a verified registered user (e.g., a verified registered user 1810 of FIG. 18A-B, a verified registered user 1810 of FIG. 21) may be associated with a user profile 1700. The user profile 1700 may be associated with a specific geographic location. A map concurrently displaying the user profile 1700 and the specific geographic location 1704 may be generated. Also, the wiki profiles 1706 associated with different geographic locations surrounding the specific geographic location associated with the user profile 1700 may be simultaneously generated in the map. In addition, a query of the user profile 1700 and/or the specific geographic location may be processed.

Similarly, a tag data (e.g., the tags 1710 of FIG. 17A) associated with the specific geographic locations, a particular geographic location, and the delisted geographic location may be processed. A frequent one of the tag data (e.g., the tags 1710 of FIG. 17A) may be displayed when the specific geographic location and/or the particular geographic location is made active, but not when a geographic location is delisted.

FIG. 17B is a user interface view of mapping of the wiki profile 1706, according to one embodiment. In the example embodiment illustrated in FIG. 17B, the map 1702 may indicate the geographic locations in the global neighborhood environment (e.g., the global neighborhood environment 600 of FIG. 6) and/or may also indicate the geographic location of the wiki profile 1706. The wiki profile 1706 may display the information associated with the registered user of the global neighborhood environment (e.g., the global neighborhood environment 600 of FIG. 6). The link claim this profile 1712 may enable the registered user to claim the wiki profile 1706 and/or may also allow the verified registered user (e.g., the verified registered user 1810 of FIG. 18) to edit any information in the wiki profiles 1706. The block 1714 may display the information posted by any of the verified registered users (e.g., the verified registered user 1810 of FIG. 18A-B, the verified registered user 1810 of FIG. 21) of the global neighborhood environment (e.g., the global neighborhood environment 600 of FIG. 6).

For example, a particular wiki profile (e.g., the particular wiki profile may be associated with a neighboring property to the specific property in the neighborhood) of the wiki profiles (e.g., the wiki profile 1802 of FIG. 18A, the wiki profile 2204 of FIG. 22) may be converted to another user profile (e.g., the user profile may be tied to a specific property in a neighborhood) when a different registered user (e.g., the user 616 of FIG. 6) claims a particular geographic location to the specific geographic location associated with the particular wiki profile.

In addition, a certain wiki profile of the wiki profiles may be de-listed when a private registered user claims a certain geographic location (e.g., the geographical location 1704 of FIG. 17A) adjacent to the specific geographic location and/or the particular geographic location. Also, the certain wiki profile in the map 1702 may be masked when the certain wiki profile is de-listed through the request of the private registered user.

Furthermore, a tag data (e.g., the tags 1710 of FIG. 17A) associated with the specific geographic location, the particular geographic location, and the de-listed geographic location may be processed. A frequent one of the tag data may be displayed when the specific geographic location and/or the particular geographic location are made active, but not when a geographic location is de-listed.

Moreover, the verified registered user (e.g., the verified registered user 1810 of FIG. 18A-B, the verified registered user 1810 of FIG. 21) may be permitted to edit any information in the wiki profiles 1706 including the particular wiki profile 1706 and/or the certain wiki profile until the certain wiki profile may be claimed by the different registered user and/or the private registered user. In addition, a claimant of any wiki profile 1706 may be enabled to control what information is displayed on their user profile. Also, the claimant may be allowed to segregate certain information on their user profile 1700 such that only other registered users directly connected to the claimant are able to view data on their user profile 1700.

FIG. 18A is a user interface view of mapping of a wiki profile 1802 of the commercial user 1800, according to one embodiment. In the example embodiment illustrated in FIG. 18A, the commercial user 1800 may be associated with the customizable business profile 1804 located in the commercial geographical location. The wiki profile 1802 may contain the information associated with the commercial user 1800. The wiki profile 1802 may contain the information such as address, name, profession, tag, details (e.g., ratings), and educational qualification etc. of the commercial user 1800. The verified registered user 1810 may be user associated with the global neighborhood environment (e.g., the global neighborhood environment 600 of FIG. 6) and may communicate a message to the neighborhood commercial user 1800. For example, a payment of the commercial user 1800 and the verified registered user 1810 may be processed.

FIG. 18B is a user interface view of mapping of customizable business profile 1804 of the commercial user 1800, according to one embodiment. In the example embodiment illustrated in FIG. 18B, the commercial user 1800 may be associated with the customizable business profile 1804. The customizable business profile 1804 may be profile of any business firm (e.g., restaurant, hotels, supermarket, etc.) that may contain information such as address, occupant name, profession of the customizable business. The customizable business profile 1804 may also enable the verified registered user 1810 to place online order for the products.

For example, the commercial user 1800 may be permitted to purchase a customizable business profile 1804 associated with a commercial geographic location. Also, the verified registered user 1810 may be enabled to communicate a message to the global neighborhood environment (e.g., the global neighborhood environment 600 of FIG. 6) based on a selectable distance range away from the specific geographic location. In addition, a payment of the commercial user 1800 and/or the verified registered user 1810 may be processed.

A text advertisement 1806 may display the information associated with the offers and/or events of the customizable business. The display advertisement 1808 may display ads of the products of the customizable business that may be displayed to urge the verified registered user 1810 to buy the products of the customizable business. The verified registered user 1810 may be user associated with the global neighborhood environment (e.g., the global neighborhood environment 600 of FIG. 6) that may communicate a message to the commercial user 1800 and/or may be interested in buying the products of the customizable business.

Figure 19:
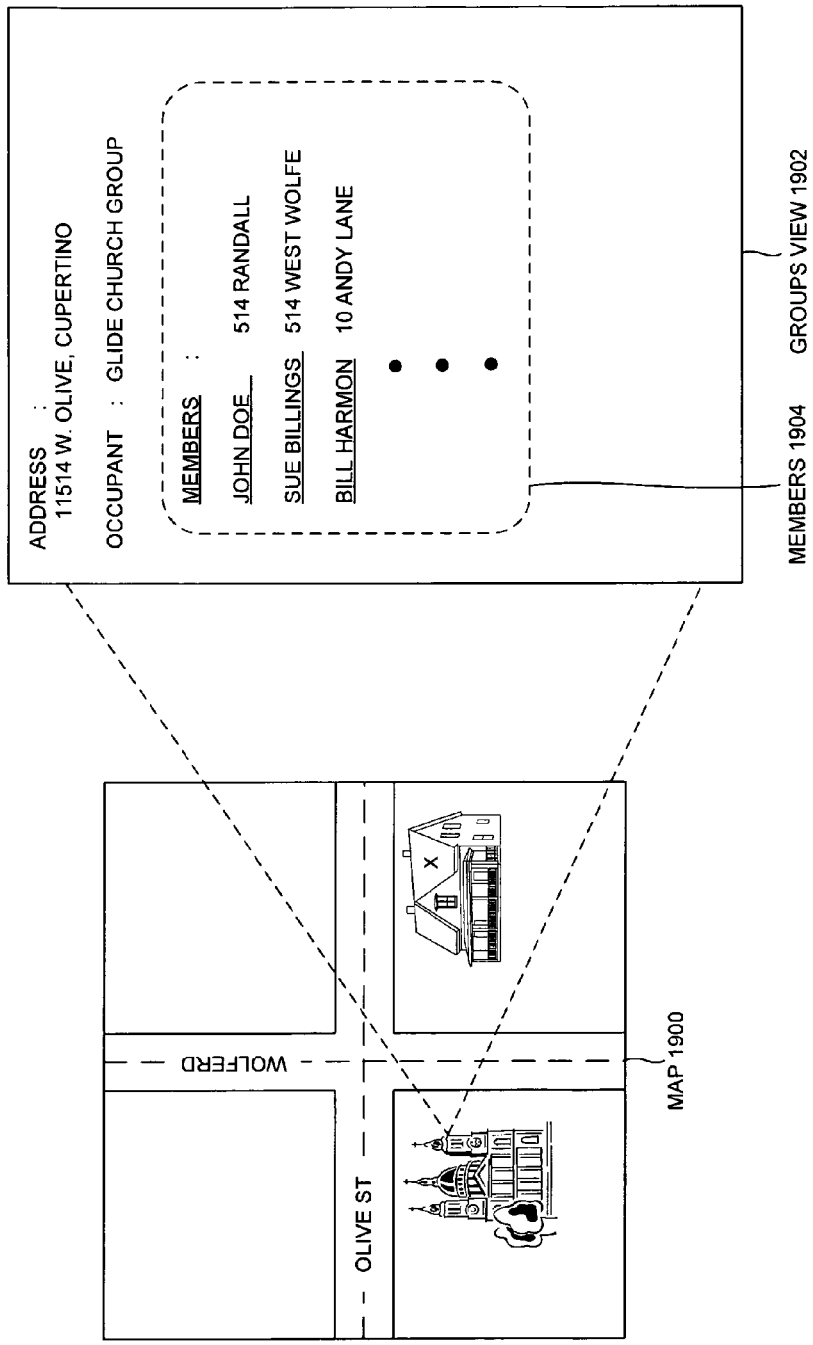
FIG. 19 is a user interface view of a group view associated with particular geographical location, according to one embodiment.

FIG. 19 is a user interface view of a groups view 1902 associated with particular geographical location, according to one embodiment. Particularly FIG. 19 illustrates, a map 1900, a groups view 1902, according to one embodiment. In the example embodiment illustrated in FIG. 19, the map view 1900 may display map view of the geographical location of the specific group of the global neighborhood environment (e.g., the global neighborhood environment 600 of FIG. 6). The groups view 1902 may contain the information (e.g., address, occupant, etc.) associated with the particular group of the specific geographical location (e.g., the geographical location displayed in the map 1900) of the global neighborhood environment (e.g., the global neighborhood environment 600 of FIG. 6). The members 1904 may contain the information about the members associated with the group (e.g., the group associated with geographical location displayed in the map) of the global neighborhood environment (e.g., the global neighborhood environment 600 of FIG. 6).

FIG. 20 is a user interface view of claim view 2050, according to one embodiment. The claim view 2050 may enable the user to claim the geographical location of the registered user. Also, the claim view 2050 may facilitate the user of the global neighborhood environment (e.g., the global neighborhood environment 600 of FIG. 6) to claim the geographical location of property under dispute.

In the example embodiment illustrated in FIG. 20, the operation 2002 may allow the registered user of the global neighborhood environment (e.g., the global neighborhood environment 600 of FIG. 6) to claim the address of the geographic location claimed by the registered user. The operation 2004 illustrated in example embodiment of FIG. 20, may enable the user to de-list the claim of the geographical location. The operation 2006 may offer information associated with the document to be submitted by the registered users of the global neighborhood environment (e.g., the global neighborhood environment 600 of FIG. 6) to claim the geographical location.

FIG. 21 is a user interface view of a building builder 2102, according to one embodiment. Particularly the FIG. 21 illustrates, a map 2100, a building builder 2102, according to one embodiment. The map 2100 may display the geographical location in which the verified registered user (e.g., the verified registered user 1810 of FIG. 18A-B) may create and/or modify empty wiki profiles (e.g., the wiki profile 1706 of FIG. 17A-17B, the wiki profile 1802 of FIG. 18A, the wiki profile 2204 of FIG. 22), building layouts, social network pages, and floor levels structures housing residents and businesses in the neighborhood (e.g., the neighborhood 602A-N of FIG. 6). The building builder 2102 may enable the verified registered users (e.g., the verified registered user 1810 of FIG. 18A-B) of the global neighborhood environment (e.g., the global neighborhood environment 600 of FIG. 6) to draw floor level structures, add neighbor's profiles and/or may also enable to select the floor number, wiki type, etc. as illustrated in example embodiment of FIG. 21.

The verified registered user 1810 may be verified registered user of the global neighborhood environment (e.g., the global neighborhood environment 600 of FIG. 6) interested in creating and/or modifying wiki profiles (e.g., the wiki profile 1706 of FIG. 17A-17B, the wiki profile 1802 of FIG. 18A, the wiki profile 2204 of FIG. 22), building layouts, social network pages, and floor level structure housing residents and businesses in the neighborhood (e.g., the neighborhood 602A-N of FIG. 6) in the building builder 2102.

For example, a social community module (e.g., a social community module 606 of FIG. 6) of the global neighborhood environment (e.g., the global neighborhood environment 600 of FIG. 6) may generate a building creator (e.g., the building builder 2102 of FIG. 21) in which the registered users may create and/or modify empty wiki profiles (e.g., the wiki profile 1706 of FIG. 17A-17B, the wiki profile 1802 of FIG. 18A, the wiki profile 2204 of FIG. 22), building layouts, social network pages, and floor levels structures housing residents and/or businesses in the neighborhood (e.g., the neighborhood 602A-N of FIG. 6).

FIG. 22 is a systematic view of communication of wiki data, according to one embodiment. Particularly FIG. 22 illustrates a map 2201, verified user profile 2202, choices 2208 and a new wiki page 2206, according to one embodiment. The map 2201 may locate the details of the address of the registered user of the global neighborhood environment (e.g., the global neighborhood environment 600 of FIG. 6). The verified user profile 2202 may store the profiles of the verified user of the global neighborhood environment (e.g., the global neighborhood environment 600 of FIG. 6. The wiki profile 2204 may be the profiles of the registered user who may claim them in the global neighborhood environment (e.g., the global neighborhood environment 600 of FIG. 6).

In operation 2200 the search for the user profile (e.g., the user profile 1700 of FIG. 17A) may be carried out by the registered user. The new wiki page 2206 may solicit for the details of a user whom the registered user is searching for in the global neighborhood environment (e.g., the global neighborhood environment 600 of FIG. 6). The choices 2208 may ask whether the requested search is any among the displayed names. The new wiki page 2206 may request for the details of location such as country, state and/or city. The operation 2200 may communicate with the choices 2208, and the new wiki page 2206.

For example, a no-match module (e.g., a no-match module 812 of FIG. 8) of the search module (e.g., the search module 608 of FIG. 6)*to* request additional information from the verified registered user about a person, place, and business having no listing in the global neighborhood environment (e.g., the global neighborhood environment 600 of FIG. 6) when no matches are found in a search query of the verified registered user (e.g., the verified registered user 1810 of FIG. 18A-B), and to create a new wiki page 2206 based on a response of the verified registered user 2202 about the at least one person, place, and business not previously indexed in the global neighborhood environment (e.g., the global neighborhood environment 600 of FIG. 6).

Figure 23:
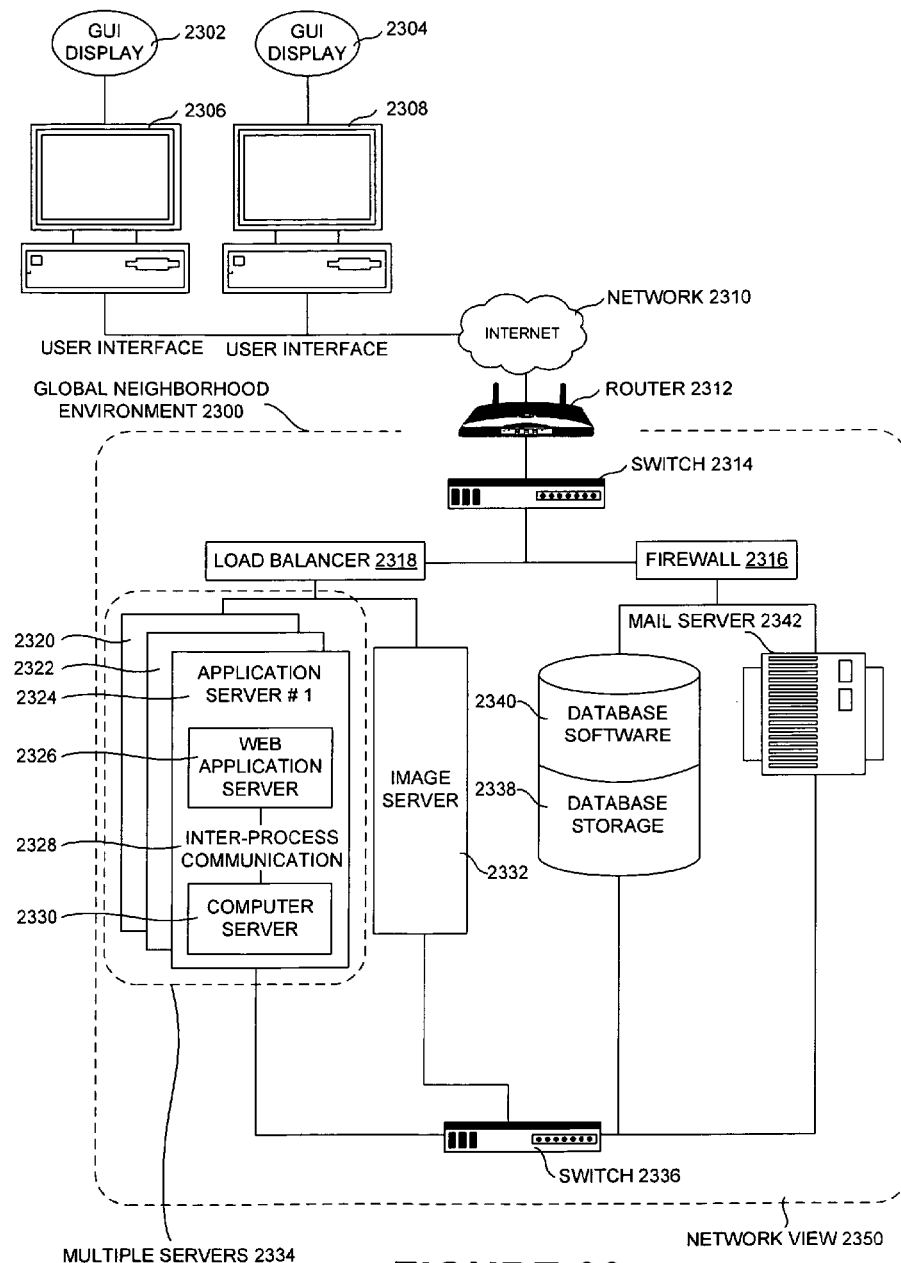
FIG. 23 is a systematic view of a network view, according to one embodiment.

FIG. 23 is a systematic view of a network view 2350, according to one embodiment. Particularly it may include a GUI display 2302, a GUI display 2304, user interface 2306, a user interface 2308, a network 2310, a router 2312, a switch 2314, a firewall 2316, a load balancer 2318, an application server#1 2324, a web application server 2326, an inter-process communication 2328, a computer server 2330, an image server 2332, a multiple servers 2334, a switch 2336, a database storage 2338, database software 2340 and a mail server 2342, according to one embodiment.

The GUI display 2302 and GUI display 2304 may display particular case of user interface for interacting with a device capable of representing data (e.g., computer, cellular telephones, television sets etc) which employs graphical images and widgets in addition to text to represent the information and actions available to the user (e.g., the user 616 of FIG. 6). The user interface 2306 and user interface 2308 may be any device capable of presenting data (e.g., computer, cellular telephones, television sets etc). The network 2310 may be any collection of networks (e.g., internet, private networks, university social system, private network of a company etc) that may transfer any data to the user (e.g., the user 616 of FIG. 6) and the global neighborhood environment (e.g., the global neighborhood environment 600 of FIG. 6).

The router 2312 may forward packets between networks and/or information packets between the global neighborhood environment (e.g., the global neighborhood environment 600 of FIG. 6) and registered user over the network (e.g., internet). The switch 2314 may act as a gatekeeper to and from the network (e.g., internet) and the device. The firewall 2316 may provides protection (e.g., permit, deny or proxydata connections) from unauthorized access to the global neighborhood environment (e.g., the global neighborhood environment 600 of FIG. 6. The load balancer 2318 may balance the traffic load across multiple mirrored servers in the global neighborhood environment (e.g., the global neighborhood environment 600 of FIG. 6) and may be used to increase the capacity of a server farm beyond that of a single server and/or may allow the service to continue even in the face of server down time due to server failure and/or server maintenance.

The application server 2322 may be server computer on a computer network dedicated to running certain software applications of the global neighborhood environment (e.g., the global neighborhood environment 600 of FIG. 6). The web application server 2326 may be server holding all the web pages associated with the global neighborhood environment (e.g., the global neighborhood environment 600 of FIG. 6). The inter-process communication 2328 may be set of rules for organizing and un-organizing factors and results regarding the global neighborhood environment (e.g., the global neighborhood environment 600 of FIG. 6). The computer server 2330 may serve as the application layer in the multiple servers of the global neighborhood environment (e.g., the global neighborhood environment 600 of FIG. 6) and/or may include a central processing unit (CPU), a random access memory (RAM) temporary storage of information, and/or a read only memory (ROM) for permanent storage of information regarding the global neighborhood environment (e.g., the global neighborhood environment 600 of FIG. 6).

The image server 2332 may store and provide digital images of the registered user of the global neighborhood environment (e.g., the global neighborhood environment 600 of FIG. 6). The multiple servers 2334 may be multiple computers or devices on a network that may manage network resources connecting the registered user and the global neighborhood environment (e.g., the global neighborhood environment 600 of FIG. 6). The database storage 2338 may store software, descriptive data, digital images, system data and any other data item that may be related to the user (e.g., the user 616 of FIG. 6) of the global neighborhood environment (e.g., the global neighborhood environment 600 of FIG. 6). The database software 2340 may be provided a database management system that may support the global neighborhood environment (e.g., the global neighborhood environment 600 of FIG. 6). The mail server 2342 may be provided for sending, receiving and storing mails. The user interface 2306 and 2308 may communicate with the GUI display(s) 2302 and 2304, the router 2312 through the network 2310 and the global neighborhood environment (e.g., the global neighborhood environment 600 of FIG. 6).

Figure 24:
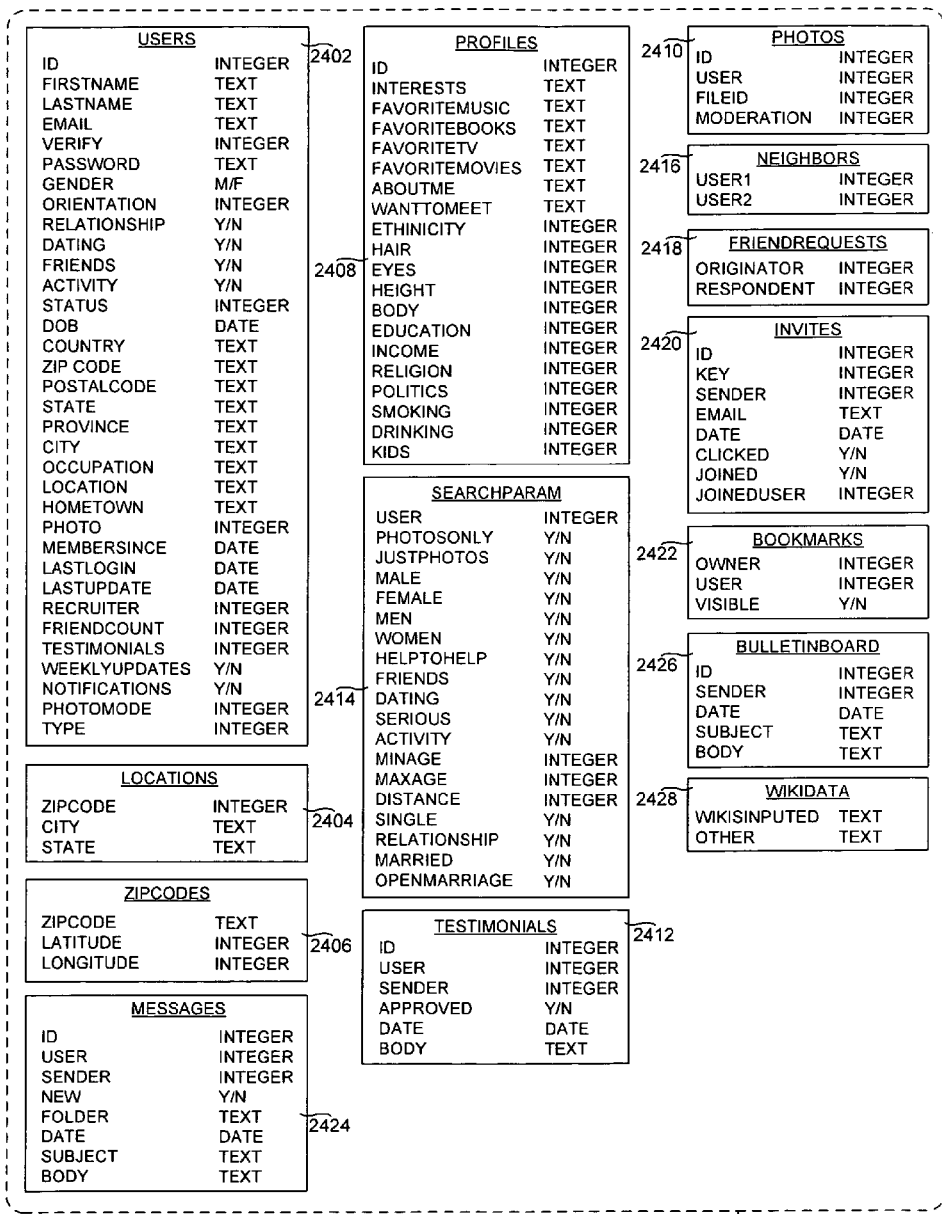
FIG. 24 is a block diagram of a database, according to one embodiment.

FIG. 24 is a block diagram of a database, according to one embodiment. Particularly the block diagram of the database 2400 of FIG. 24 illustrates a user data 2402, a location data, a zip codes data 2406, a profiles data 2408, a photos data 2410, a testimonials data 2412, a search parameters data 2414, a neighbor's data 2416, a friends requests data 2418, a invites data 2420, a bookmarks data 2422, a message data 2424 and a bulletin board data 2426, and a wiki data 2428, according to one embodiment.

The database 2400 be may include descriptive data, preference data, relationship data, and/or other data items regarding the registered user of the global neighborhood environment (e.g., the global neighborhood environment 600 of FIG. 6.

The user data 2402 may be a descriptive data referring to information that may describe a user (e.g., the user 616 of FIG. 6). It may include elements in a certain format for example Id may be formatted as integer, Firstname may be in text, Lastname may be in text, Email may be in text, Verify may be in integer, Password may be in text, Gender may be in m/f, Orientation may be in integer, Relationship may be in y/n, Dating may be in y/n, Friends may be in y/n, Activity may be in y/n, Status may be in integer, Dob may be in date, Country may be in text, Zipcode may be in text, Postalcode may be in text, State may be in text, Province may be in text, City may be in text, Occupation may be in text, Location may be in text, Hometown may be in text, Photo may be in integer, Membersince may be in date, Lastlogin may be in date, Lastupdate may be in date, Recruiter may be in integer, Friendcount may be in integer, Testimonials may be in integer, Weeklypdates may be in y/n, Notifications may be in y/n, Photomode may be in integer and/or Type may be in integer.

The locations data 2404 may clarify the location details in formatted approach. For example Zip code may be formatted as integer, City may be in text and/or State may be in text. The zip codes data 2406 may provide information of a user location in formatted manner. For example Zip code may be formatted as text, Latitude may be in integer and/or Longitude may be in integer. The profile data 2408 may clutch personnel descriptive data that may be formatted.

For examples ID may be formatted as integer, Interests may be in text, Favoritemusic may be in text, Favaoritebooks may be in text, Favoritetv may be in text, Favoritemovies may be in text, Aboutme may be in text, Wanttomeet may be in text, Ethnicity may be in integer, Hair may be in integer, Eyes may be in integer, Height may be in integer, Body may be in integer, Education may be in integer, Income may be in integer, Religion may be in integer, Politics may be in integer Smoking may be in integer, Drinking may be in integer and/or Kids may be in integer.

The photos data 2410 may represent a digital image and/or a photograph of the user formatted in certain approach. For example Id may be formatted as integer, User may be in integer, Fileid may be in integer and/or Moderation may be in integer. The testimonials data 2412 may allow users to write "testimonials" 2412, or comments, about each other and in these testimonials, users may describe their relationship to an individual and their comments about that individual. For example the user might write a testimonial that states "Rohan has been a friend of mine since graduation days. He is smart, intelligent, and a talented person." The elements of testimonials data 2412 may be formatted as Id may be in integer, User may be in integer, Sender may be integer, Approved may be in y/n, Date may be in date and/or Body may be formatted in text.

The search parameters data 2414 may be preference data referring to the data that may describe preferences one user has with respect to another (For example, the user may indicate that he is looking for a female who is seeking a male for a serious relationship). The elements of the search parameters data 2414 may be formatted as User 2402 may be in integer, Photosonly may be in y/n, Justphotos may be in y/n, Male may be in y/n, Female may be in y/n, Men may be in y/n, Women may be in y/n, Helptohelp may be in y/n, Friends may be in y/n, Dating may be in y/n, Serious may be in y/n, Activity may be in y/n, Minage may be in integer, Maxage may be in integer, Distance may be in integer, Single may be in y/n, Relationship may be in y/n, Married may be in y/n and/or Openmarriage may be in y/n.

The neighbor's data 2416 may generally refer to relationships among registered users of the global neighborhood environment (e.g., the global neighborhood environment 600 of FIG. 6) that have been verified and the user has requested another individual to join the system as neighbor's data 2416, and the request may be accepted. The elements of the neighbors data 2416 may be formatted as user1 may be in integer and/or user2 may be in integer. The friend requests data 2418 may tracks requests by users within the neighborhood (e.g., the neighborhood 602A-N of FIG. 6) to other individuals, which requests have not yet been accepted and may contain elements originator and/or respondent formatted in integer. The invites data 2420 may describe the status of a request by the user to invite an individual outside the neighborhood (e.g., the neighborhood 602A-N of FIG. 6) to join the neighborhood (e.g., the neighborhood 602A-N of FIG. 6) and clarify either the request has been accepted, ignored and/or pending.

The elements of the invites data 2420 may be formatted as Id may be in integer, Key may be in integer, Sender may be in integer, Email may be in text, Date may be in date format, Clicked may be in y/n, Joined may be in y/n and/or Joineduser may be in integer. The bookmarks data 2422 may provide the data for a process allowed wherein a registered user of the global neighborhood environment (e.g., the global neighborhood environment 600 of FIG. 6) may indicate an interest in the profile of another registered user. The bookmark data 2422 elements may be formatted as Owner may be in integer, User may be in integer and/or Visible may be in y/n. The message data 2424 may allow the users to send one another private messages.

The message data 2424 may be formatted as Id may be in integer, (e.g., User may be in integer, Sender may be in integer, New may be in y/n, Folder may be in text, Date may be in date format, Subject may be in text and/or Body may be in text format) The bulletin board data 2426 may support the function of a bulletin board that users may use to conduct online discussions, conversation and/or debate. The wiki data 2428 may share the user profiles (e.g., the user profile 1700 of FIG. 17A) in the neighborhood (e.g., the neighborhood 602A-N of FIG. 6) and its elements may be formatted as wikisinputted and/or others may be in text format.

FIG. 25 is an exemplary graphical user interface view for data collection, according to one embodiment. Particularly FIG. 25 illustrates exemplary screens 2502, 2504 that may be provided to the user (e.g., the user 616 of FIG. 6) through an interface may be through the network (e.g., Internet), to obtain user descriptive data. The screen 2502 may collect data allowing the user (e.g., the user 616 of FIG. 6) to login securely and be identified by the neighborhood (e.g., the neighborhood 602A-N of FIG. 1). This screen 2502 may allow the user to identify the reason he/she is joining the neighborhood. For example, a user may be joining the neighborhood for "neighborhood watch". The screen 2504 may show example of how further groups may be joined. For example, the user (e.g., the user 616 of FIG. 6) may be willing to join a group "Raj for city council". It may also enclose the data concerning Dob, country, zip/postal code, hometown, occupation and/or interest.

Figure 26:
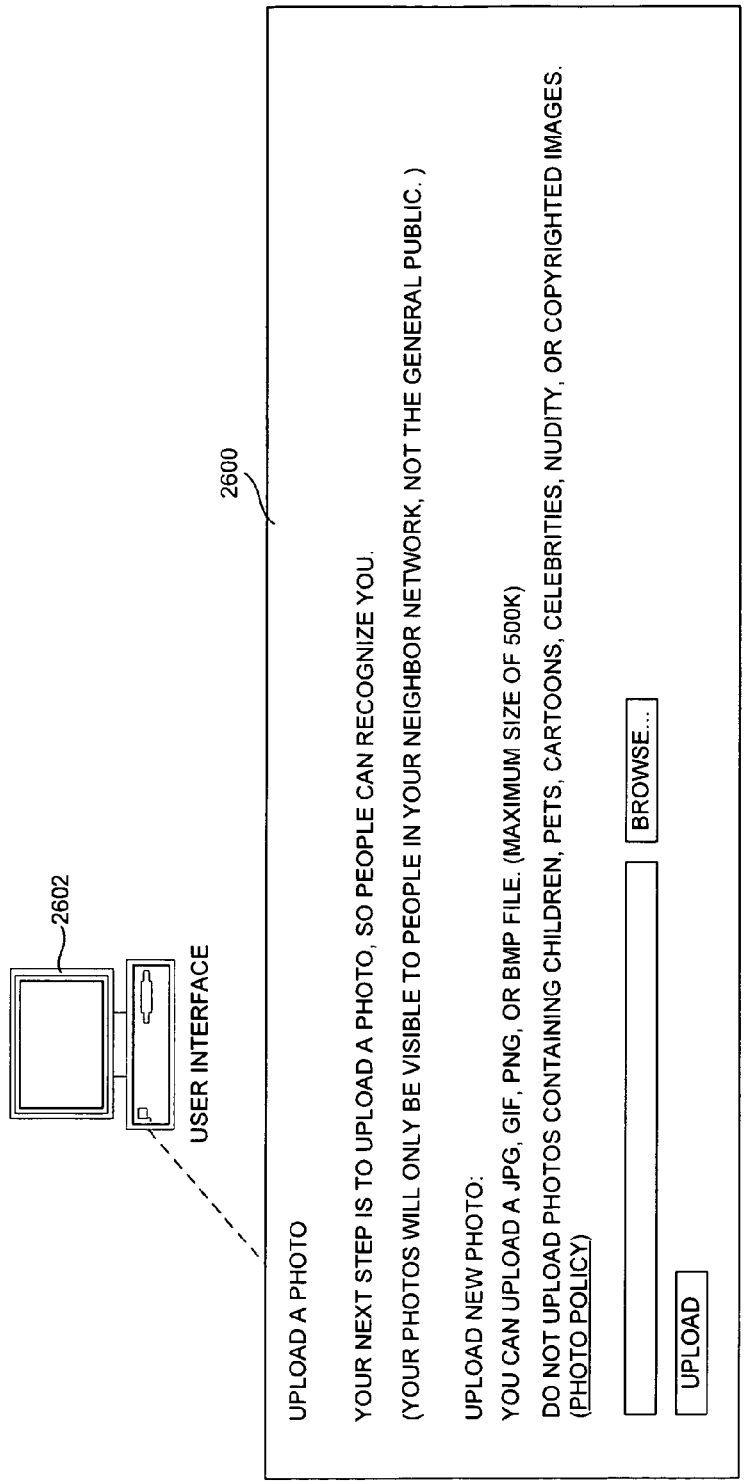
FIG. 26 is an exemplary graphical user interface view of image collection, according to one embodiment.

FIG. 26 is an exemplary graphical user interface view of image collection, according to one embodiment. A screen 2600 may be interface provided to the user (e.g., the user 616 of FIG. 6) over the network (e.g., internet) may be to obtain digital images from system user. The interface 2602 may allow the user (e.g., the user 616 of FIG. 6) to browse files on his/her computer, select them, and then upload them to the neighborhood (e.g., the neighborhood 602A-N of FIG. 6). The user (e.g., the user 616 of FIG. 6) may upload the digital images and/or photo that may be visible to people in the neighbor (e.g., the neighbor 620 of FIG. 6) network and not the general public. The user may be able to upload a JPG, GIF, PNG and/or BMP file in the screen 2600.

Figure 27:
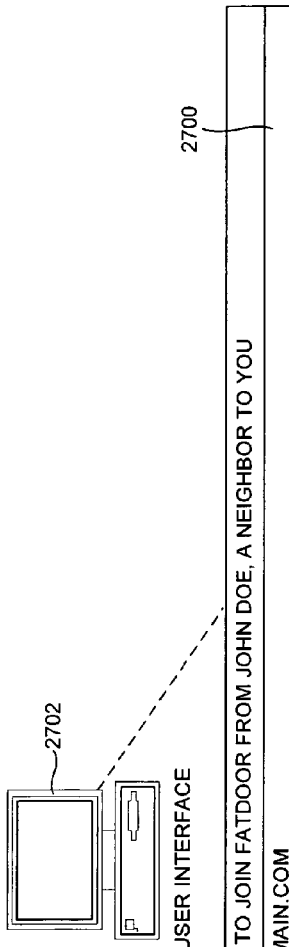
FIG. 27 is an exemplary graphical user interface view of an invitation, according to one embodiment.

FIG. 27 is an exemplary graphical user interface view of an invitation, according to one embodiment. An exemplary screen 2700 may be provided to a user through a user interface 2702 may be over the network (e.g., internet) to allow users to invite neighbor or acquaintances to join the neighborhood (e.g., the neighborhood 602A-N of FIG. 6). The user interface 2702 may allow the user (e.g., the user 616 of FIG. 6) to enter one or a plurality of e-mail addresses for friends they may like to invite to the neighborhood (e.g., the neighborhood 602A-N of FIG. 6). The exemplary screen 2700 may include the "subject", "From", "To", "Optional personnel message", and/or "Message body" sections. In the "Subject" section a standard language text may be included for joining the neighborhood (e.g., Invitation to join Fatdoor from John Doe, a neighborhood.).

The "From" section may include the senders email id (e.g., user@domain.com). The "To" section may be provided to add the email id of the person whom the sender may want to join the neighborhood (e.g., the neighborhood 602A-N of FIG. 6). The message that may be sent to the friends and/or acquaintances may include standard language describing the present neighborhood, the benefits of joining and the steps required to join the neighborhood (e.g., the neighborhood 602A-N of FIG. 6). The user (e.g., the user 616 of FIG. 6) may choose to include a personal message, along with the standard invitation in the "Optional personal message" section. In the "Message body" section the invited friend or acquaintance may initiate the process to join the system by clicking directly on an HTML link included in the e-mail message (e.g., http://www.fatdoor.com/join.jsp? Invite=140807). In one embodiment, the user (e.g., the user 616 of FIG. 6) may import e-mail addresses from a standard computerized address book. The system may further notify the inviting user when her invitee accepts or declines the invitation to join the neighborhood (e.g., the neighborhood 602A-N of FIG. 6).

Figure 28:
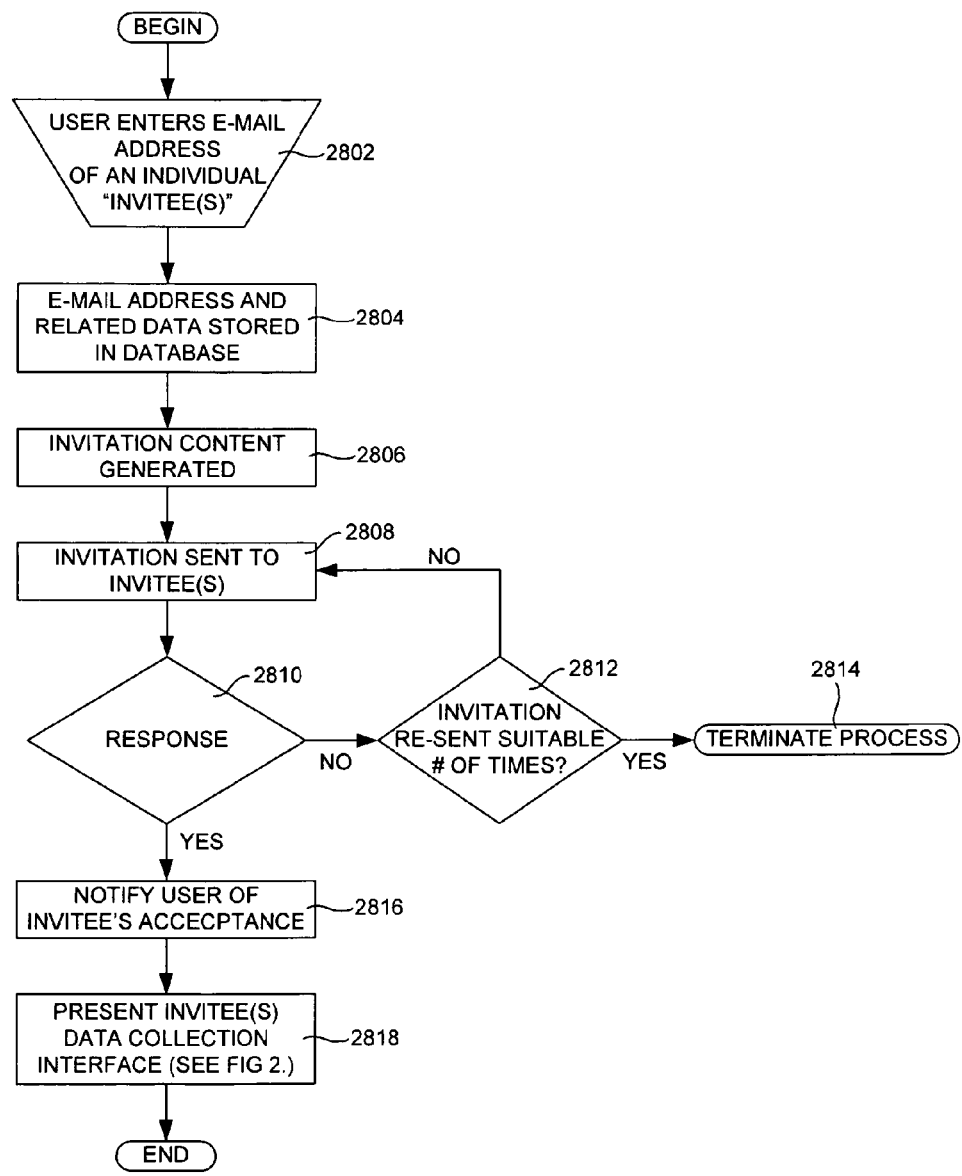
FIG. 28 is a flowchart of inviting the invitee(s) by the registered user, notifying the registered user upon the acceptance of the invitation by the invitee(s) and, processing and storing the input data associated with the user in the database, according to one embodiment.

FIG. 28 is a flowchart of inviting the invitee(s) by the registered user, notifying the registered user upon the acceptance of the invitation by the invitee(s) and, processing and storing the input data associated with the user (e.g., the user 616 of FIG. 6) in the database, according to one embodiment. In operation 2802, the verified registered user (e.g., the verified registered user 1810 of FIG. 18A-B, the verified registered user 1810 of FIG. 21) willing to invite the individual enters the email addresses of an individual "invitee". In operation 2804, the email address and the related data of the invitee may be stored in the database. In operation 2806, the invitation content for inviting the invitee may be generated from the data stored in the database. In operation 2808, the registered user sends invitation to the invitee(s).

In operation 2810, response from the user (e.g., the user 616 of FIG. 6) may be determined. In operation 2812, if the invitee doesn't respond to invitation sent by the registered user then registered user may resend the invitation for a pre-defined number of times. In operation 2814, if the registered user resends the invitation to the same invitee for predefined number of times and if the invitee still doesn't respond to the invitation the process may be terminated automatically.

In operation 2816, if the invitee accepts the invitation sent by the registered user then system may notify the registered user that the invitee has accepted the invitation. In operation 2818, the input from the present invitee(s) that may contain the descriptive data about the friend (e.g., registered user) may be processed and stored in the database.

For example, each registered user associated e-mail addresses of individuals who are not registered users may be stored and identified by each registered user as neighbors. An invitation to become a new user (e.g., the user 616 of FIG. 6) may be communicated out to neighbor (e.g., the neighbors neighbor of FIG. 6) of the particular user. An acceptance of the neighbor (e.g., the neighbor 620 of FIG. 6) to whom the invitation was sent may be processed.

The neighbor (e.g., the neighbor 620 of FIG. 6) may be added to a database and/or storing of the neighbor (e.g., the neighbor 620 of FIG. 6), a user ID and a set of user IDs of registered users who are directly connected to the neighbor (e.g., the neighbor 620 of FIG. 6), the set of user IDs stored of the neighbor (e.g., the neighbor 620 of FIG. 6) including at least the user ID of the verified registered user (e.g., the verified registered user 1810 of FIG. 18A-B, the verified registered user 1810 of FIG. 21). Furthermore, the verified registered user may be notified that the invitation to the neighbor (e.g., the neighbor 620 of FIG. 6) has been accepted when an acceptance is processed. Also, inputs from the neighbor (e.g., the neighbor 620 of FIG. 6) having descriptive data about the friend may be processed and the inputs in the database may be stored.

Figure 29:
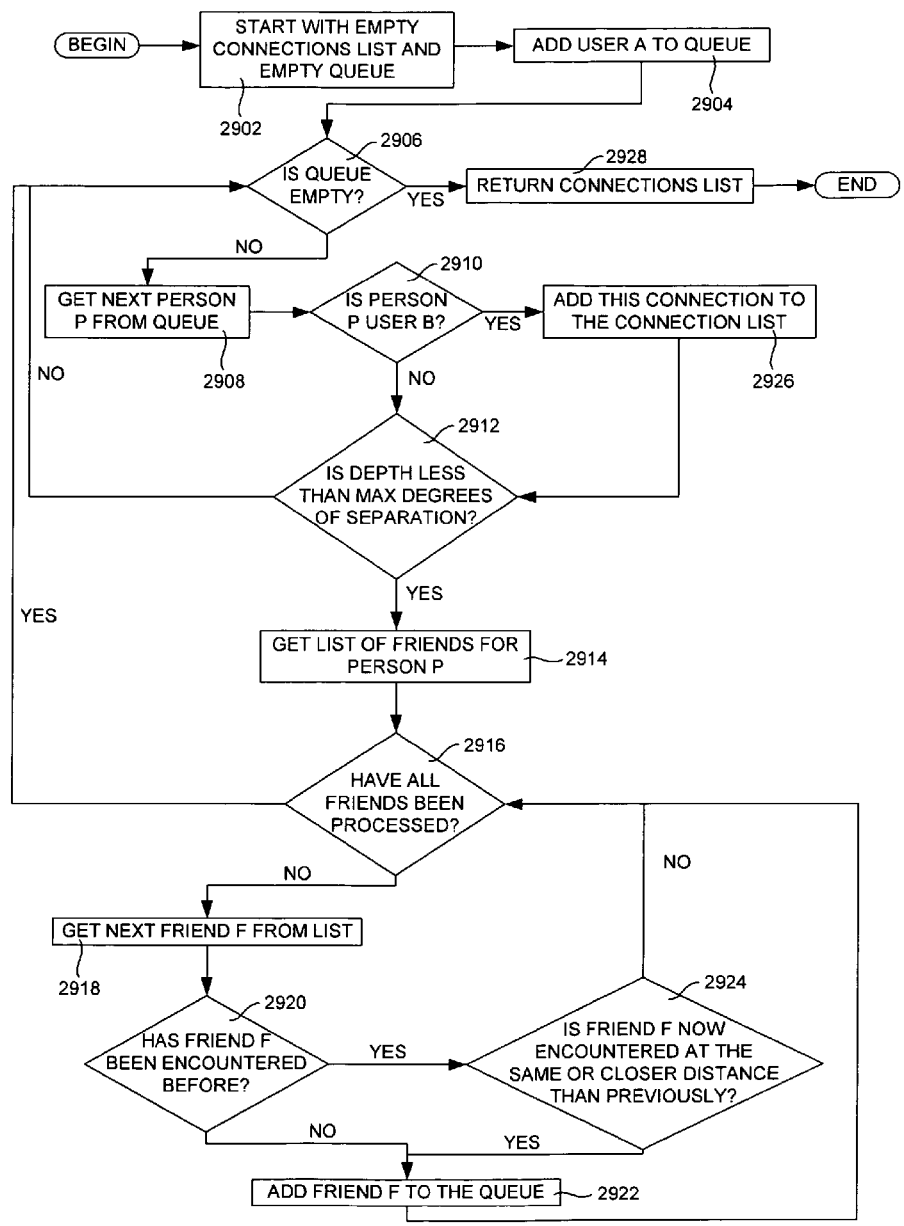
FIG. 29 is a flowchart of adding the neighbor to the queue, according to one embodiment.

FIG. 29 is a flowchart of adding the neighbor (e.g., the neighbor 620 of FIG. 6) to the queue, according to one embodiment. In operation 2902, the system may start with the empty connection list and empty queue. In operation 2904, the user may be added to the queue. In operation 2906, it is determined whether the queue is empty. In operation 2908, if it is determined that the queue is not empty then the next person P may be taken from the queue. In operation 2910, it may be determined whether the person P from the queue is user B or not. In operation 2912, if the person P is not user B then it may be determined whether the depth of the geographical location is less than maximum degrees of separation.

If it is determined that depth is more than maximum allowable degrees of separation then it may repeat the operation 2908. In operation 2914, it may be determined that the depth of the geographical location (e.g., the geographical location 1704 of FIG. 12A) is less than maximum degrees of separation then the neighbors (e.g., the neighbor 620 of FIG. 6) list for person P may be processed. In operation 2916, it may be determined whether all the neighbors (e.g., the neighbor 620 of FIG. 6) in the neighborhood (e.g., the neighborhood 602A-N of FIG. 6) have been processed or not. If all the friends are processed it may be determined the queue is empty.

In operation 2918, if all the neighbors (e.g., the neighbor 620 of FIG. 6) for person P are not processed then next neighbor N may be taken from the list. In operation 2920, it may be determined whether the neighbor (e.g., the neighbor 620 of FIG. 6) N has encountered before or not. In operation 2922, if the neighbor (e.g., the neighbor 620 of FIG. 6) has not been encountered before then the neighbor may be added to the queue. In operation 2924, if the neighbor N has been encountered before it may be further determined whether the geographical location (e.g., the geographical location 1704 of FIG. 17A) from where the neighbor (e.g., the neighbor 620 of FIG. 6) has encountered previously is the same place or closer to that place.

If it is determined that the neighbor (e.g., the neighbor 620 of FIG. 6) has encountered at the same or closer place then the friend may be added to the queue. If it may be determined that friend is not encountered at the same place or closer to that place then it may be again checked that all the friends have processed. In operation 2926, if it is determined that the person P is user B than the connection may be added to the connection list and after adding the connection to connection list it follows the operation 2912. In operation 2928, if it may be determined that queue is empty then the operation may return the connections list.

For example, a first user ID with the verified registered user (e.g., the verified registered user 1810 of FIG. 18A-B, the verified registered user 1810 of FIG. 21) and a second user ID may be applied to the different registered user. The verified registered user (e.g., the verified registered user 1810 of FIG. 18A-B, the verified registered user 1810 of FIG. 21) with the different registered user may be connected with each other through at least one of a geo-positioning data associated with the first user ID and the second user ID. In addition, a maximum degree of separation (Nmax) of at least two that is allowed for connecting any two registered users, (e.g., the two registered users who may be directly connected may be deemed to be separated by one degree of separation and two registered users who may be connected through no less than one other registered user may be deemed to be separated by two degrees of separation and two registered users who may be connected through not less than N other registered users may be deemed to be separated by N+1 degrees of separation).

Furthermore, the user ID of the different registered user may be searched (e.g., the method limits the searching of the different registered user in the sets of user IDs that may be stored as registered users who are less than Nmax degrees of separation away from the verified registered user (e.g., the verified registered user 1810 of FIG. 18A-B, the verified registered user 1810 of FIG. 21), such that the verified registered user (e.g., the verified registered user 1810 of FIG. 18A-B, the verified registered user 1810 of FIG. 21) and the different registered user who may be separated by more than Nmax degrees of separation are not found and connected.) in a set of user IDs that may be stored of registered users who are less than Nmax degrees of separation away from the verified registered user (e.g., the verified registered user 1810 of FIG. 18A-B, the verified registered user 1810 of FIG. 21), and not in the sets of user IDs that may be stored for registered users who are greater than or equal to Nmax degrees of separation away from the verified registered user (e.g., the verified registered user 1810 of FIG. 18A-B, the verified registered user 1810 of FIG. 21), until the user ID of the different registered user may be found in one of the searched sets. Also, the verified registered user (e.g., the verified registered user 1810 of FIG. 18A-B, the verified registered user 1810 of FIG. 21)

may be connected to the different registered user if the user ID of the different registered user may be found in one of the searched sets.

Moreover, the sets of user IDs that may be stored of registered users may be searched initially who are directly connected to the verified registered user (e.g., the verified registered user 1810 of FIG. 18A-B, the verified registered user 1810 of FIG. 21). A profile of the different registered user may be communicated to the verified registered user (e.g., the verified registered user 1810 of FIG. 18A-B, the verified registered user 1810 of FIG. 21) to display through a marker associating the verified registered user (e.g., the verified registered user 1810 of FIG. 18A-B, the verified registered user 1810 of FIG. 21) with the different registered user. A connection path between the verified registered user (e.g., the verified registered user 1810 of FIG. 18A-B, the verified registered user 1810 of FIG. 21) and the different registered user, the connection path indicating at least one other registered user may be stored through whom the connection path between the verified registered user (e.g., the verified registered user 1810 of FIG. 18A-B, the verified registered user 1810 of FIG. 21) and the different registered user is made.

In addition, the connection path between the verified registered user (e.g., the verified registered user 1810 of FIG. 18A-B, the verified registered user 1810 of FIG. 21) and the different registered user may be communicated to the verified registered user to display. A hyperlink in the connection path of each of the at least one registered users may be embedded through whom the connection path between the verified registered user (e.g., the verified registered user 1810 of FIG. 18A-B, the verified registered user 1810 of FIG. 21) and the different registered user is made.

Figure 30:
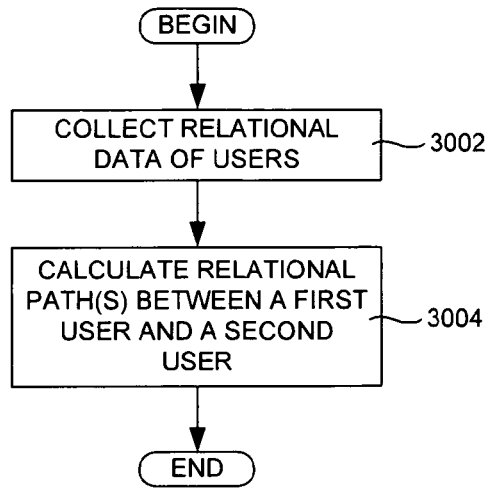
FIG. 30 is a flowchart of communicating brief profiles of the registered users, processing a hyperlink selection from the verified registered user and calculating and ensuring the Nmax degree of separation of the registered users away from verified registered users, according to one embodiment.

FIG. 30 is a flowchart of communicating brief profiles of the registered users, processing a hyperlink selection from the verified registered user (e.g., the verified registered user 1810 of FIG. 18A-B, the verified registered user 1810 of FIG. 21) and calculating and ensuring the Nmax degree of separation of the registered users away from verified registered users (e.g., the verified registered user 1810 of FIG. 18A-B, the verified registered user 1810 of FIG. 21), according to one embodiment. In operation 3002, the data of the registered users may be collected from the database. In operation 3004, the relational path between the first user and the second user may be calculated (e.g., the Nmax degree of separation between verified registered user (e.g., the verified registered user 1810 of FIG. 18A-B, the verified registered user 1810 of FIG. 21) and the registered user).

For example, the brief profiles of registered users, including a brief profile of the different registered user, to the verified registered user (e.g., the verified registered user 1810 of FIG. 18A-B, the verified registered user 1810 of FIG. 21) for display, each of the brief profiles including a hyperlink to a corresponding full profile may be communicated.

Furthermore, the hyperlink selection from the verified registered user (e.g., the verified registered user 1810 of FIG. 18A-B, the verified registered user 1810 of FIG. 21) may be processed (e.g., upon processing the hyperlink selection of the full profile of the different registered user, the full profile of the different registered user may be communicated to the verified registered user (e.g., the verified registered user 1810 of FIG. 18A-B, the verified registered user 1810 of FIG. 21) for display). In addition, the brief profiles of those registered users may be ensured who are more than Nmax degrees of separation away from the verified registered user (e.g., the verified registered user 1810 of FIG. 18A-B, the verified registered user 1810 of FIG. 21) are not communicated to the verified registered user (e.g., the verified registered user 1810 of FIG. 18A-B, the verified registered user 1810 of FIG. 21) for display.

Figure 31:
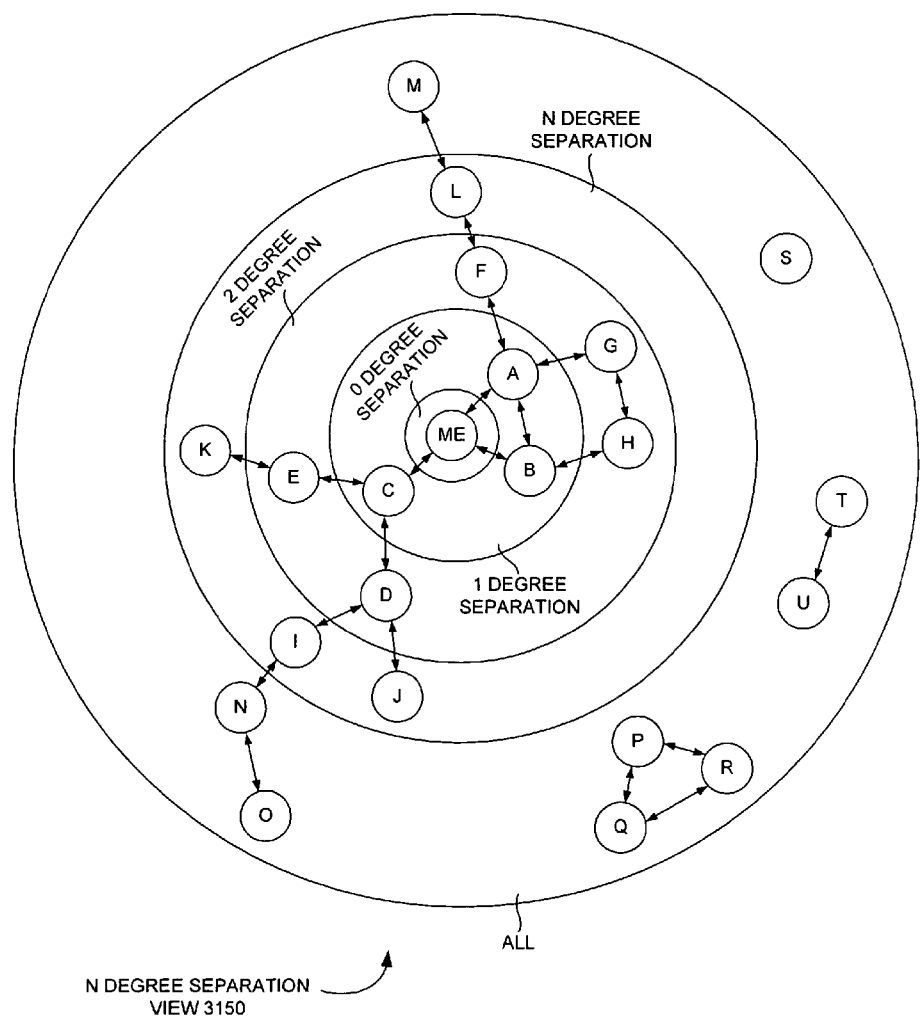
FIG. 31 is an N degree separation view, according to one embodiment.

FIG. 31 is an N degree separation view, according to one embodiment. ME may be a verified registered user (e.g., the verified registered user 1810 of FIG. 18A-B, the verified registered user 1810 of FIG. 21) of the global neighborhood environment (e.g., the global neighborhood environment 600 of FIG. 6) centered in the neighborhood network. A, B, C, D, E, F, G, H, I, J, K, L, M, N, O, P, Q, R, S, T, and/or U may be the other registered user of the neighborhood network. The member of the neighborhood network may be separated from the centered verified registered user (e.g., the verified registered user 1810 of FIG. 18A-B, the verified registered user 1810 of FIG. 21) ME of the neighborhood network by certain degree of separation. The registered user A, B and C may be directly connected and may be deemed to be separated by one degree of separation from verified registered user (e.g., the verified registered user 1810 of FIG. 18A-B, the verified registered user 1810 of FIG. 21) ME. The registered user D, E, F, G, and H may be connected through no less than one other registered user may be deemed to be separated by two degree of separation from verified registered user (e.g., the verified registered user 1810 of FIG. 18A-B, the verified registered user 1810 of FIG. 21) ME. The registered user I, J, K, and L may be connected through no less than N−1 other registered user and may be deemed to be separated by N degree of separation from verified registered user (e.g., the verified registered user 1810 of FIG. 18A-B, the verified registered user 1810 of FIG. 21) ME. The registered user M, N, O, P, Q, R S, T and U may be all registered user.

Figure 32:
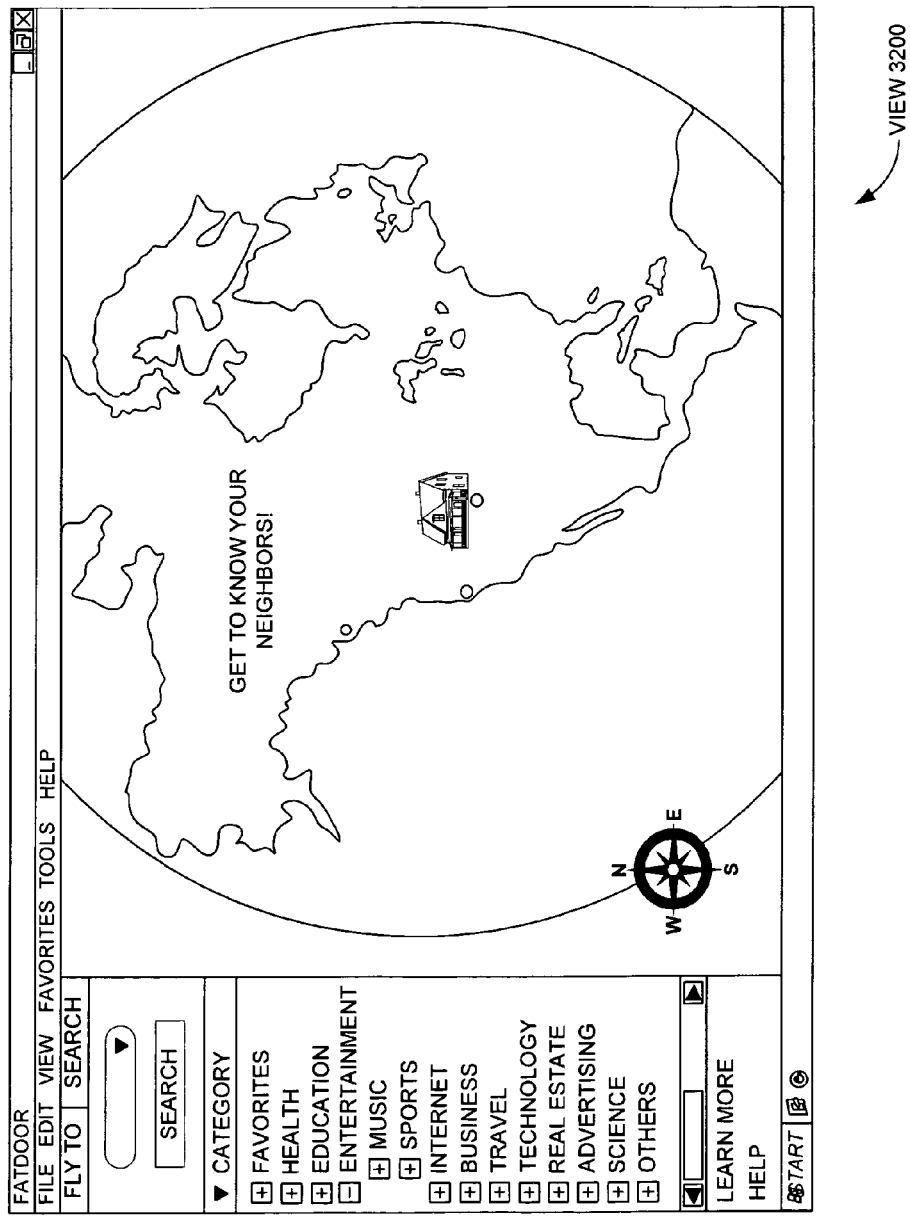
FIG. 32 is a user interface view showing a map, according to one embodiment.

FIG. 32 is a user interface view showing a map, according to one embodiment. Particularly FIG. 32 illustrates a satellite photo of a physical world. The registered user of the global neighborhood environment (e.g., the global neighborhood environment 600 of FIG. 6) may use this for exploring the geographical location (e.g., the geographical location 1704 of FIG. 17A) of the neighbors (e.g., the neighbor 620 of FIG. 6). The registered user (e.g., the verified registered user 1810 of FIG. 18A-B, the verified registered user 1810 of FIG. 21) may navigate, zoom, explore and quickly find particular desired geographical locations of the desired neighbors (e.g., the neighbor 620 of FIG. 6). This may help the registered user to read the map an/or plot the route of the neighbors (e.g., the neighbor 620 of FIG. 6) on the world map.

Figure 33A:
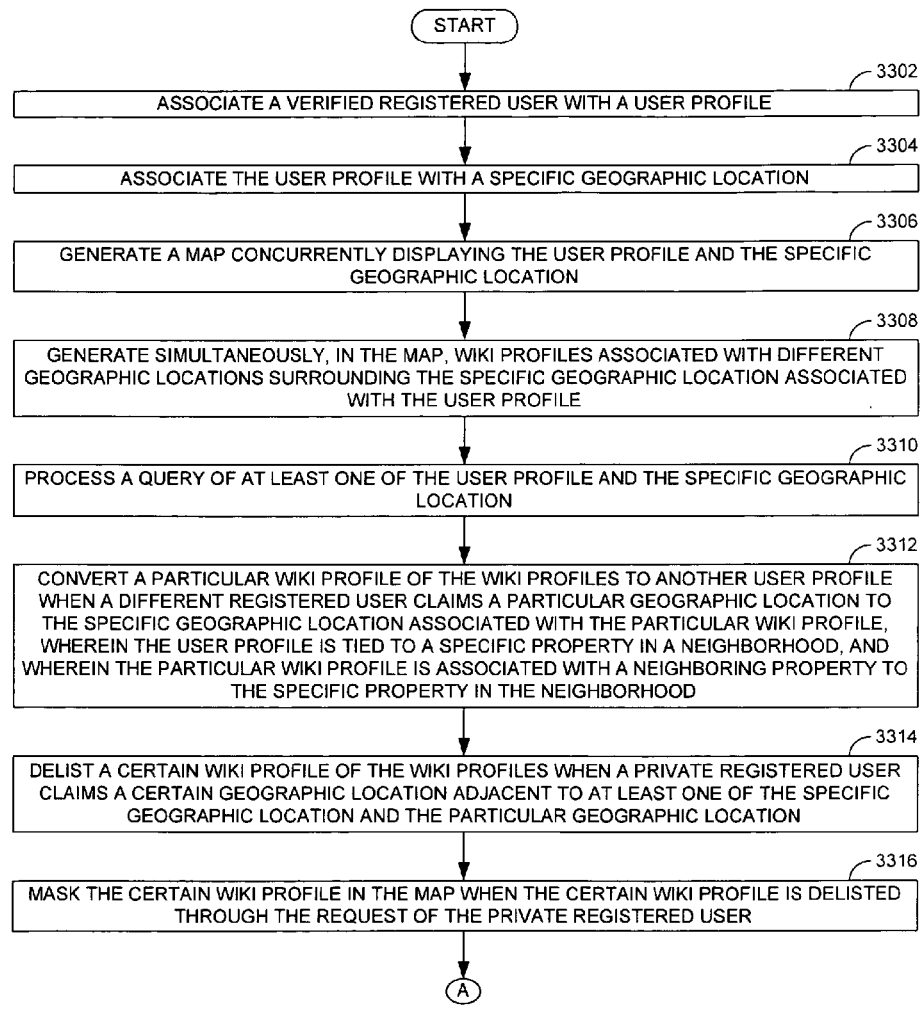
FIG. 33A is a process flow of searching a map based community and neighborhood contribution, according to one embodiment.

FIG. 33A is a process flow of searching map based community and neighborhood contribution, according to one embodiment. In operation 3302, a verified registered user (e.g., a verified registered user 1810 of FIG. 18A-18B, a verified registered user 1810 of FIG. 21) may be associated with a user profile (e.g., a user profile 1700 of FIG. 17A). In operation 3304, the user profile (e.g., the user profile 1700 of FIG. 17A) may be associated with a specific geographic location (e.g., a geographic location 1704 of FIG. 17A).

In operation 3306, a map (e.g., a map 1702 of FIG. 17A-17B, a map 1900 of FIG. 19, a map 2100 of FIG. 21, a map 2201 of FIG. 22) may be generated concurrently displaying the user profile (e.g., the user profile 1700 of FIG. 17A) and the specific geographic location (e.g., the geographic location 1704 of FIG. 17A). In operation, 3308, in the map, wiki profiles (e.g., a wiki profile 1706 of FIG. 17A-B, a wiki profile 1802 of FIG. 18A, a wiki profile 2204 of FIG. 22) associated with different geographic locations may be simultaneously generated surrounding the specific geographic location (e.g., the geographic location 1704 of FIG. 17A) associated with the user profile (e.g., the user profile 1700 of FIG. 17A).

In operation 3310, a query of at least one of the user profile (e.g., the user profile 1700 of FIG. 17A) and the specific geographic location (e.g., the geographic location 1704 of FIG. 17A) may be processed. In operation 3312, a particular wiki profile of the wiki profiles (e.g., the wiki profile 1706 of FIG. 17A-B, the wiki profile 1802 of FIG. 18A, the wiki profile 2204 of FIG. 22) may be converted to another user profile (e.g., the user profile 1700 of FIG. 17A) when a different registered user claims a particular geographic location to the specific geographic location (e.g., the geographic location 1704 of FIG. 17A) associated with the particular wiki profile (e.g., the wiki profile 1706 of FIG. 17A-B, the wiki profile 1802 of FIG. 18A, the wiki profile 2204 of FIG. 22), wherein the user profile (e.g., the user profile 1700 of FIG. 17A) may be tied to a specific property in a neighborhood (e.g., a neighborhood 602A-602N of FIG. 6), and wherein the particular wiki profile (e.g., the wiki profile 1706 of FIG. 17A-17B, the wiki profile 1802 of FIG. 18A, the wiki profile 2204 of FIG. 22) may be associated with a neighboring property to the specific property in the neighborhood (e.g., the neighborhood 620A-620N of FIG. 6).

In operation 3314, a certain wiki profile (e.g., the wiki profile 1706 of FIG. 17A-17B, the wiki profile 1802 of FIG. 18A, the wiki profile 2204 of FIG. 22) of the wiki profiles (e.g., the wiki profile 1706 of FIG. 17A-B, the wiki profile 1802 of FIG. 18A, the wiki profile 2204 of FIG. 22) may be delisted when a private registered user claims a certain geographic location (e.g., the geographic location 1704 of FIG. 17A) adjacent to at least one of the specific geographic location and the particular geographic location (e.g., the geographic location 1704 of FIG. 17A).

In operation 3316, the certain wiki profile (e.g., the wiki profile 1706 of FIGS. 17A-B, the wiki profile 1802 of FIG. 18A, the wiki profile 2204 of FIG. 22) in the map (e.g., the map 1702 of FIG. 17A-B, the map 1900 of FIG. 19, the map 2100 of FIG. 21, the map 2201 of FIG. 22) when the certain wiki profile may be delisted and/or be masked through the request of the private registered user.

Figure 33B:
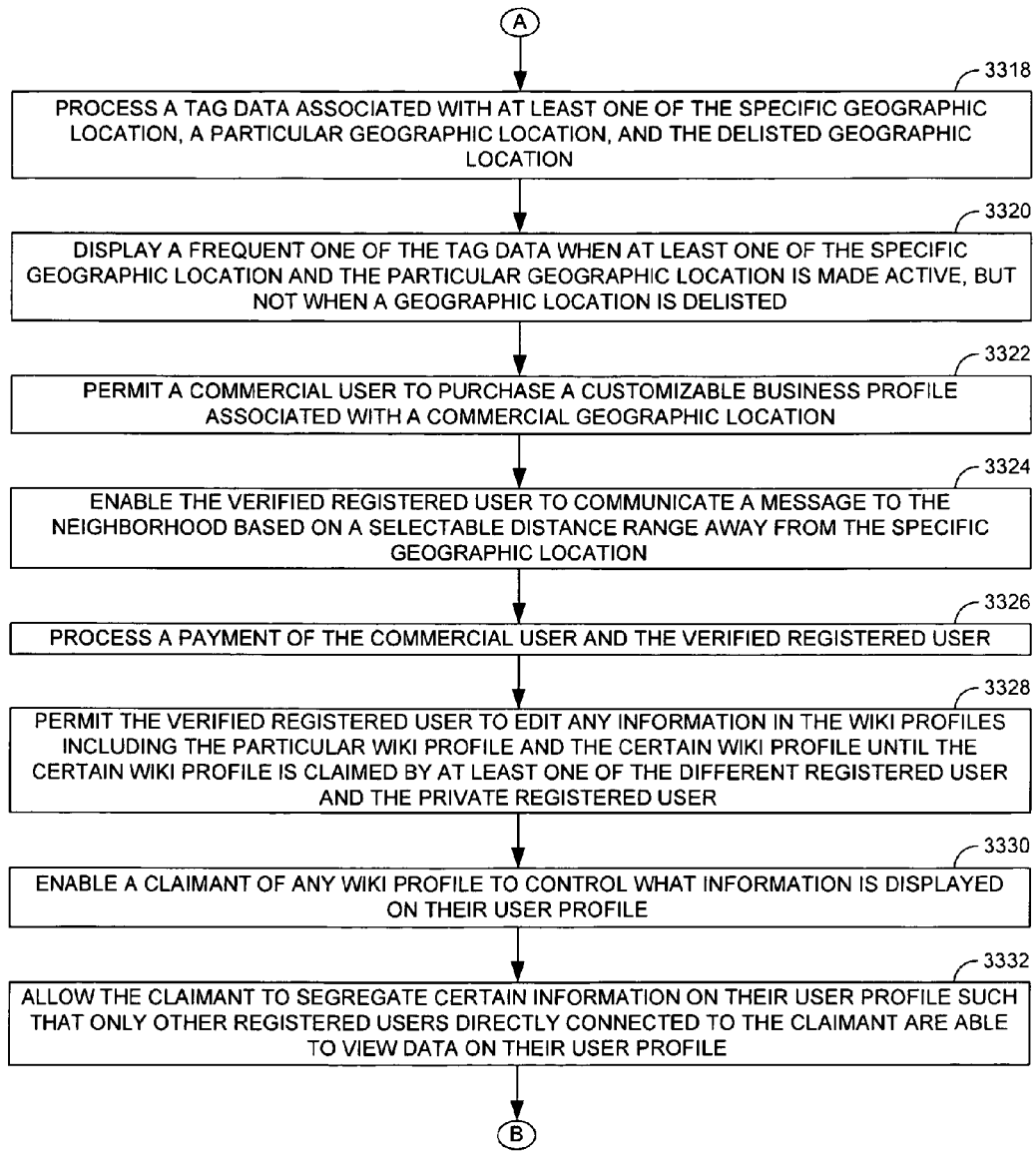
FIG. 33B is a continuation of process flow of FIG. 33A showing additional processes, according to one embodiment.

FIG. 33B is a continuation of process flow of FIG. 33A showing additional processes, according to one embodiment. In operation 3318, a tag data associated with at least one of the specific geographic location, the particular geographic location (e.g., the geographic location 1704 of FIG. 17A), and the delisted geographic location may be processed. In operation 3320, a frequent one of the tag data may be displayed when at least one of the specific geographic location and the particular geographic location (e.g., the geographic location 1704 of FIG. 17A) may be made active, but not when the geographic location (e.g., the geographic location 1704 of FIG. 17A) may be delisted.

In operation 3322, a commercial user (e.g., a commercial user 1800 of FIG. 18A-B) may be permitted to purchase a customizable business profile (e.g., a customizable business profile 1804 of FIG. 18B) associated with a commercial geographic location. In operation 3324, the verified registered user (e.g., the verified registered user 1810 of FIG. 18A-B, the verified registered user 1810 of FIG. 21) to communicate a message to the neighborhood (e.g., the neighborhood 602A-602N of FIG. 6) may be enabled based on a selectable distance range away from the specific geographic location.

In operation 3326, a payment of the commercial user (e.g., the commercial user 1800 of FIG. 18A-B) and the verified registered user (e.g., the verified registered user 1810 of FIG. 18A-B, the verified registered user 1810 of FIG. 21) may be processed. In operation 3328, the verified registered user (e.g., the verified registered user 1810 of FIG. 18A-B, the verified registered user 1810 of FIG. 21) may be permitted to edit any information in the wiki profiles (e.g., the wiki profile 1706 of FIG. 17A-B, the wiki profile 1802 of FIG. 18A, the wiki profile 2204 of FIG. 22) including the particular wiki profile and the certain wiki profile until the certain wiki profile may be claimed by at least one of the different registered user and the private registered user.

In operation 3330, a claimant of any wiki profile (e.g., the wiki profile 1706 of FIG. 17A-B, the wiki profile 1802 of FIG. 18A, the wiki profile 2204 of FIG. 22) may be enabled to control what information is displayed on their user profile (e.g., the user profile 1700 of FIG. 17A). In operation 3332, the claimant to segregate certain information on their user profile (e.g., the user profile 1700 of FIG. 17A) may be allowed such that only other registered users directly connected to the claimant are able to view data on their user profile (e.g., the user profile 1700 of FIG. 17A).

Figure 33C:
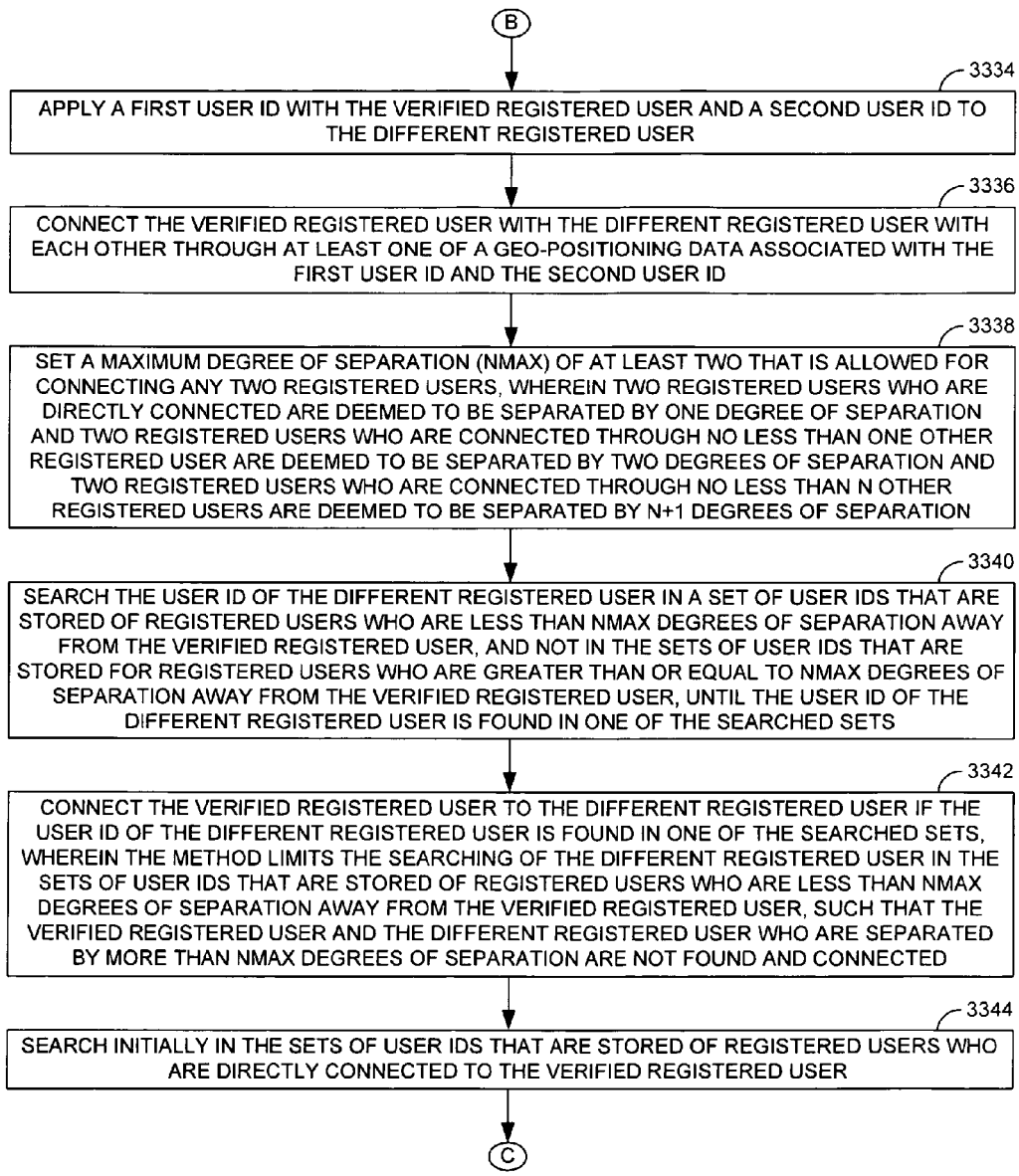
FIG. 33C is a continuation of process flow of FIG. 33B showing additional processes, according to one embodiment.

FIG. 33C is a continuation of process flow of FIG. 33B showing additional processes, according to one embodiment. In operation 3334, a first user ID with the verified registered user (e.g., the verified registered user 1810 of FIG. 18A-B, the verified registered user 1810 of FIG. 21) and a second user ID to the different registered user may be applied. In operation 3336, the verified registered user (e.g., the verified registered user 1810 of FIG. 18A-B, the verified registered user 1810 of FIG. 21) with the different registered user with each other may be connected through at least one of associated with the first user ID and the second user ID.

In operation 3338, a maximum degree of separation (Nmax) of at least two may be set that is allowed for connecting any two registered users, wherein two registered users who are directly connected may be deemed to be separated by one degree of separation and two registered users who are connected through no less than one other registered user may be deemed to be separated by two degrees of separation and two registered users who may be connected through no less than N other registered users are deemed to be separated by N+1 degrees of separation. In operation 3340, the user ID of the different registered user may be searched in a set of user IDs that are stored of registered users who are less than Nmax degrees of separation away from the verified registered user (e.g., the verified registered user 1810 of FIG. 18A-B, the verified registered user 1810 of FIG. 21), and not in the sets of user IDs that are stored for registered users who may be greater than or equal to Nmax degrees of separation away from the verified registered user (e.g., the verified registered user 1810 of FIG. 18A-B, the verified registered user 1810 of FIG. 21), until the user ID of the different registered user may be found in one of the searched sets.

In operation 3342, the verified registered user (e.g., the verified registered user 1810 of FIG. 18A-B, the verified registered user 1810 of FIG. 21) may be connected to the different registered user if the user ID of the different registered user may be found in one of the searched sets, wherein the method limits the searching of the different registered user in the sets of user IDs that may be stored of registered users who may be less than Nmax degrees of separation away from the verified registered user (e.g., the verified registered user 1810 of FIG. 18A-B, the verified registered user 1810 of FIG. 21), such that the verified registered user (e.g., the verified registered user 1810 of FIG. 18A-B, the verified registered user 1810 of FIG. 21) and the different registered user who may be separated by more than Nmax degrees of separation are not found and connected. In operation 3344, initially in the sets of user IDs that are stored of registered users who may be directly connected to the verified registered user (e.g., the verified registered user 1810 of FIG. 18A-B, the verified registered user 1810 of FIG. 21) may be initially searched.

Figure 33D:
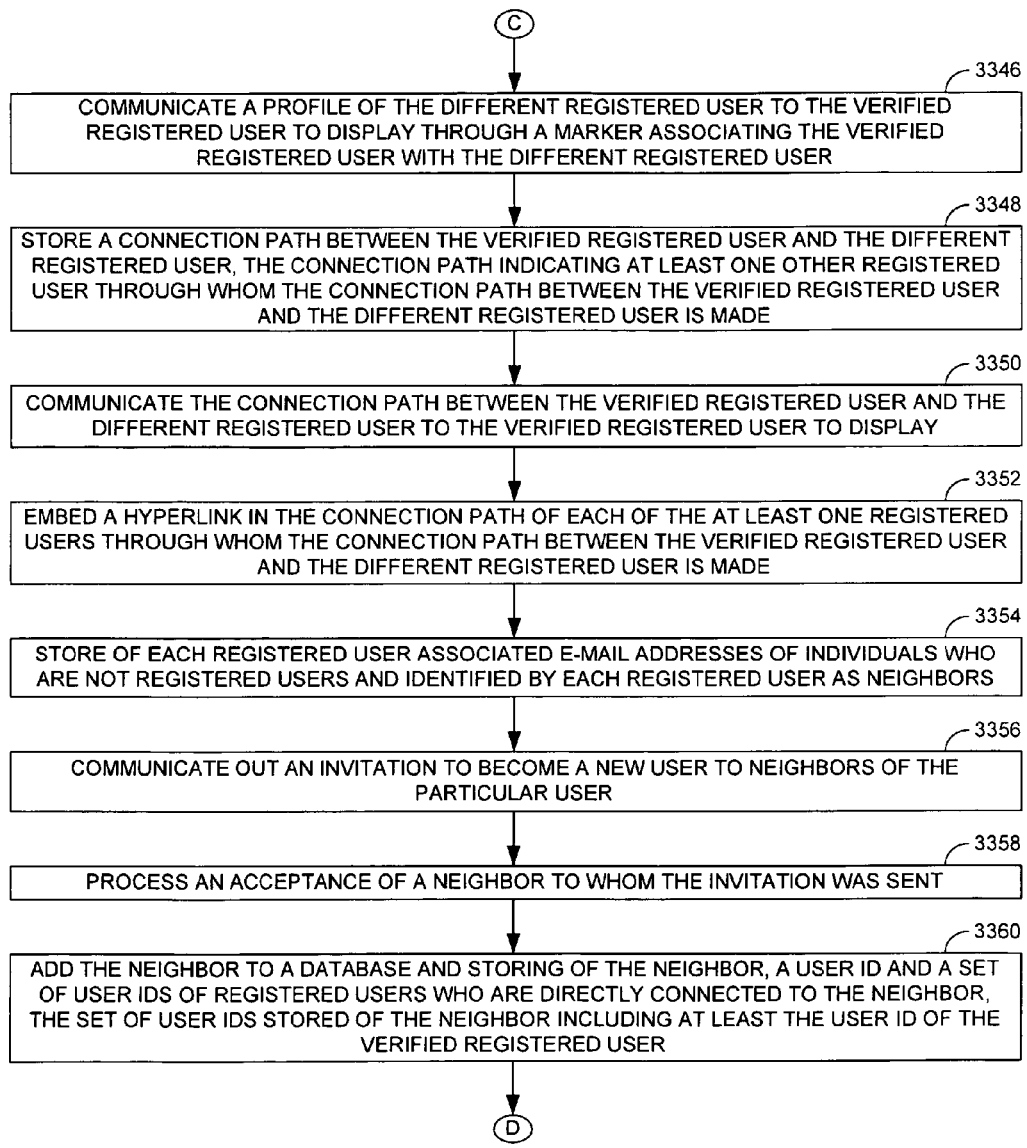
FIG. 33D is a continuation of process flow of FIG. 33C showing additional processes, according to one embodiment.

FIG. 33D is a continuation of process flow of FIG. 33C showing additional processes, according to one embodiment. In operation 3346, a profile of the different registered user to the verified registered user (e.g., the verified registered user 1810 of FIG. 18A-B, the verified registered user 1810 of FIG. 21) to display may be communicated through a marker associating the verified registered user (e.g., the verified registered user 1810 of FIG. 18A-B, the verified registered user 1810 of FIG. 21) with the different registered user.

In operation 3348, a connection path between the verified registered user (e.g., the verified registered user 1810 of FIG. 18A-B, the verified registered user 1810 of FIG. 21) and the different registered user, the connection path indicating at least one other registered user may be stored through whom the connection path between the verified registered user (e.g., the verified registered user 1810 of FIG. 18A-B, the verified registered user 1810 of FIG. 21) and the different registered user may be made.

In operation 3350, the connection path between the verified registered user (e.g., the verified registered user 1810 of FIG. 18A-B, the verified registered user 1810 of FIG. 21) and the different registered user to the verified registered user (e.g., the verified registered user 1810 of FIG. 18A-B, the verified registered user 1810 of FIG. 21) may be communicated to a display.

In operation 3352, a hyperlink in the connection path of each of the at least one registered users may be embedded through whom the connection path between the verified registered user (e.g., the verified registered user 1810 of FIG. 18A-B, the verified registered user 1810 of FIG. 21) and the different registered user may be made. In operation 3354, each registered user associated e-mail addresses of individuals who are not registered users may be stored and identified by each registered user as neighbors (e.g., a neighbor 620 of FIG. 6).

In operation 3356, an invitation may be communicated to become a new user (e.g., a user 616 of FIG. 6) to neighbors (e.g., the neighbor 620 of FIG. 6) of the particular user. In operation 3358, an acceptance of the neighbor (e.g., the neighbor 620 of FIG. 6) to whom the invitation was sent may be processed. In operation 3360, the neighbor (e.g., the neighbor 620 of FIG. 6) to a database and storing of the neighbor (e.g., the neighbor 620 of FIG. 6), a user ID and the set of user IDs of registered users may be added who are directly connected to the neighbor (e.g., the neighbor 620 of FIG. 6), the set of user IDs stored of the neighbor (e.g., the neighbor 620 of FIG. 6) including at least the user ID of the verified registered user (e.g., the verified registered user 1810 of FIG. 18A-B, the verified registered user 1810 of FIG. 21).

Figure 33E:
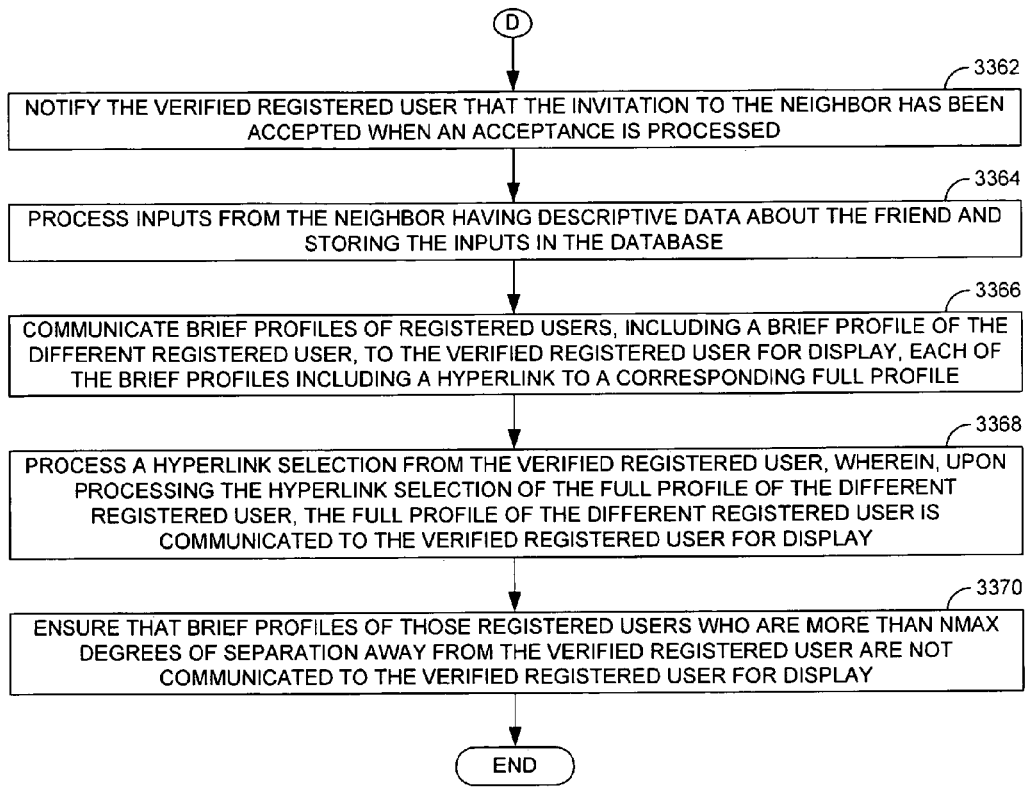
FIG. 33E is a continuation of process flow of FIG. 33D showing additional processes, according to one embodiment.

FIG. 33E is a continuation of process flow of FIG. 33D showing additional processes, according to one embodiment. In operation 3362, the verified registered user (e.g., the verified registered user 1810 of FIG. 18A-B, the verified registered user 1810 of FIG. 21) that the invitation to the neighbor (e.g., the neighbor 620 of FIG. 6) has been accepted may be notified when the acceptance is processed.

In operation 3364, inputs from the neighbor (e.g., the neighbor 620 of FIG. 6) having descriptive data about the friend and storing the inputs in the database may be processed. In operation 3366, brief profiles of registered users, including a brief profile of the different registered user may be communicated, to the verified registered user (e.g., the verified registered user 1810 of FIG. 18A-B, the verified registered user 1810 of FIG. 21) for display, each of the brief profiles including the hyperlink to a corresponding full profile.

In operation 3368, the hyperlink selection from the verified registered user (e.g., the verified registered user 1810 of FIG. 18A-B, the verified registered user 1810 of FIG. 21) may be processed, wherein, upon processing the hyperlink selection of the full profile of the different registered user, the full profile of the different registered user is communicated to the verified registered user (e.g., the verified registered user 1810 of FIG. 18A-B, the verified registered user 1810 of FIG. 21) for display.

In operation 3370, brief profiles of those registered users who may be more than Nmax degrees of separation away from the verified registered user (e.g., the verified registered user 1810 of FIG. 18A-B, the verified registered user 1810 of FIG. 21) may not communicated to the verified registered user (e.g., the verified registered user 1810 of FIG. 18A-B, the verified registered user 1810 of FIG. 21) may be ensured for display.

Figure 34A:
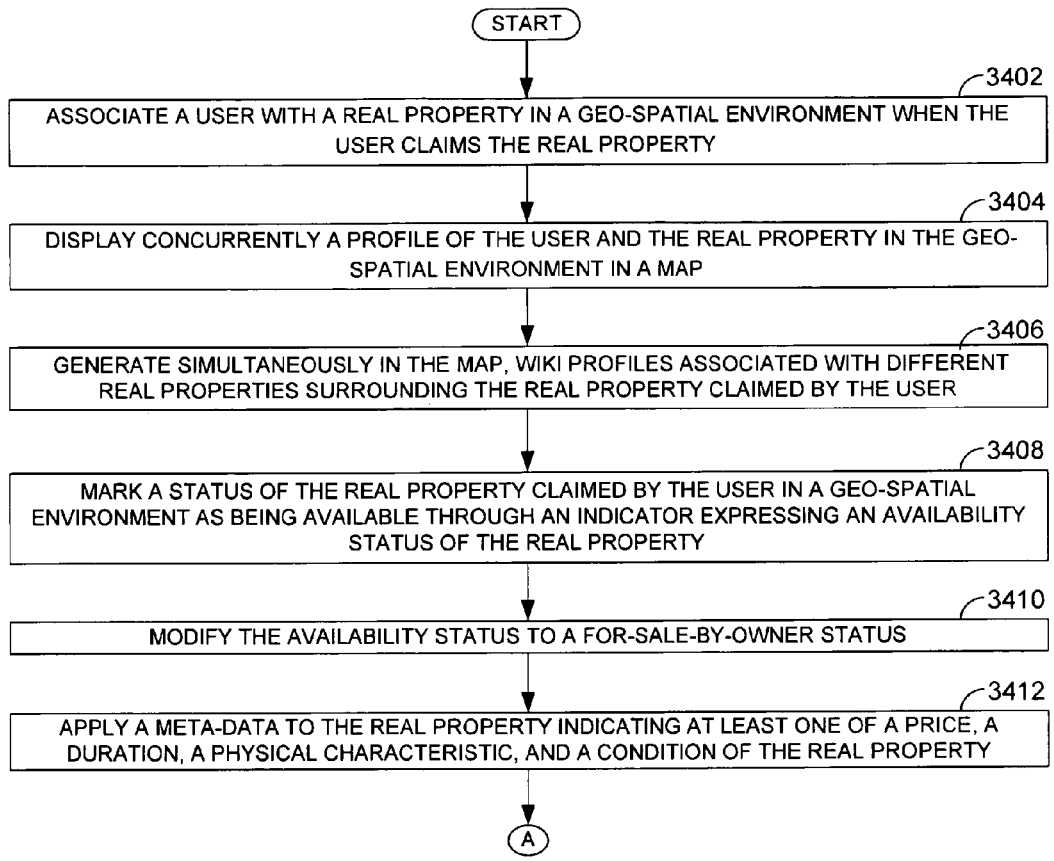
FIG. 34A is a process flow of associating a user with a real property in a geo-spatial environment and marking the status of the real property claimed by the user, according to one embodiment.

FIG. 34A is a process flow of associating a user with a real property in a geo-spatial environment and marking a status of the real property claimed by the user, according to one embodiment. In operation 3402, the user (e.g., the user 116 of FIG. 1) may be associated with the real property in the geo-spatial environment when the user claims the real property. In operation 3404, a profile of the user and the real property may be concurrently displayed in the geo-spatial environment in a map (e.g., an aerial map view illustrated in FIG. 2). In operation 3406, wiki profiles associated with different real properties (e.g., generated through a wiki module 110 of FIG. 1) surrounding the real property claimed by the user may be simultaneously generated in the map.

In operation 3408, the status of the real property claimed by the user in the geo-spatial environment as being available may be marked through an indicator expressing an availability status of the real property (e.g., the status may be modified by the for-sale-by owner module 112, the retained agent module 134, the rent module 114 of FIG. 1). In operation 3410, the availability status may be modified to a for-sale-by-owner status (e.g., through the for-sale-by owner module 112 of FIG. 1). In operation 3412, a meta-data may be applied to the real property indicating at least one of a price, a duration, a physical characteristic, and a condition of the real property.

Figure 34B:
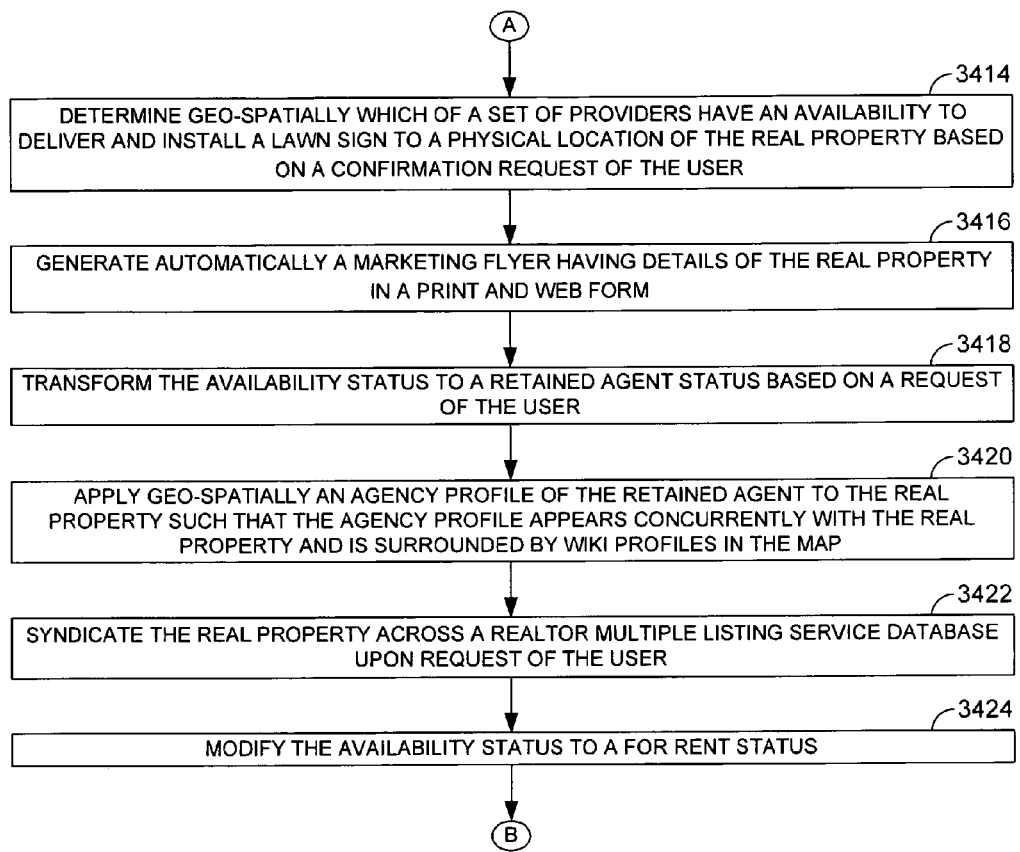
FIG. 34B is a continuation of process flow of FIG. 34A showing additional processes, according to one embodiment.

FIG. 34B is a continuation of the process flow of FIG. 34A showing additional processes, according to one embodiment. In operation 3414, a set of providers having an availability to deliver and install a lawn sign to a physical location of the real property may be determined geo-spatially based on a confirmation request of the user. In operation 3416, a marketing flyer (e.g., the lawn sign) having details of the real property may be automatically generated in a print and web form. In operation 3418, the availability status may be transformed to a retained agent status (e.g., the retained agent module 134 of FIG. 1) based on a request of the user (e.g., the user 116 of FIG. 1)

In operation 3420, an agency profile of the retained agent may be geo-spatially applied to the real property such that the agency profile appears concurrently with the real property and is surrounded by wiki profiles in the map. In operation 3422, the real property may be syndicated (e.g., through the syndication module 140 of FIG. 1) across a realtor multiple listing service database (e.g., the multiple listing module 142 of FIG. 1) upon request of the user. In operation 3424, the availability status may be modified to a for rent status (e.g., modified using the rent module 114 of FIG. 1).

Figure 34C:
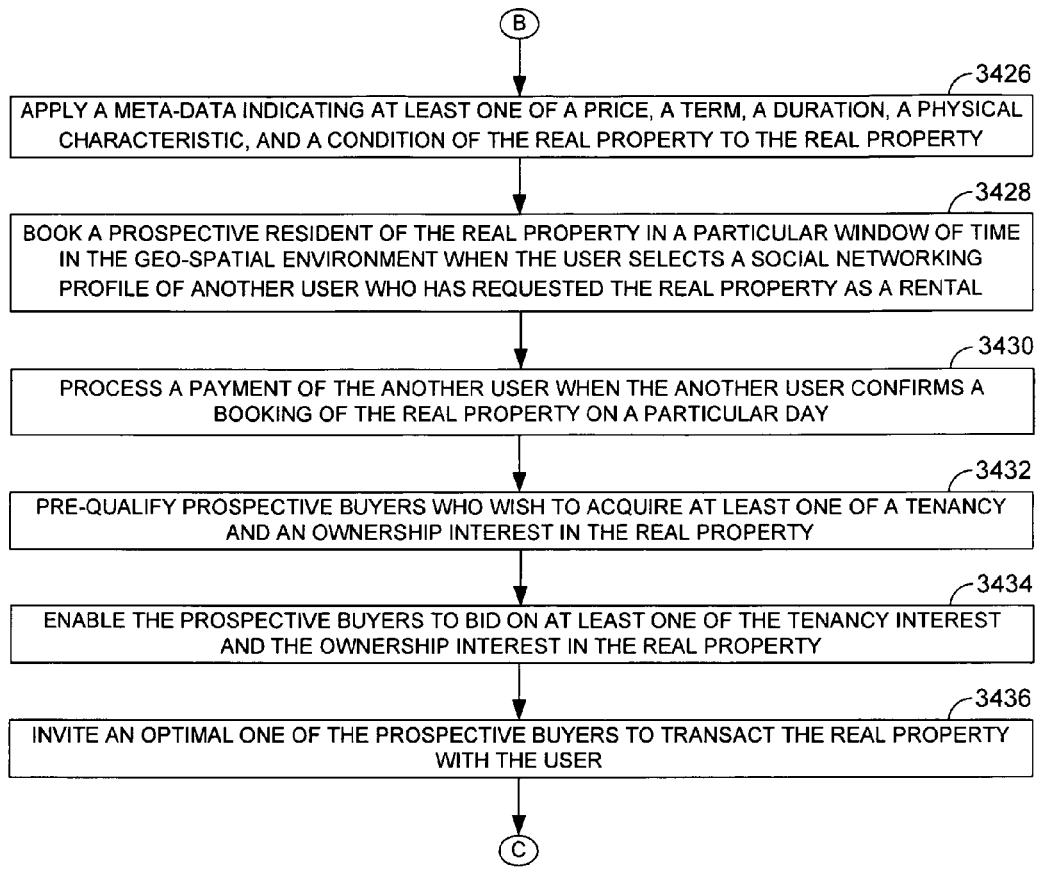
FIG. 34C is a continuation of process flow of FIG. 34B showing additional processes, according to one embodiment.

FIG. 34C is a continuation of the process flow of FIG. 34B showing additional processes. In operation 3426, a meta-data indicating at least one of a price, a term, a duration, a physical characteristic, and a condition of the real property may be applied to the real property. In operation 3428, a prospective resident (e.g., the user 116 of FIG. 1) of the real property in a particular window of time in the geo-spatial environment may be booked when the user selects a social networking profile of another user who has requested the real property as a rental (e.g., through rent module 114 of FIG. 1). In operation 3430, a payment of another user may be processed when the another user confirms a booking of the real property on a particular day.

In operation 3432, prospective buyers who wish to acquire at least one of a tenancy and an ownership interest in the real property may be pre-qualified (e.g., through bidding module 138 of FIG. 1). In operation 3434, the prospective buyers may be enabled to bid on at least one of the tenancy interest and the ownership interest in the real property. In operation 3436, an optimal one of the prospective buyers may be invited to transact the real property with the user.

Figure 34D:
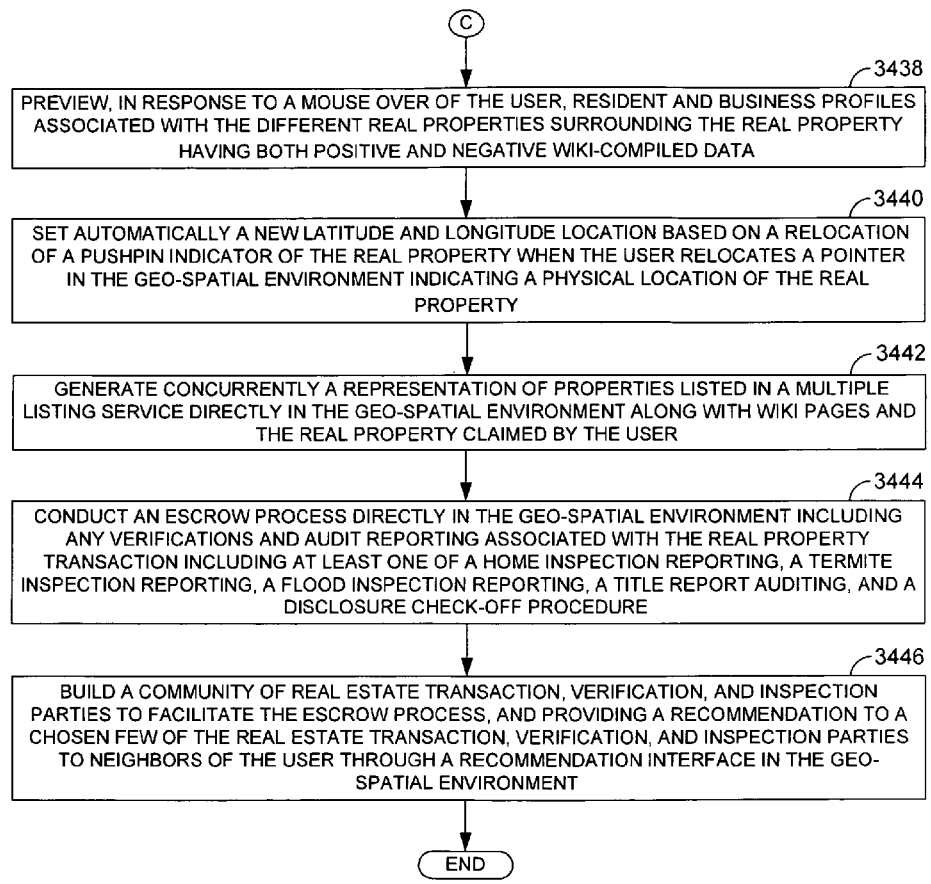
FIG. 34D is a continuation of process flow of FIG. 34C showing additional processes, according to one embodiment.

FIG. 34D is a continuation of the process flow of FIG. 34C showing additional processes, according to one embodiment. In operation 3438, a mouse over of the user, resident and business profiles associated with the different real properties surrounding the real property may be previewed having both positive and negative wiki-compiled data (e.g., the neighbor user generated content 302 of FIG. 3). In operation 3440, a new latitude and longitude location may be automatically set based on a relocation of a pushpin indicator of the real property (e.g., through pushpin module 132 of FIG. 1) when the user relocates a pointer in the geo-spatial environment indicating a physical location of the real property. In operation 3442, a representation of properties listed in a multiple listing service (e.g., the multiple listing module 142 of FIG. 1) may be concurrently generated directly in the geo-spatial environment along with wiki pages and the real property claimed by the user.

In operation 3444, an escrow process may be conducted (e.g., using the escrow module 144 of FIG. 1) directly in the geo-spatial environment including any verifications and audit reporting associated with the real property transaction including at least one of a home inspection reporting, a termite inspection reporting, a flood inspection reporting, a title report auditing, and a disclosure check-off procedure. In operation 3446, a community of real estate transaction, verification, and inspection parties may be built to facilitate the escrow process, and providing a recommendation (e.g., the recommendation module 146 of FIG. 1) to a chosen few of the real estate transaction, verification, and inspection parties to neighbors (e.g., the neighbor 120 of FIG. 1) of the user (e.g., the user 116 of FIG. 1) through a recommendation interface in the geo-spatial environment.

For example, a For-sale-by owner (e.g., FSBO 212 of FIG. 2) may be a term that may describe a piece of real property that may have been offered for sale directly by its owner. The owner of the real property may not have solicited the help of a real estate broker, implying that no real estate commission may be associated with the sale of the real property. In recent years, the term may have been used more broadly to describe the process of marketing, buying, and selling of real property without the representation of a real estate broker.

Many sellers who may prefer to sell the real property through FSBO (For-Sale-By Owner) may avoid paying commission to the broker (e.g., Commissions may range from 5% to 7%).

Many listing services (e.g., Multiple Listing Service (MLS) (e.g., the multiple listing module 142 of FIG. 1)) may allow real estate brokers representing sellers of the real property under a listing contract to widely share information about properties associated with real estate brokers who may represent potential buyers (e.g., potential interested parties) and/or may wish to cooperate with a seller's broker in finding the prospective buyer for the real property. The many listing services may combine the listings of all available real properties in a geo-spatial environment that may be represented by brokers who may be members of many database sevices.

The listing services may enable the efficient distribution of information (e.g., the contact information, commission of the agent, etc) that may facilitate the potential buyer of the real property to search the listing service database (e.g., the multiple listing module 142 of FIG. 1) and/or retrieve information about the real property for sale for various parameters (e.g., the physical location, the price range, etc), The listing services (e.g., the multiple listing module 142 of FIG. 1) may be governed by private entities, and/or rules set by enforcing bodies (e.g., a county, a real property agencies, etc.) beyond any individual state rules regarding real estate. The listing services may set their own rules for membership, access, and/or sharing of information, and may be subject to nationwide rules laid down by the entities associated with real property transactions with no state and/or federal oversight (e.g., a real estate company, the county, etc.). The listing services may be owned and/or operated by the real estate company, the county and/or a regional real estate Board. Membership of the listing services may be generally considered to be essential to the practice of real estate brokerage.

A person (e.g., the user 116 of the global neighborhood environment 100 of FIG. 1) selling his/her own home may act as a For-sale-by owner may not put a listing for the home directly into the listing database (e.g., the multiple listing module 142 of FIG. 1). Similarly, a properly licensed broker who may not prefer to join the trade association and/or operate a business within the association's rules, may not join the listing services.

A Bed and Breakfast may be a type of boarding house typically operating out of a large single family residence (e.g., the residence 118 of FIG. 1). Guests may be accommodated at night in private bedrooms and breakfast may be served in the morning—in any one of the bedroom, a dining room, the host's kitchen.

Bathrooms may be private, shared (e.g. sharing with other guests, sharing with the family in smaller establishments) and/or en-suite (e.g. where the ablutions are directly accessed from the guest's bedroom). The Bed and Breakfast may be operated either as a primary occupation or as a secondary source of income. Staff may often consist of the house's owners and/or members of their family who may live there.

Guests may usually be expected to pay for their stay upon arrival and/or leave before noon or earlier on the day of departure. A big advantage of this type of hosted accommodation may be the local knowledge of the host(s).

Guests may stay more than one night, in some smaller Bed and Breakfasts they may be expected to be away from the Bed and Breakfast during the main part of the day. This arrangement, however, may not be inconvenient since many popular Bed and Breakfasts may be located in beach and mountain areas, (e.g., Hawaii, New England, Colorado) where daytime recreation and/or tourism activities may be popular. One advantage of staying at a Bed and Breakfast may be readier access to popular locations "off the beaten path" which may not be convenient to the city center.

Most Bed and Breakfasts may be small, rarely with room (e.g., the room may have the capacity to accommodate 2-12 guests). It may be advisable for anyone wanting to stay at a bed and breakfast to make reservations well in advance of their travel date. Consultation with a qualified travel agent knowledgeable in this type of accommodation may be helpful. However, many Bed and Breakfasts may belong to associations and/or may have an electronic interface (e.g., may have website of their own). Prices and tariffs may be described in various books and/or travel guides that may often be obsolete by the time they are published.

The Bed and Breakfast arrangement may actually be very old one. Before the modern times, it might have been quite normal for country travelers to spend the night at a private house rather than an inn, and the custom may have persisted in many parts of the world. However, prior to the 19th century, this might have been strictly an informal arrangement constrained by acquaintance and social rank (e.g., a doctor might stay with a doctor or pharmacist, while a nobleman would only stay with the local gentry). The abbreviation of 'B&B' on roadside signs first became popular in the British Isles.

Breakfast may usually be cooked on demand for the guest and may usually feature bacon, eggs, sausages, tomatoes, mushrooms, baked beans. But increasingly, because of either a desire of owners to economize or guests to minimize their calorie intake, a 'continental breakfast' might have become more common. Hotel prices may often be outrageous, Bed and Breakfast's may be a budget option and this tradition may continue in many parts of the world.

However, Bed and Breakfasts in many countries may often be consciously seek to recall earlier days. They may frequently be established in attractive older houses that may have been renovated and/or filled with antique furniture. In some cases, an existing inn may re-label itself as a Bed and Breakfast to improve business and/or move itself 'up-market'. Also in some countries, the Bed and Breakfasts may serve a traditional breakfast as a point of pride. Furthermore, a form of Bed and Breakfast called casa particular (e.g. "private home") became the main form of accommodation outside the tourist resorts. As they may often be run by amateurs, with little lodge management experience, strict laws might govern the operation of Bed and Breakfasts. However, regulations may vary in each jurisdiction in content, extent and in enforcement.

The most common regulations Bed and Breakfasts may have to follow pertain to safety. They may be required to have fire resistance, a sufficient fire escape plan in place, and smoke detectors in each guest room. Kitchens and equipment used to serve meals may also be monitored for sanitation. Most Bed and Breakfasts may generally be compliant with their jurisdiction's laws. However, guests may mostly be unfamiliar with these guidelines and/or may tend to overlook any violations.

While various local governments may have regulations, membership in a state/provincial/national bed and breakfast association may often indicate a higher standard of hospitality. Associations may often review their members and may tend to have additional standards of care. While the associations may also facilitate marketing of the individual bed and breakfasts. They may also provide a stamp of approval that the business in question is reputable.

Guest house (e.g., the guest house property 204 of FIG. 2) may be a private home which might have been converted for the exclusive use of guest accommodation in the geo-spatial environment. The owner may usually live in an entirely separate area within the property and the guest house may serve as a form of lodging business, similar to a bed and breakfast. The neighborhood (e.g., the neighborhood 102A-N of FIG. 1) may be a geographically localised community located within a larger city, town or suburb. The residents of a given neighborhood (e.g., the user 116 of FIG. 1) may be called (e.g., the neighbors 120 of the neighborhood 102A-N illustrated in FIG. 1)

Traditionally, a neighborhood (e.g., the neighborhood 102A-N of FIG. 1) may be small enough that the neighbors (e.g., the neighbor 120 of the neighborhood 102 illustrated in FIG. 1) may be able to know each other. However in practice, neighbors may not know one another very well at all. Villages may not be divided into neighborhoods, because they may already be small enough that all the villager may know each other.

A leasehold estate may be an ownership interest in land in which any one of a lessee and the tenant may hold real property by some form of title from the landlord. A fixed-term tenancy may last for some fixed period of time. Despite the name tenancy for years, such a tenancy may last for any period of time even a tenancy for one week may be called a tenancy for years. The duration may need not be certain, but may be conditioned upon the happening of some event, (e.g. until the crops are ready for harvest, until the war is over), such that the lease may expire automatically upon the running of the specified time, and/or the occurrence of the specified event. A lease may be purported to be a tenancy for years of more than one year, and it may not be put in writing, then it may automatically become a periodic tenancy, with a rental period equal to the period between lease payments, but of no more than a year.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry and/or in Digital Signal; Processor DSP circuitry).

For example, the lodging module 106, the search module 108, the wiki module 110, the for-sale-by owner module 112, the rent module 114, the delivery module 130, the pushpin module 132, the retained agent module 134, the paying guest module 136, the bidding module 138, the syndication module 140, the multiple listing module 142, the escrow module 144, the recommendation module 146, the social community module 606, the search module 608, the wiki module 610, the commerce module 612, the map module 614, the building builder module 700, the $N^{th}$ degree module 702, the tagging module 704, the verify module 706, the groups generator module 708, the pushpin module 710, the profile module 712, the announce module 714, the friend finder module 722, the neighbor-neighbor help module 724, the business search module 802, the communicate module 806, the directory assistance module 808, the embedding module 810, the no-match module 812, the range selector module 814, the user-place wiki module 900, the user-user wiki module 902, the user-neighbor wiki module 904, the user-business wiki module 906, the reviews module 908, the defamation prevention module 910, the wiki social network conversion module 912, the claim module 914, the data segment module 916, the dispute resolution module 918, the resident announce payment module 1000, the business display advertisement module 1002, the geo-position advertisement ranking module 1004, the content syndication module 1006, the text advertisement module 1008, the community market place module 1010, the click-in tracking module 1012, the satellite data module 1100, the cartoon map converter module 1104, the profile pointer module 1106, the parcel module 1108 and the occupant module 1110 of FIGS. 1-34 may be embodied through the lodging circuit, the for-sale-by owner circuit, the rent circuit, the delivery circuit, the pushpin circuit, the retained agent circuit, the paying guest circuit, the bidding circuit, the syndication circuit, multiple listing circuit, escrow circuit, recommendation circuit, the social community circuit, the search circuit, the wiki circuit, the commerce circuit, the map circuit, the building builder circuit, the $N^{th}$ degree circuit, the tagging circuit, the verify circuit, the groups circuit, the pushpin circuit, the profile circuit, the announce circuit, the friends finder circuit, the neighbor-neighbor help circuit, the business search circuit, the communicate circuit, the embedding circuit, the no-match circuit, the range selector circuit, the user-place wiki circuit, the user-user wiki circuit, the user-neighbor wiki circuit, the user-business circuit, the reviews circuit, the defamation prevention circuit, the wiki social network conversion circuit, the claim circuit, the data segment circuit, the dispute resolution circuit, the resident announce payment circuit, the business display advertisement circuit, the geo-position advertisement ranking circuit, the content syndication circuit, the text advertisement circuit, the community market place circuit, the click-in tracking circuit, the satellite data circuit, the cartoon map converter circuit, the profile pointer circuit, the parcel circuit, the occupant circuit using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A system of a global neighborhood environment comprising:
   a computer server of the global neighborhood environment:
   the computer server including one or more computers having non-transitory instructions stored thereon that when executed cause the one or more computers:
   to verify that a user lives at a residence associated with a geographic location claimed by the user of the global neighborhood environment using a processor and a memory,
   to create a social network page of the user once verified,
   to enable the user to constrain a communication to neighboring users within a geospatial vicinity of the residence of the user based on a neighborhood boundary,
   to distribute a message in a distance away from the residence of the user based on the neighborhood boundary,
   to provide an additional privilege as a lead user in the online community of the global neighborhood environment based on at least one of a participation level of the user in the online community and an activity level of the user associated with encouraging neighbors to participate in the online community, and
   to automatically determine a set of access privileges in the online community associated with each user of the online community by constraining access in private web sites of the online community to neighboring users based on each residence associated with each geographic location claimed by each user of the global neighborhood environment,
   wherein the one or more computers to permit the user to set a privacy setting associated with a profile data of the user such that a certain information is marked as private and is therefore masked from being visible to neighboring users of the online community in the global neighborhood environment, and
   wherein the global neighborhood environment formed through the computer server has a domain name of nextdoor having a generic top-level suffix of com.

2. The system of the global neighborhood environment of claim 1:
   wherein the computer server to permit the user to provide at least one of a recommendation and an event suggestion to neighboring users based on the residence associated with the geographic location claimed by the user of the global neighborhood environment.

3. The system of the global neighborhood environment of claim 1:
   wherein the computer server to permit the user of the global neighborhood environment to mark certain information communicated directly to a particular neighboring user as private, such that privately shared information is shared only with the particular neighboring user and is designated as non-public to other neighboring users of the online community.

4. The system of the global neighborhood environment of claim 1:
   wherein the computer server to filter information to only display messages from a particular neighborhood associated with each verified user, and
   wherein the computer server to permit private posts only in the particular neighborhood to verified users having verified addresses within the neighborhood.

5. The system of the global neighborhood environment of claim 1:
   wherein the computer server utilizes a postcard method through which the computer server generates a physical postcard that is postal mailed to users in a particular neighborhood of the social network.

6. The system of the global neighborhood environment of claim 1 wherein the global neighborhood environment is designed to create private websites to facilitate communication among neighbors and build stronger neighborhoods.

7. A computer server including one or more processors having non-transitory instructions stored thereon that when executed cause the computer server:
   to verify that a user lives at a residence associated with a geographic location claimed by the user of an online neighborhood social network using a processor and a memory,
   to create a social network page of the user once verified in the online neighborhood social network,
   to enable the user to constrain communications to neighboring users in a geospatial vicinity of the residence of the user based on a neighborhood boundary of the online neighborhood social network,
   to automatically determine a set of access privileges in the online neighborhood social network associated with the neighborhood boundary of the online neighborhood social network by constraining access in a private website in the online neighborhood social network to the user and to neighboring users of the user based on each residence associated with each geographic location claimed by each user of the online neighborhood social network verified to live within the neighborhood boundary, wherein the user is provided an additional privilege as a lead user in the online neighborhood social network based on at least one of a participation level of the user in the online neighborhood social network and an activity level of the user associated with encouraging neighbors to participate in the online neighborhood social network, and wherein the computer server to permit the user to set a privacy setting associated with a profile data such that a certain information is marked as private in the online neighborhood social network and is therefore masked from being visible to neighboring users of the online neighborhood social network.

8. The computer server of claim 7 wherein the online neighborhood social network has a domain name of nextdoor.

9. The computer server of claim 7:
wherein the computer server to permit the user to provide a recommendation to neighboring users based on the residence associated with the geographic location claimed by the user of the online neighborhood social network.

10. The computer server of claim 7:
wherein the computer server to permit the user of the online neighborhood social network to mark certain information communicated directly to a particular neighboring user as private, such that privately shared information is shared only with the particular neighboring user and is designated as non-public to other neighboring users of the online neighborhood social network.

11. The computer server of claim 7:
wherein the computer server to filter information to only display messages from a particular neighborhood associated with each verified user, and
wherein the computer server to permit private posts only in the particular neighborhood to verified users having verified addresses within a particular neighborhood boundary associated with the particular neighborhood.

12. The computer server of claim 7:
wherein the computer server utilizes a postcard method through which the computer server generates a physical postcard that is postal mailed to neighboring users living within the neighborhood boundary of the online neighborhood social network.

13. The computer server of claim 7:
wherein the online neighborhood social network is designed to create private websites to facilitate communication among neighbors and build stronger neighborhoods.

14. A method comprising:
verifying that a user lives at a residence associated with a residential address claimed by the user of an online neighborhood social network using a processor and a memory;
creating a social network page of the user once verified in the online neighborhood social network;
distributing, via the processor and the memory, a message from the user to neighboring users that are verified to live within a neighborhood boundary of the residence;
designating, via the processor and the memory, the user as a lead user having an additional privilege in a private website of the online neighborhood social network confined by the neighborhood boundary based on at least one of a participation level of the user in the online neighborhood social network and an activity level of the user associated with encouraging neighboring users to participate in the online neighborhood social network;
automatically determining, via the processor and the memory, a set of access privileges in the private website of the online neighborhood social network associated with the user; and
restricting access, via the processor and the memory, to a particular neighborhood in the private website of the online neighborhood social network to the user and to neighboring users living within the neighborhood boundary of the residence,
wherein the neighboring users are determined based on each residence associated with each geographic location claimed by each neighboring user of the online neighborhood social network that is within the neighborhood boundary,
permitting the user to set a privacy setting associated with a profile data such that a certain information is marked as private in the online neighborhood social network, via the processor and the memory, and is therefore masked from being visible to neighboring users of the online neighborhood social network, and
wherein the online neighborhood social network has a domain name of nextdoor having a generic top-top level suffix of com.

15. The method of claim 14 further comprising at least one of:
distributing a recommendation of the user to neighboring users based on the residence associated with the geographic location claimed by the user of the online neighborhood social network; and
publishing an event listing posted by the user to neighboring users based on the residence associated with the geographic location claimed by the user of the online neighborhood social network.

16. The method of claim 14:
permitting the user of the online neighborhood social network to mark certain information communicated to a particular neighboring user as private; and
designating the certain information shared only with the particular neighboring user as non-public to other neighboring users of the online neighborhood social network.

17. The method of claim 14:
filtering information to only display messages from a particular neighborhood associated with each verified user; and
permitting private posts only in the particular neighborhood to verified users having verified addresses within the neighborhood boundary.

18. The method of claim 14:
utilizing a postcard method through which the computer server generates a physical postcard that is postal mailed to neighboring users living within the neighborhood boundary of the online neighborhood social network.

19. The method of claim 14:
wherein the online neighborhood social network is designed to create private websites to facilitate communication among neighbors and build safer neighborhoods.

20. A system of a global neighborhood environment comprising:
a computer server of the global neighborhood environment:
the computer server including one or more computers having non-transitory instructions stored thereon that when executed cause the one or more computers:

to verify that a user lives at a residence associated with a geographic location claimed by the user of the global neighborhood environment using a processor and a memory, to create a social network page of the user once verified, to enable the user to constrain a communication to neighboring users within a geospatial vicinity of the residence of the user, to provide an additional privilege as a lead user in the online community of the global neighborhood environment based on at least one of a participation level of the user in the online community and an activity level of the user associated with encouraging neighbors to participate in the online community, and to automatically determine a set of access privileges in the online community associated with each user of the online community by constraining access in private web sites of the online community to neighboring users based on each residence associated with each geographic location claimed by each user of the global neighborhood environment, wherein the one or more computers to permit the user of the global neighborhood environment to mark certain information communicated directly to a particular neighboring user as private, such that privately shared information is shared only with the particular neighboring user and is designated as non-public to other neighboring users of the online community.

21. The system of the global neighborhood environment of claim 20:

wherein the computer server to permit the user to set a privacy setting associated with a profile data of the user such that a certain information is marked as private and is therefore masked from being visible to neighboring users of the online community in the global neighborhood environment.

22. The system of the global neighborhood environment of claim 20:

wherein the computer server to permit the user to provide at least one of a recommendation and an event suggestion to neighboring users based on the residence associated with the geographic location claimed by the user of the global neighborhood environment.

23. The system of the global neighborhood environment of claim 20:

wherein the global neighborhood environment formed through the computer server is named nextdoor.

24. The system of the global neighborhood environment of claim 20:

wherein the computer server to filter information to only display messages from a particular neighborhood associated with each verified user, and wherein the computer server to permit private posts only in the particular neighborhood to verified users having verified addresses within the neighborhood.

25. The system of the global neighborhood environment of claim 20 wherein the computer server utilizes a postcard method through which the computer server generates a physical postcard that is postal mailed to neighboring users in a particular neighborhood of the social network.

26. The system of the global neighborhood environment of claim 20 wherein the global neighborhood environment is designed to create private websites to facilitate communication among neighbors and build safer neighborhoods.

27. A computer server comprising:

a processor and a memory having non-transitory instructions stored thereon that when executed cause the computer server:

to verify that a user lives at a residence associated with a geographic location claimed by the user of an online neighborhood social network using the processor and the memory, to create a social network page of the user once verified in the online neighborhood social network, to enable the user to constrain communications to neighboring users in a geospatial vicinity of the residence of the user based on a neighborhood boundary of the online neighborhood social network, wherein the user is provided an additional privilege as a lead user in the online neighborhood social network based on at least one of a participation level of the user in the online neighborhood social network and an activity level of the user associated with encouraging neighbors to participate in the online neighborhood social network, to automatically determine a set of access privileges in the online neighborhood social network associated with the neighborhood boundary of the online neighborhood social network by constraining access in a private website in the online neighborhood social network to the user and to neighboring users of the user based on each residence associated with each geographic location claimed by each user of the online neighborhood social network verified to live within the neighborhood boundary, wherein the computer server to permit the user of the online neighborhood social network to mark certain information communicated directly to a particular neighboring user as private, such that privately shared information is shared only with the particular neighboring user and is designated as non-public to other neighboring users of the online neighborhood social network, and wherein the online neighborhood social network has a domain name of nextdoor.

28. The computer server of claim 27:

wherein the computer server to permit the user to set a privacy setting associated with a profile data such that a certain information is marked as private in the online neighborhood social network and is therefore masked from being visible to neighboring users of the online neighborhood social network.

29. The computer server of claim 27:

wherein the computer server to permit the user to provide a recommendation to neighboring users based on the residence associated with the geographic location claimed by the user of the online neighborhood social network.

30. The computer server of claim 27:

wherein the computer server to filter information to only display messages from a particular neighborhood associated with each verified user, and wherein the computer server to permit private posts only in the particular neighborhood to verified users having verified addresses within a particular neighborhood boundary associated with the particular neighborhood.

31. The computer server of claim 27:

wherein the computer server utilizes a postcard method through which the computer server generates a physical postcard that is postal mailed to neighboring users living within the neighborhood boundary of the online neighborhood social network.

32. The computer server of claim 27:

wherein the online neighborhood social network is designed to create private websites to facilitate communication among neighbors and build stronger neighborhoods.

33. A method comprising:

verifying that a user lives at a residence associated with a residential address claimed by the user of an online neighborhood social network using a processor and a memory;

creating a social network page of the user once verified in the online neighborhood social network;

distributing, via the processor and the memory, a message from the user to neighboring users that are verified to live within a neighborhood boundary of the residence;

designating, via the processor and the memory, the user as a lead user having an additional privilege in a private website of the online neighborhood social network confined by the neighborhood boundary based on at least one of a participation level of the user in the online neighborhood social network and an activity level of the user associated with encouraging neighboring users to participate in the online neighborhood social network;

automatically determining, via the processor and memory, a set of access privileges in the private website of the online neighborhood social network associated with the user; and restricting access, via the processor and the memory, to a particular neighborhood in the private website of the online neighborhood social network to the user and to neighboring users living within the neighborhood boundary of the residence, permitting, via the processor and the memory, the user of the online neighborhood social network to mark certain information communicated to a particular neighboring user as private; and designating, via the processor and the memory, the certain information shared only with the particular neighboring user as non-public to other neighboring users of the online neighborhood social network, wherein the neighboring users are determined based on each residence associated with each geographic location claimed by each neighboring user of the online neighborhood social network that is within the neighborhood boundary.

34. The method of claim 33 wherein:

wherein the global neighborhood environment formed through the computer server has a domain name of nextdoor.

35. The method of claim 33 further comprising at least one of:

permitting the user to set a privacy setting associated with a profile data such that a certain information is marked as private in the online neighborhood social network and is therefore masked from being visible to neighboring users of the online neighborhood social network;

distributing a recommendation of the user to neighboring users based on the residence associated with the geographic location claimed by the user of the online neighborhood social network; and publishing an event listing posted by the user to neighboring users based on the residence associated with the geographic location claimed by the user of the online neighborhood social network.

36. The method of claim 33:

filtering information to only display messages from a particular neighborhood associated with each verified user; and permitting private posts only in the particular neighborhood to verified users having verified addresses within the neighborhood boundary.

37. The method of claim 33:

utilizing a postcard method through which the computer server generates a physical postcard that is postal mailed to neighboring users living within the neighborhood boundary of the online neighborhood social network.

38. The method of claim 33:

wherein the online neighborhood social network is designed to create private websites to facilitate communication among neighbors and build neighborhoods.

* * * * *

UNITED STATES PATENT AND TRADEMARK OFFICE
CERTIFICATE OF CORRECTION

PATENT NO.       : 8,775,328 B1                                Page 1 of 1
APPLICATION NO.  : 14/203531
DATED            : July 8, 2014
INVENTOR(S)      : Raj Abhyanker It is certified that error appears in the above-identified patent and that said Letters Patent is hereby corrected as shown below:

Title page, item 63, Related U.S. Application Data, delete "Continuation of application No. 11/653,194 filed on Jan. 12, 2007." and replace with "Continuation-In-Part of application No. 11/653,194 filed on Jan. 12, 2007."

Signed and Sealed this
Eighteenth Day of November, 2014

Michelle K. Lee
*Deputy Director of the United States Patent and Trademark Office*